US006742175B1

(12) United States Patent
Brassard

(10) Patent No.: US 6,742,175 B1
(45) Date of Patent: May 25, 2004

(54) COMPONENT-BASED SOURCE CODE GENERATOR

(75) Inventor: Michel Brassard, Montreal (CA)

(73) Assignee: Codagen Technologies Corp., Montréal (CA)

(*) Notice: Subject to any disclaimer, the term of this patent is extended or adjusted under 35 U.S.C. 154(b) by 268 days.

(21) Appl. No.: 09/721,900

(22) Filed: Nov. 27, 2000

Related U.S. Application Data

(63) Continuation of application No. PCT/CA99/00929, filed on Oct. 12, 1999.
(60) Provisional application No. 60/145,214, filed on Jul. 23, 1999, and provisional application No. 60/104,014, filed on Oct. 13, 1998.

(51) Int. Cl.[7] ................................................ G06F 9/44
(52) U.S. Cl. ....................................... 717/107; 717/108
(58) Field of Search ................................ 717/106, 107, 717/108, 136, 137, 130

(56) References Cited

U.S. PATENT DOCUMENTS

| | | | |
|---|---|---|---|
| 4,734,854 A | * | 3/1988 | Afshar ........................ 717/107 |
| 4,819,233 A | * | 4/1989 | Delucia et al. .............. 717/129 |
| 4,866,610 A | | 9/1989 | Reiners |
| 5,159,687 A | | 10/1992 | Richburg |
| 5,163,130 A | | 11/1992 | Hullot |
| 5,295,222 A | | 3/1994 | Wadhwa et al. |
| 5,414,847 A | | 5/1995 | Tsukakoshi |
| 5,428,792 A | | 6/1995 | Conner et al. |
| 5,493,680 A | | 2/1996 | Danforth |
| 5,499,371 A | | 3/1996 | Henninger et al. |
| 5,526,522 A | | 6/1996 | Takeuchi |
| 5,557,730 A | | 9/1996 | Frid-Nielsen |
| 5,560,010 A | | 9/1996 | Albert |
| 5,623,657 A | | 4/1997 | Conner et al. |
| 5,640,558 A | | 6/1997 | Li |
| 5,675,801 A | | 10/1997 | Lindsey |
| 5,694,598 A | | 12/1997 | Durand et al. |
| 5,699,310 A | | 12/1997 | Garloff et al. |
| 5,732,257 A | | 3/1998 | Atkinson et al. |
| 5,737,597 A | | 4/1998 | Blackman et al. |
| 5,754,858 A | | 5/1998 | Broman et al. |
| 5,819,281 A | | 10/1998 | Cummins |
| 5,845,289 A | | 12/1998 | Baumeister et al. |
| 5,875,333 A | * | 2/1999 | Fish et al. ................... 717/109 |
| 5,903,756 A | | 5/1999 | Sankar |
| 5,923,878 A | | 7/1999 | Marsland |
| 6,085,198 A | * | 7/2000 | Skinner et al. .......... 707/103 R |
| 6,237,136 B1 | * | 5/2001 | Sadahiro ..................... 717/110 |

FOREIGN PATENT DOCUMENTS

EP     0 219 993 A2     9/1986

OTHER PUBLICATIONS

Code Generator, pp. 1–4, http://www–und.ida.liv.se/~rirob684/java/codegen/docs/index.html, Mar. 21, 2001.
Whjite paper by gen<x> available from http://www.devel-op.com/genx, pp. 1–9.
Netron, http://www.netron.com/frames/examples.htm, Sep. 22, 1999, pp. 1–3, Frame command examples.

* cited by examiner

*Primary Examiner*—Tuan Dam
*Assistant Examiner*—Eric B. Kiss
(74) *Attorney, Agent, or Firm*—Ogilvy Renault; Isabelle Chabot

(57) ABSTRACT

The component-based source code generator uses a set of generation instructions and a set of parameters to generate nearly-repetitive and repetitive source code. The developer specifies to the code generator what to generate through the use of generation instructions. Within a set of generation instructions, the developer specifies the target components and the code that should be generated. The generation process uses information contained in the modeling tool. Consequently, the generated code never has to be modified directly by the developer, greatly reducing maintenance time, minimizing errors, and improving code consistency.

25 Claims, 43 Drawing Sheets

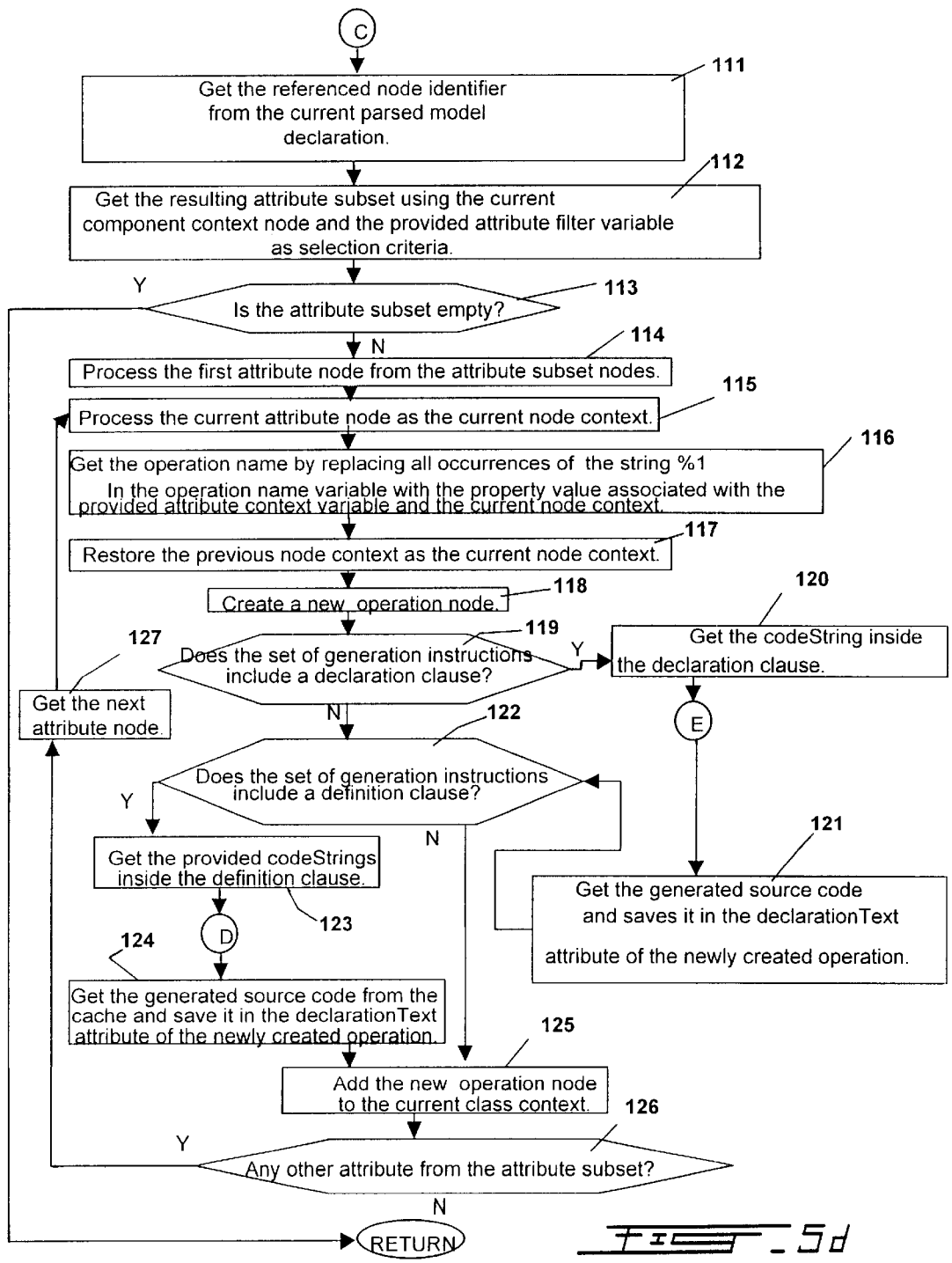

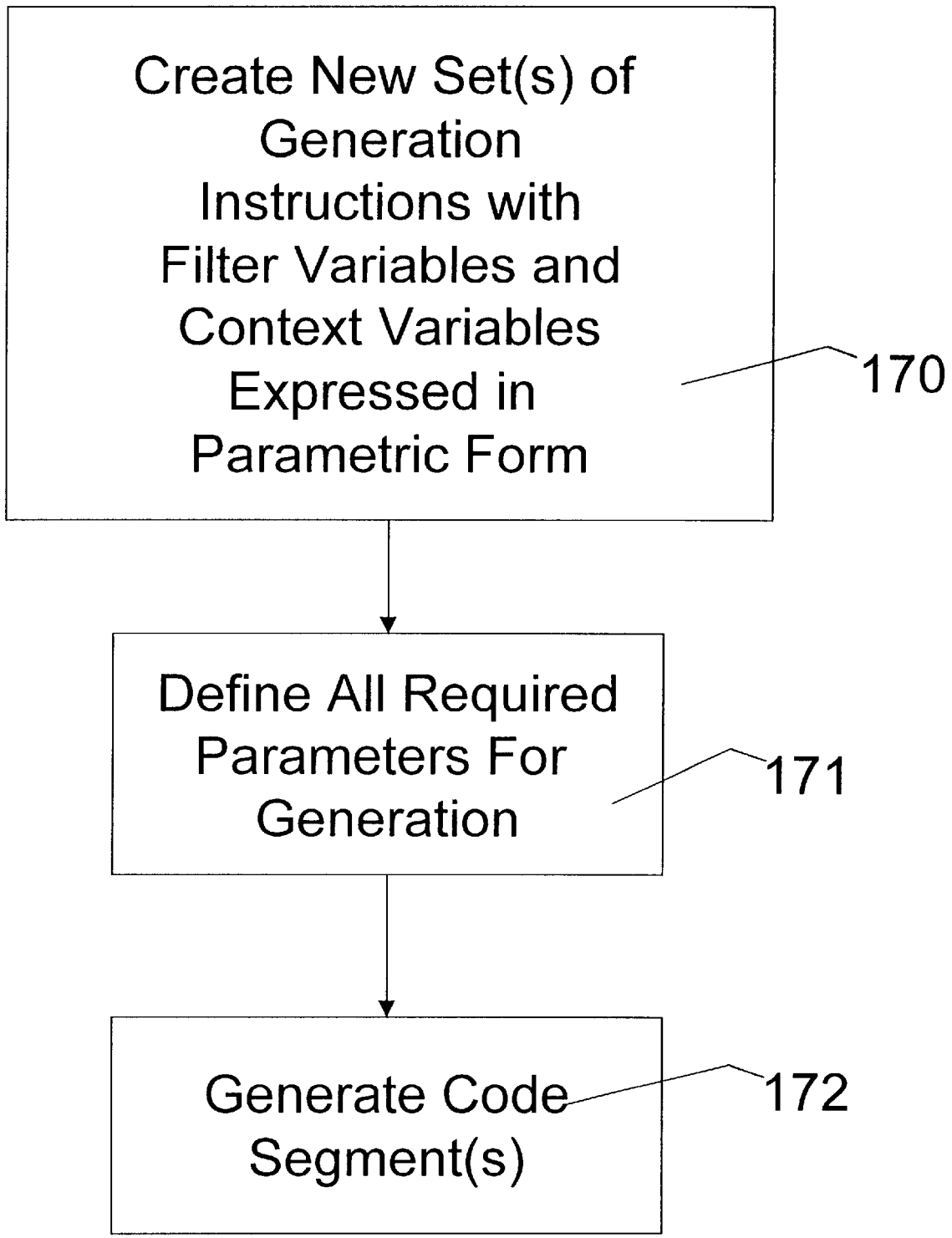

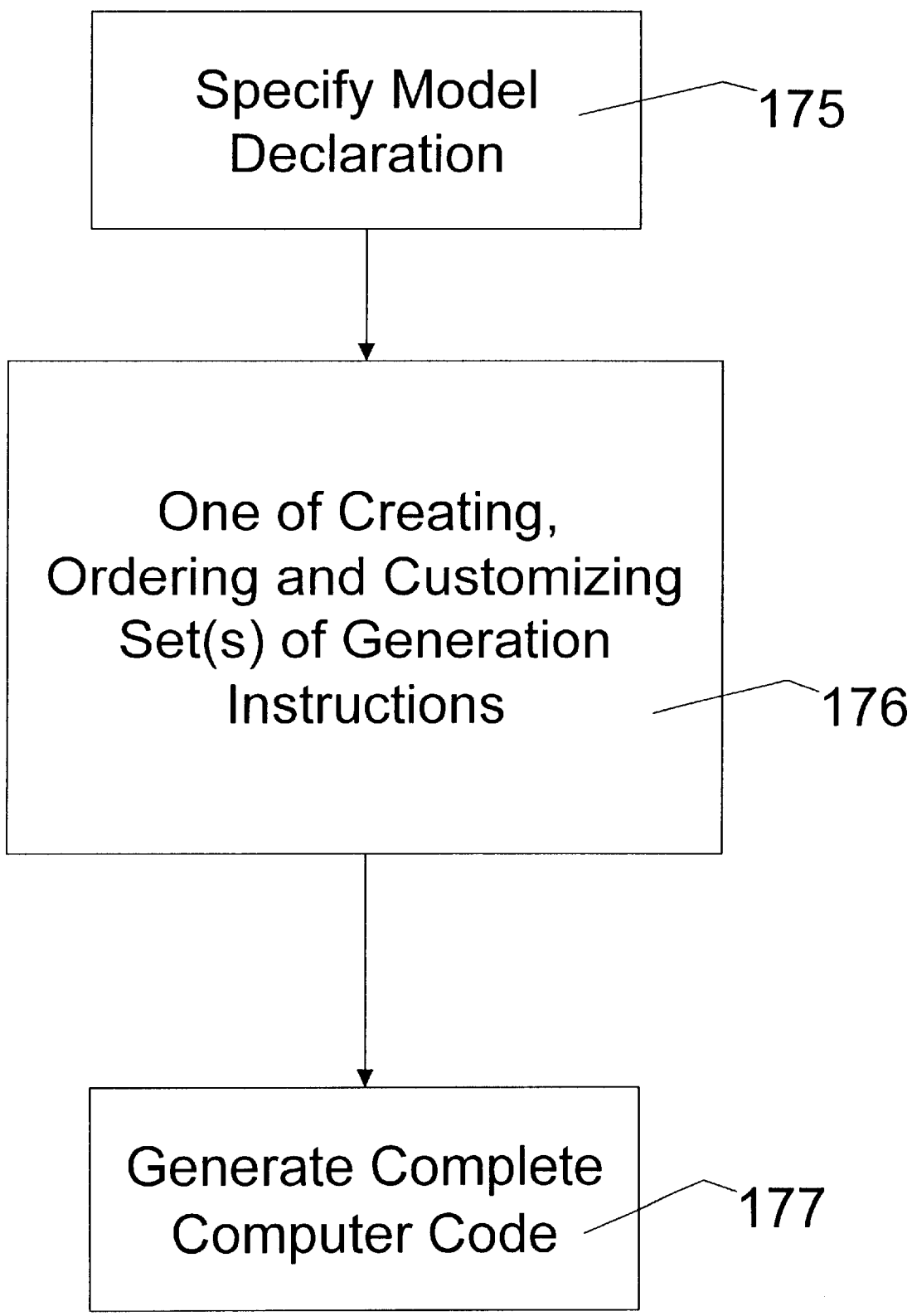

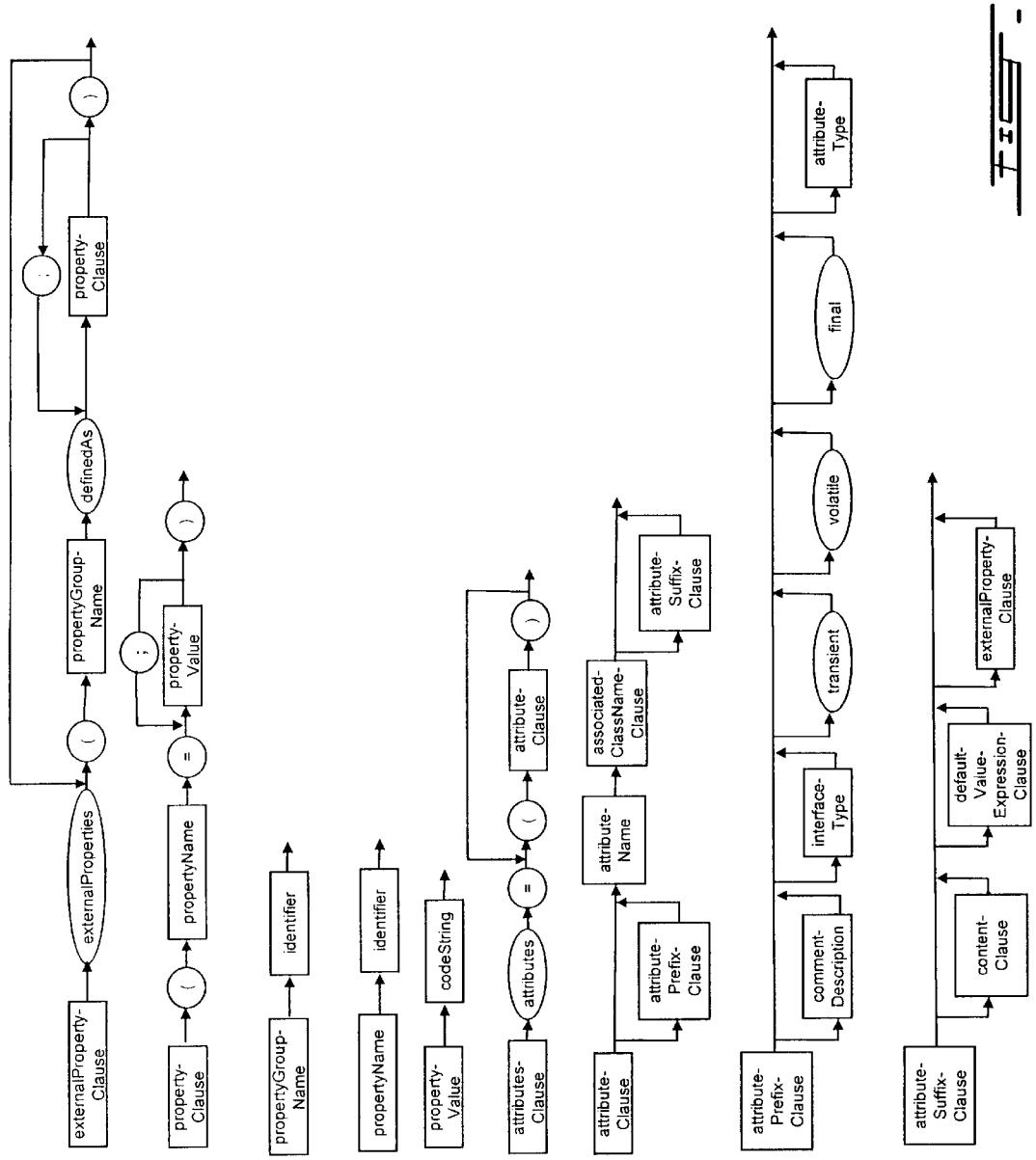

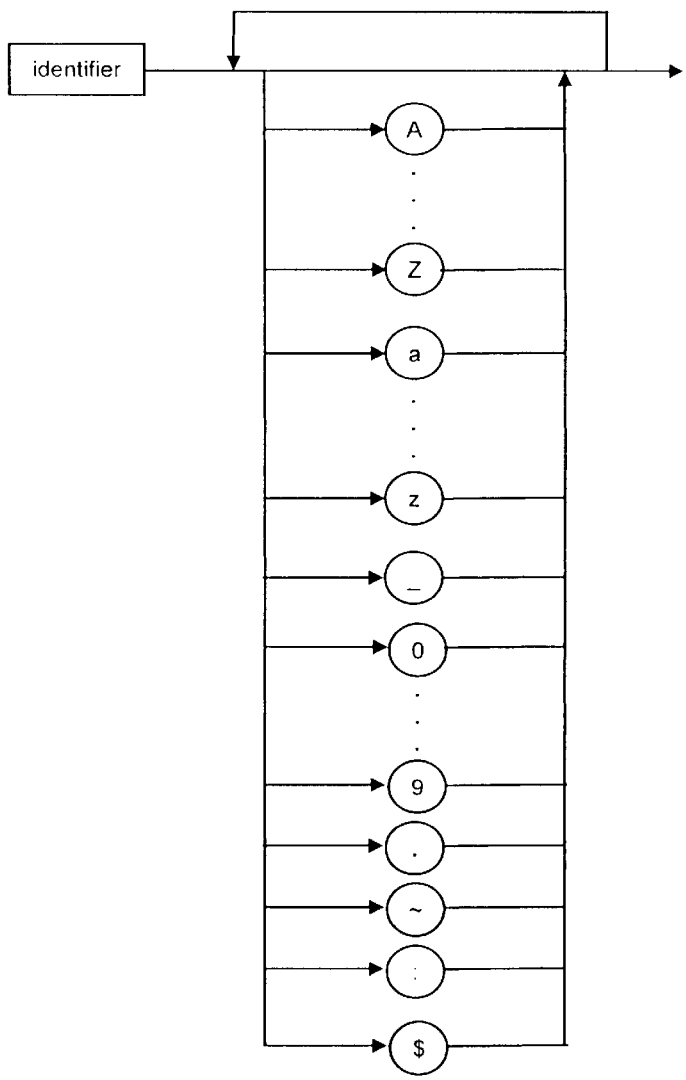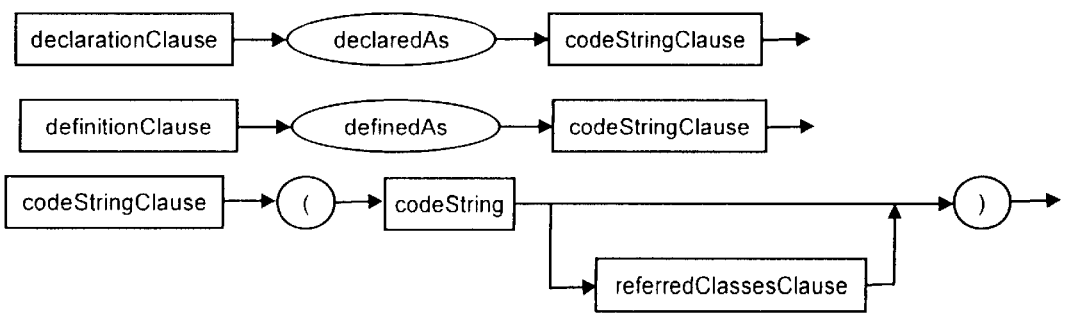
FIG. 13g

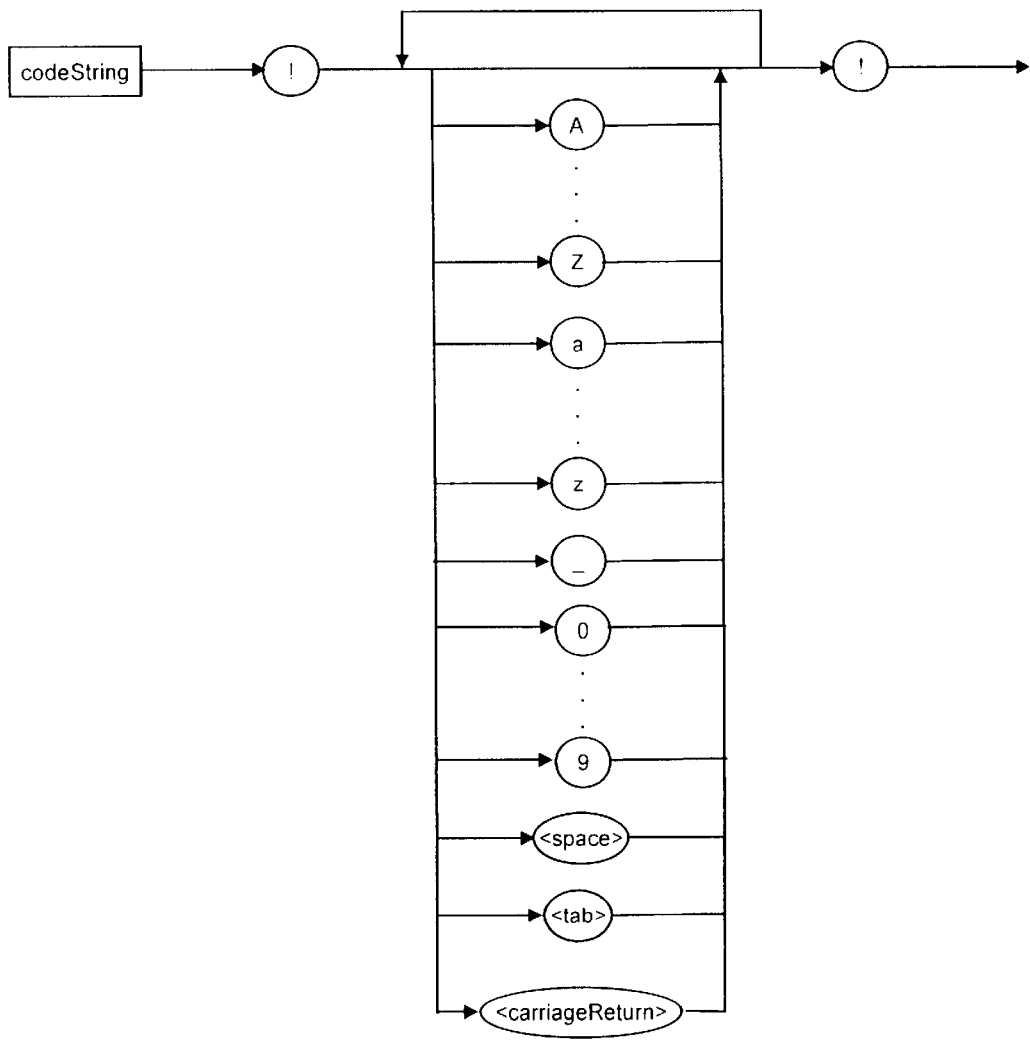
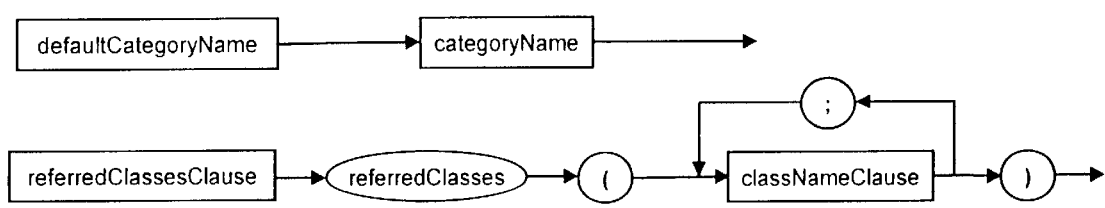
FIG. 13h

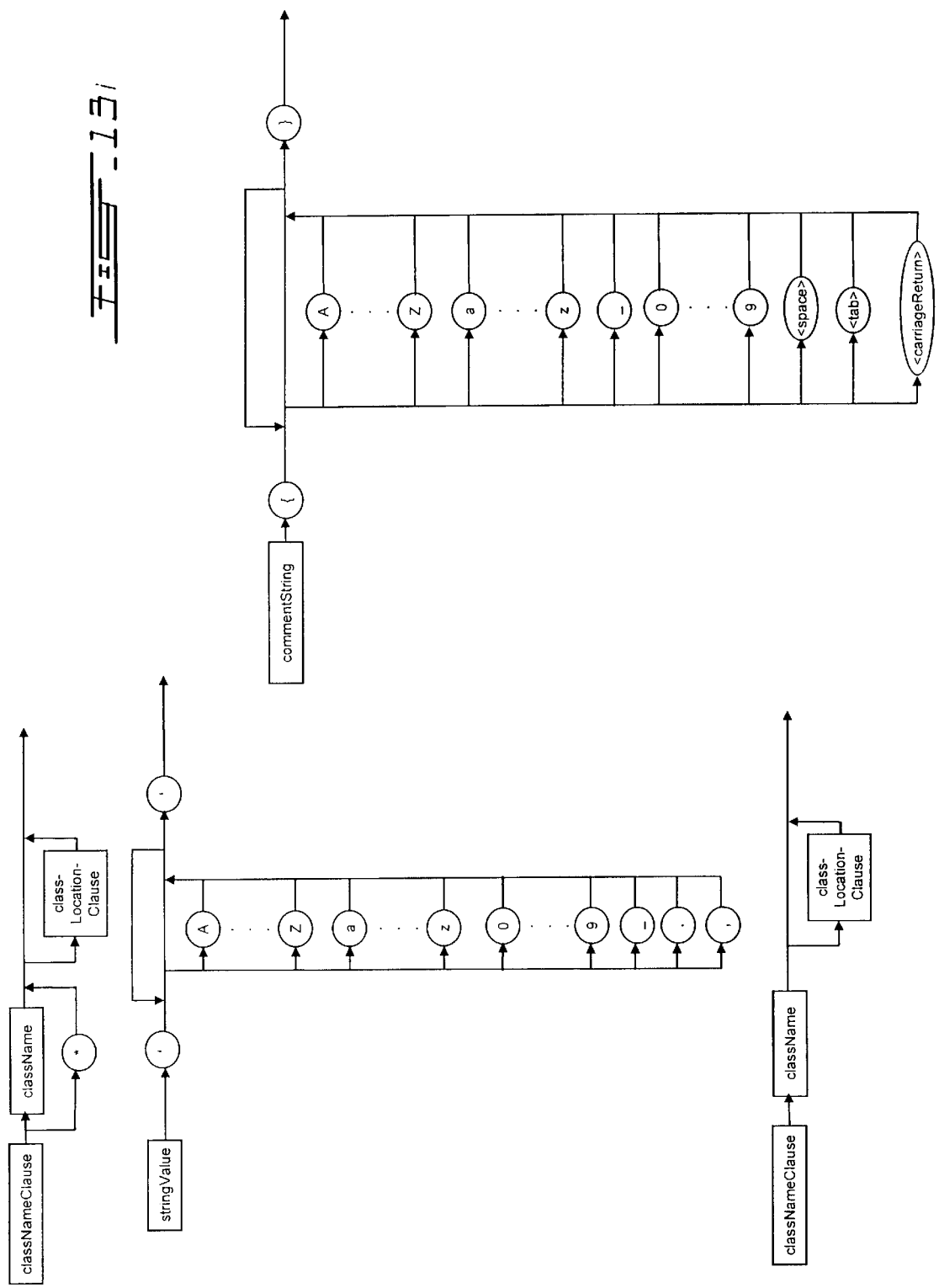

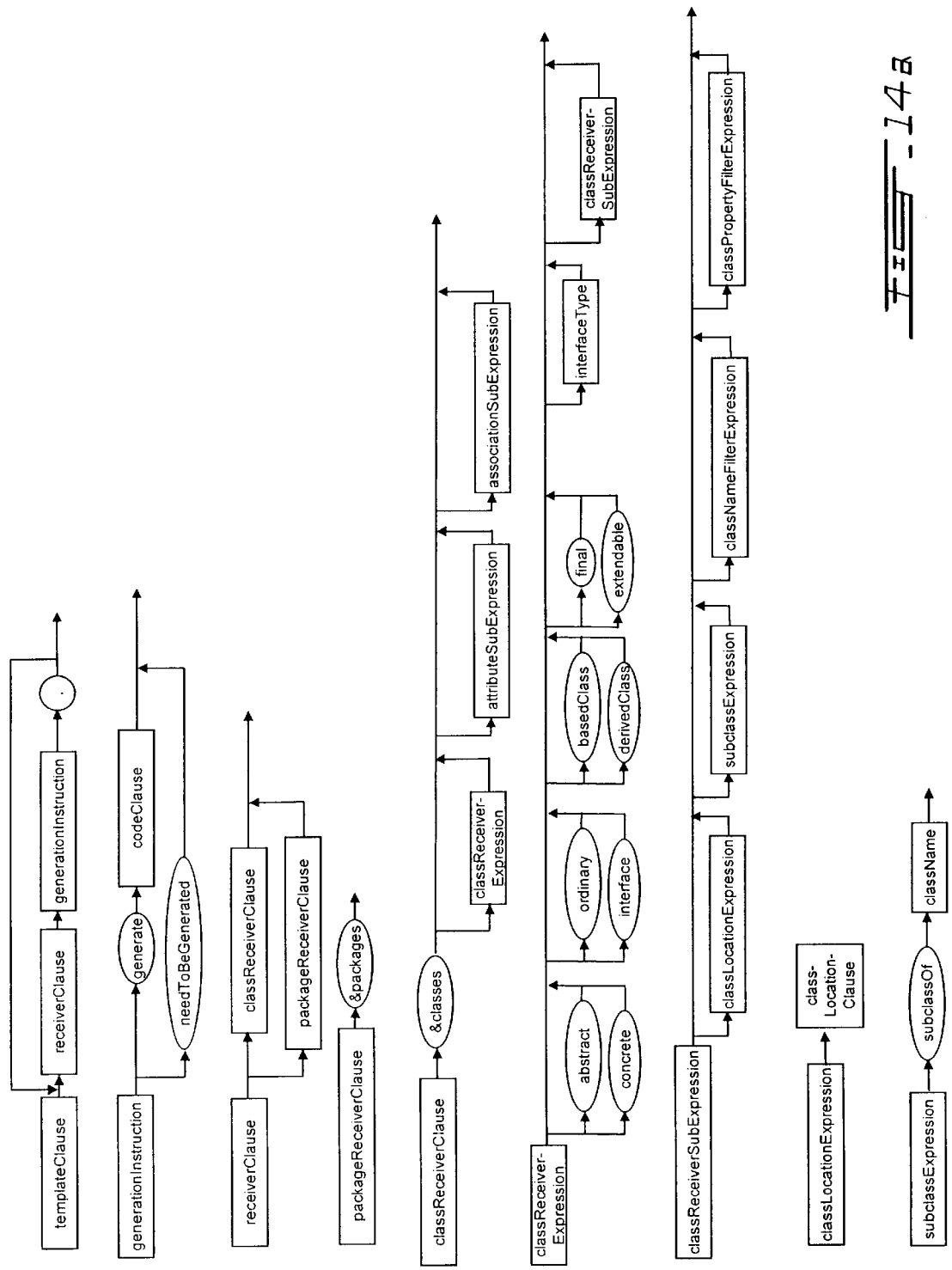

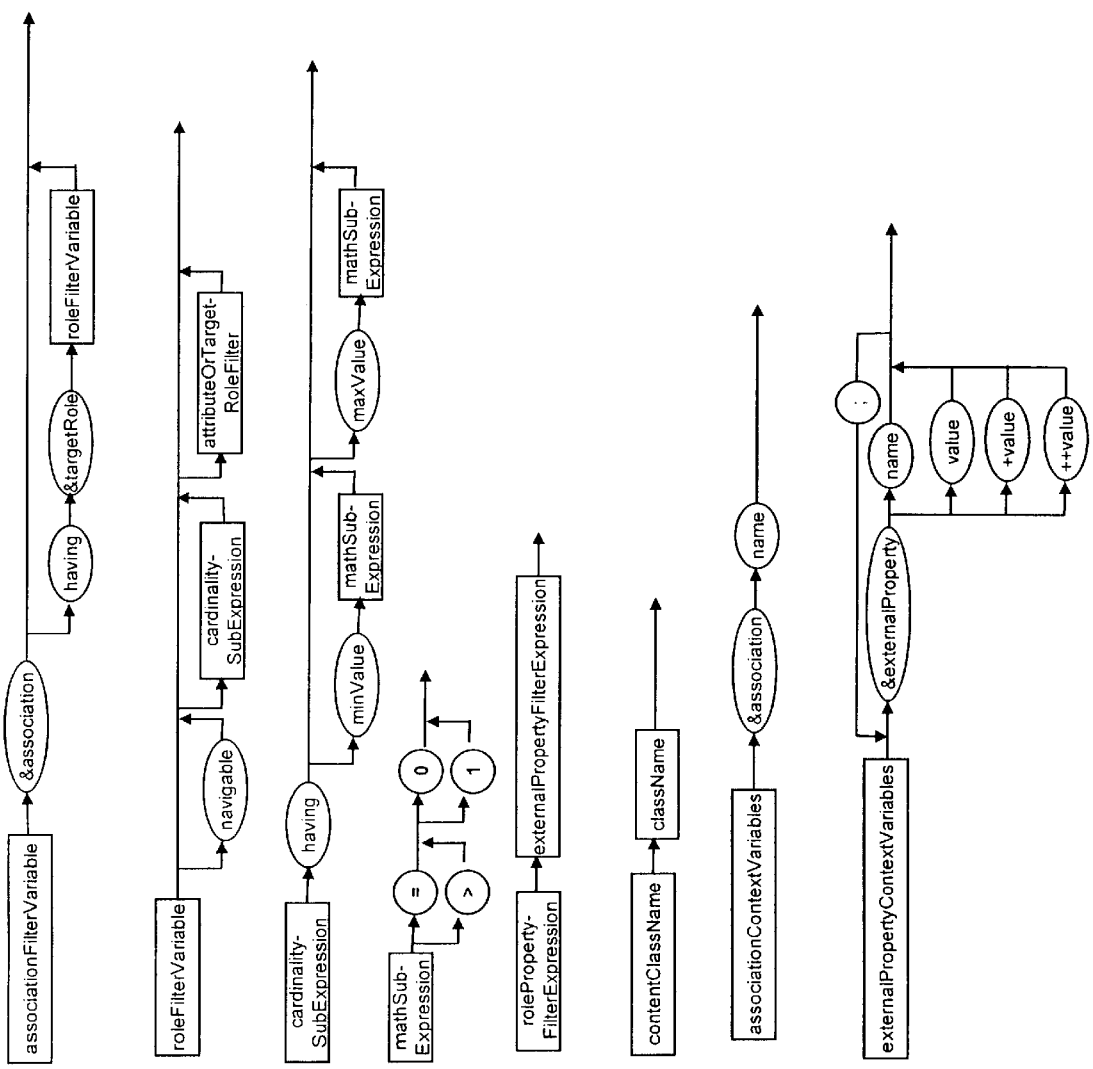

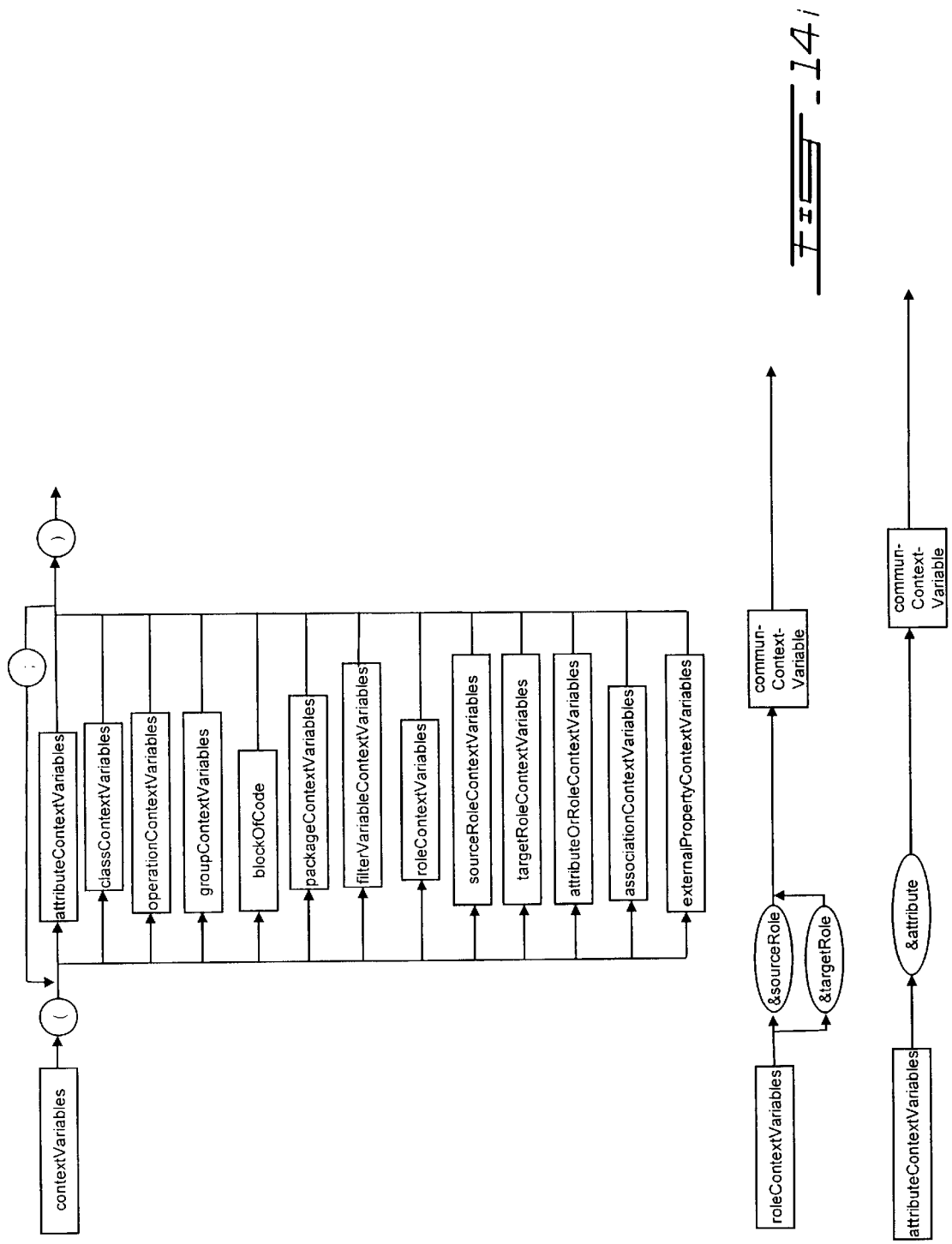

COMPONENT-BASED SOURCE CODE GENERATOR

This application is a continuation of PCT/CA99/00929 filed on Oct. 12, 1999, designating the United States and currently pending in the international stage, which claims priority under 35 USC 119(e) of U.S. provisional patent application serial No. 60/104,014 filed Oct. 13, 1998 and of U.S. provisional patent application serial No. 60/145,214 filed Jul. 23, 1999.

FIELD OF THE INVENTION

The invention relates to source code generators, more specifically to source code generated in the context of component-based programming. In particular, using a set of generation instructions and parameters, the generator produces nearly-repetitive and repetitive source code, ready for use by the developer.

BACKGROUND OF THE INVENTION

Software development processes have changed dramatically in recent years as a result of the increasing usage of object-oriented models for programming, project management, and systems integration.

Enterprise applications are large, complex systems that turn abstract business practices into specific processes and event-driven interactions. These applications form the core of an organization's methods.

Firms can capture and distill these "best practices" in a number of ways. In many cases, the creation of custom software for the entire organization is both unprofitable and beyond the capabilities of the enterprise. As a result, these companies turn to enterprise application software vendors for software solutions. Variously referred to as Enterprise Resource Planning (ERP, from vendors like Peoplesoft and SAP), Customer Relationship Management (Vantive, Clarify, Siebel) and Professional Services Automation (Niku, Visto), these systems quite simply run the business.

Each company is different, however, and these differences are what make each firm competitive. To translate their distinct competencies into electronic processes, companies must tailor their enterprise applications to the way they work. This means tuning, changing, and growing the applications over time.

One approach to this is known as "parameterization". In parameterization, trained ERP technicians configure many parameters and variables in order to tailor the behavior of the application to the nature of the business.

A second approach to modifying existing enterprise applications is to take an existing, generic application and to modify its source code directly. Until recently, a company that needed a highly specialized application because of its unique business practices was faced with paying a license fee and rewriting huge volumes of code from one of these generic applications.

Companies use source code customization as a response to the lack of control and customization afforded them by off-the-shelf applications. Similarly, they use parameterized ERPs as a response to poor maintainability and complex coding of licensed software or internally developed systems. A powerful alternative to these two approaches is the object-oriented framework approach.

Application development always starts from a set of incomplete, imprecise, and sometimes contradictory or inconsistent requirements. It is a difficult task for the developers and analysts of a complex system to clearly define from the outset what is being built.

Object-oriented programming methodologies strive to correct this imprecision through a more accurate modeling of the real world. As a successor to procedural models of coding, object-oriented techniques create a common vocabulary and well-defined boundaries in order to ease the integration of disparate objects. This helps developers define the scope and interaction of an application as a set of discrete components, improving design and facilitating subsequent modifications to the software.

Developers and systems analysts use high-level design tools called modeling tools to describe the business purpose of an application in a logical way that is abstracted from the physical implementation of the specific programming language, operating system and hardware on which the application runs.

Having an abstract description of the application reduces the burden of creating and maintaining the various software iterations it will undergo in its lifetime. If the job is to locate a piece of functionality in a million-line program, the guidance a model can provide becomes invaluable.

To promote a consistent methodology among modeling vendors, the industry has developed the Universal Modeling Language (UML) in order to standardize the elements used during the analysis and design of applications. The wide acceptance of UML and the emergence of component-based development have made the use of modeling tools the starting point to any object-oriented development.

Rather than designing an application from scratch, companies develop multi-tier e-commerce applications that make use of framework-based solutions offering services like persistency, security and transactions. A specific framework is an object-oriented abstraction which provides an extensible library of cooperating classes that make up a reusable design solution for a given problem domain. In essence, a framework offers a generic solution for which developers need to implement specialized code acting as component-to-framework integration code in each component in order to specify its particular process in the framework.

The framework approach is a dramatic improvement to the informal alteration of licensed, procedural source code. Frameworks leverage capital-intensive software investments through re-use, and provide a much higher-level application programming interface so that applications can be developed far more quickly.

When a commercial framework is customized or when new functionality is added to an in-house framework, changes are often required in the component-to-framework integration code for all participating components. Maintaining the code over the course of such changes is a tedious, error-prone process. With the popularity of framework-based solutions, it is also an increasingly large part of a developer's work. Even when this code is produced by a code generator, developers still have to manually change the generated integration code in every component participating in a given framework because code generators cannot be customized to the degree where company requirements are properly implemented inside the framework. Also, most frameworks prevent a company from centralizing and capturing their corporate repository data because typical code generators are seldom well integrated with a modeling tool.

Frameworks are not only used to build integrated business applications in any industry, but also in the development of: user interfaces, graphics libraries, multimedia systems, and printing solutions; low-level services such as drivers and network protocols; common sets of infrastructure services such as those provided by the Enterprise JavaBeans™ Component Model and CORBA (short for Common Object Request Broker Architecture) Object Services and development tools that further speed application creation.

Because a framework links software components with a high-level generic solution, it is imperative that the framework and the components remain synchronized. This is generally achieved by modifying both the framework and the components manually.

In some specific cases, however, information within the modeling tool can be used to generate portions of the integration code, without manual intervention. This is known as code generation. Code generation systems promise to streamline application development by letting developers work at a more abstract level in their design.

Unfortunately, typical code generators tend to generate incomplete code that must be manually altered or even discarded entirely.

The two most time-consuming repetitive tasks for a developer are: repetitive coding methods, such as writing the specialized software methods associated with each property of a component known as 'get' and 'set' selectors and nearly-repetitive coding of specific methods that the framework calls. When a developer extends the functionality within a framework, it is done by sub-classing one of the existing components and extending its functionality. In order to reflect these changes in the component-to-framework integration code, developers must manually make the changes according to the new functionality. Nearly-repetitive coding is prone to error, and its monotony reduces the satisfaction and productivity of developers.

Typical code generation solutions provided by modeling tools, persistence tools and integrated development environment vendors aim to reduce the impact of repetitive and nearly-repetitive coding, but in doing so they reduce the flexibility that a framework approach affords a developer. For this reason, the developer cannot: change the method name being generated; modify the code being generated for a particular method; generate different content for the same method name, based on contextual information; generate personalized code for in-house developed frameworks; generate a method name across a set of components if it is not pre-defined in a modeling tool for all components concerned and generate derived components with their associated required code for mainstream solutions such as the Enterprise JavaBeans™ Component Model.

There are several ways to produce the code to maintain the integration between a framework and its participating components.

Manual Coding

The simplest method of maintaining an application is to manually code the repetitive and nearly-repetitive portions of the application. While this affords a greater degree of control over the resulting software than typical code generators, it is a costly, error-prone, monotonous technique that puts projects at risk and leads to the dissatisfaction of developers.

Typical Integrated Code Generators

Many modeling tools include integrated code generators. These produce small quantities of repetitive or nearly-repetitive code essentially skeletons of each intended method that guide developers in terms of the format of the method's content. Unfortunately, the resulting code is seldom regenerated without losing any previously inserted manual code which is still required in most cases to fulfill the application's complete functionality.

Controlling the code generation process with such coding tools is a potential workaround to these limitations. Some modeling tool vendors expose their code generation algorithms in the form of a scripting language.

Modifying these scripts will further complicate the development process, however, since the development team will now have to maintain these scripts in order to generate useful code and doing so requires a far deeper understanding of the specific applications and the modeling tool than that required by an object-oriented development environment. Furthermore, by modifying scripts the organization cuts itself off from the vendors' code generator support staff and undermines upgrade efforts as the modeling vendor releases new software versions.

Scripting

In some cases, even without access to a modeling tool's code generation algorithms, a developer can still use a scripting language to actually build a personalized source code generator for a particular target language.

This approach requires skilled development teams, and adds to the burden of development and maintenance. Rather than maintaining code manually, developers must now maintain the scripts that generate the code. Unfortunately, the resulting code is hard to use and difficult to maintain and evolve because the target source code is found in broken pieces inside the scripting language and it must be modified in the proper sequence. This is a problem that extends far beyond the capabilities of these tools. Furthermore, altering the scripts to target a new language or development environment is an intimidating challenge.

4GL

Fourth-generation Languages (4GL) let the developer work entirely at an abstract level rather than coding directly in the target programming language. 4GL systems rely on either the UML notation, a proprietary language or a visual programming environment in order to provide the specifications for generating applications. Unfortunately, the 4GL developer pays a price in terms of code efficiency and the resulting performance since the generated code is not tailored to the specific needs of a given algorithm it cannot be optimized.

Code generated from 4GL tends to be difficult to maintain because of poor integration with existing systems and the use of generated numeric variables. For example, the generated code contains generically named variables (label1, label2, etc.) rather than meaningful names such as 'name' or 'customer number'.

Static Generation Instructions

The static approach begins with the creation of a set of static generation instructions as a piece of parameterized target source code. The generator then replaces any variables found in the set of static generation instructions with information contained in the modeling tool. These set of static generation instructions are static because they access only the same type of information (particular method properties, for instance) that is contained in the modeling tool.

The sets static generation instructions approach does not adapt well to the generation of component-to-framework integration methods because it usually requires information which may be located in either the class, attribute or role. Static sets of generation instructions are often used to develop method skeletons that extract associated properties such as pre- and post-conditions from the model. Methods generated in this manner require manual intervention from the developer in order to complete the method content.

Generators using sets of static generation instructions can also translate programming instructions from object-oriented source code (e.g. C++) into a non-object-oriented source code (e.g. C) using systems such as described in U.S. Pat. No. 5,675,801 granted to Lindsey on Oct. 7, 1997.

Current generation technologies can be illustrated by the schematic block diagram in FIG. 1. A developer utilizes known input means, such as a keyboard 36, mouse 37 or other user interface 38 to interact textually or graphically with visual modeling tool or integrated development environment 30 and to describe the components involved in his application domain model. The tool 30 generates its own internal representation of the model declarations 31. Most parser/generators engines 33 produce generated code by mapping model declarations 31 using their corresponding subset of pre-defined static generation instructions 32, directly into target code 35 or with the use of an intermediate representation like an abstract syntax tree 34. Using this approach, the generator initializes, at any given step of a set of generation instructions, its generator context with the current transversal node of the syntax tree. The generator processes the instructions associated with that node. Although the generation process requires changing the generator context with any unprocessed nodes representing the process to execute, the generator context is static because it does not change during the execution of the generation instructions associated with that node.

A model declaration 31 would include a list of classes, potentially grouped by package name, the description of the operations and attributes for each class, the relationships among classes and potentially, the attributes characteristics associated with a particular framework.

Static generation instructions 32 have been involved in code generation in order to translate what was provided by the developer and expressed in a different representation or abstraction than the target source code 35. Developers do not easily have access to the library of pre-defined templates 32 in order to modify them because they are not used to dictate what code to generate but are indirectly involved based on their relations with the model declarations 31 being translated.

Some application development tools, like those developed with the programming language called Smalltalk, provide a framework for source code generation in which the target source code 35 is created by binding parameterized target source code embedded within one or more Smalltalk operations with values representing a subset of the model declarations 31 provided by the tool and used as input for the application development tool. This kind of source code generation cannot easily be modified by the developer because he has to find out where to make his changes. Also it might not be supported by the tool vendor because he changed the tool's internal source code.

A current technology based on frames generates source code using the concept of an automated assembly line which manufactures software modules. A software module represents a component and it is assembled from a hierarchy of frames. Frames contain data elements and/or methods, expressed in any language and it could be parameterized using frame parameters. Frame parameters are local to the frame that first sets their values. A frame typically initializes (all the parameters) to the default values it uses in order to have ancestor frames setting the parameters that need to be changed by string values representing target source code. This technology makes code generation hard to achieve because the user has to know in advance the portions of repetitive code from the generated code in order to design the frame hierarchies.

FIG. 2. illustrates the sequence of events necessary when using a prior art system. A model 40 is created in a tool. Code 41 is generated, which has low usability as explained earlier. significant amounts of manual coding 42 are necessary to render this code output 41 useful. Names of operations, for example, could be changed to clearly express what they are. Once these manual modifications 42 are done, the final code 43 is ready for use within the system. An example of such a prior art system is found in EP 0,219,993 wherein a system for generating software source code components is described.

SUMMARY OF THE INVENTION

Accordingly, an object of the present invention is to provide a system for automating repetitive developer tasks associated with component development and source code generation requiring a minimum of developer intervention in order to obtain the desired functions.

Another object of the present invention is to provide a source code generator associated with component development which produces source code files which are more complete and more accurately match the desired functions than those produced by using the previously mentioned generators.

Another object is reducing code maintenance activities by regenerating operations. Also, by achieving a greater percentage of generated code, the amount of code that needs to be maintained is reduced because the generated code never needs to be manually altered. Also, the actual number of changes needed in the set of generation instructions is significantly less.

Another object of the present invention is to be able to integrate it with all major visual modeling tools or major integrated development environments in order to avoid capturing the same information in more than one tool.

Another object of the present invention is to provide a user interface tool which lets the developer define textually or graphically what needs to be generated through the use of sets of generation instructions and lets him customize the source code generator options, once the target programming language has been specified to the tool. Once the developer saves sets of generation instructions and generator options into a file, the source code generator tool associated with component development could be invoked in batch mode from a modeling tool or an integrated environments; without any developer interaction.

Yet another object of the present invention is to provide a source code generator tool which generates code for any object oriented programming language or any programming language supporting components.

Also, another object of the present invention is to provide an interface for creating target source code found in each set of generation instructions which requires a minimum of developer intervention to obtain the desired set of generation instructions.

Also, another object of the present invention is to provide traceability between a block of code and its set of generation instructions.

Yet another object of the present invention is to provide a generation instructions editor that meets the needs for editing the source code in a set of generation instructions, which can be used in all kinds of development environments such as web-based servers, framework environments, code generation tools or others.

Sets of generation instructions link the conceptual components in the high-level model to their respective coding implementation and their integration with given frameworks by establishing a reference to several types of properties.

Sets of generation instructions represent target source code that is parameterized with context variables. Each context variable indicates the referenced node (such as class or attribute) and the identifier (such as superclass name, name or type). The superclass name identifier could be used only when the referenced node is a class and the type identifier could be used only when the referenced node is an attribute. Also, the name identifier would give different kinds of results depending on whether the referenced node is a class or an attribute. In other words, the node that is being referenced can vary since the code generator's context is dynamic.

If the generator context contains an attribute of a class, the set of generation instructions can still refer to its class; the identifier called 'name' would return the class name or the attribute name based on whether the referenced node is viewed as a class or an attribute.

Dynamic, context-sensitive code generation techniques generate greater amounts of more usable code because they leverage information within the model during the generation process. If a developer wishes to alter code during maintenance, he or she simply changes the set of generation instructions or the content captured in the class diagram of a modeling tool.

According to a first aspect of the present invention, there is provided a method for generating computer source code in an object-oriented programming language or a programming language supporting components. The method comprises the steps of providing a set of generation instructions, the set of generation instructions comprising definitions of at least two nodes and at least two corresponding node identifiers; target source code parameterized with at least two context variables, wherein each the at least two context variables points to one of the nodes and the corresponding node identifiers and wherein the at least two context variables indicate at least two different nodes, wherein the target source code is a valid syntax statement for the programming language; at least two filter instructions each comprising a selection criterion for selecting at least one of the nodes according to the definitions; and the step of automatically generating, in response to the at least two filter instructions, a plurality of code segments in the programming language by replacing, in the parameterized target source code, the at least two context variables with a value of selected ones of the node identifiers.

Preferably, the steps are repeated until a set of code segments is obtained which defines a plurality of components.

Preferably, the method further comprises a step of selecting the at least one context variable from a list of context variables.

Preferably, the method further comprises automatically generating pointer data, for each the code segment, pointing to locations in the set of generation instructions used in the code segment generating step. Preferably, the pointer data is stored in a separate file from the plurality of code segments or as comment lines throughout the code segments. Preferably, the method further comprises finding at least one portion of the source code requiring a change; using the pointer data from the portion to find locations in the set of generation instructions needing a corresponding change; changing the set of generation instructions at least some of the locations; and repeating the step of automatically generating the plurality of code segments using the set of generation instructions as changed in the previous step.

Preferably, the method comprises at least one of creating, ordering and customizing the set of generation instructions.

Preferably, the method further comprises a step of a programmer translating the at least one set of generation instructions written in a first programming language into a second programming language, whereby the plurality of code segments are generated in a second programming language.

According to another aspect of the present invention, there is provided a computer program comprising code means adapted to perform all steps of the method, embodied on a computer readable medium.

According to another aspect of the present invention, there is provided a computer program comprising code means adapted to perform all steps of the method, embodied as an electrical or electro-magnetical signal.

According to still another aspect of the present invention, there is provided a computer data signal embodied in a carrier wave comprising a plurality of code segments generated according to the steps of the method.

It will be appreciated that the set of templates may specify the creation of components (and also of operations or attributes) not originally intended to be specified in the model declaration data. This is achieved by specifying in the set of templates the creation of components related to components found in the model declaration data. This allows for certain sets of templates to be used to respond to the needs of particular programming frameworks.

An apparatus for generating computer source code in a component-based language is also provided, the apparatus comprising a template editor for creating or customizing sets of generation instructions, a template manager for selecting and ordering sets of generation instructions and setting generation parameters, a source code generator and a source code output, the apparatus can further comprise a pointer data generator and language databases for choosing in which language the generated code segments will be.

Another apparatus is provided for modifying generated computer source code, comprising a source code editor for retrieving the source code, a template manager, a template editor, a source code generator and a source code output.

For the purpose of the present invention, the following terms are defined below.

The term "template" is intended to mean the target source code parameterized with at least one filter variable and at least one context variable.

The term "context variable" is intended to mean a variable which indicates a referenced node and an identifier.

The term "filter variable" is intended to mean a variable which specifies the selected components for which code is to be generated.

The term "object-oriented programming" is intended to mean a type of programming language in which developers not only define the data type of a data structure, but also the types of operations that can be applied to the data structure. In addition, developers can create relationships between one object and another.

The term "component" is intended to mean an entity which has the encapsulation and abstraction characteristics of an object. Additionally, they are part of a technology framework that defines the standards for their structure, capabilities and interaction.

The term "model declaration" is intended to mean a representation which captures the static structure of a system by showing the components in the system, relationships between the components, and the attributes and operations that characterize each class of components.

The term "bind" is intended to mean an association between an identifier or variable and a value for that identifier or variable that holds within a defined scope.

The term "set of generation instructions" is intended to mean a set of instructions comprising at least one template, filter variable and model declaration.

BRIEF DESCRIPTION OF THE DRAWINGS

These and other features, aspects and advantages of the present invention will become better understood with regard to the following description and accompanying drawings wherein:

FIG. 5d illustrates a variable creation flow chart;

FIG. 6 illustrates a flow chart of the generation of source code using sets of generation instructions;

FIG. 7 illustrates a flow chart of the generation of source code using a model declaration and sets of templates;

FIGS. 13a–i illustrate a specific syntax for the model declaration, in Backus-Naur format, that could be used to implement a preferred embodiment;

DETAILED DESCRIPTION OF THE PREFERRED EMBODIMENT

The words component and class are used as synonyms because all implementation languages discussed in the examples (JAVA™, C++ and SmallTalk) share the same meaning for component; i.e. a component is a class.

Figure 1:
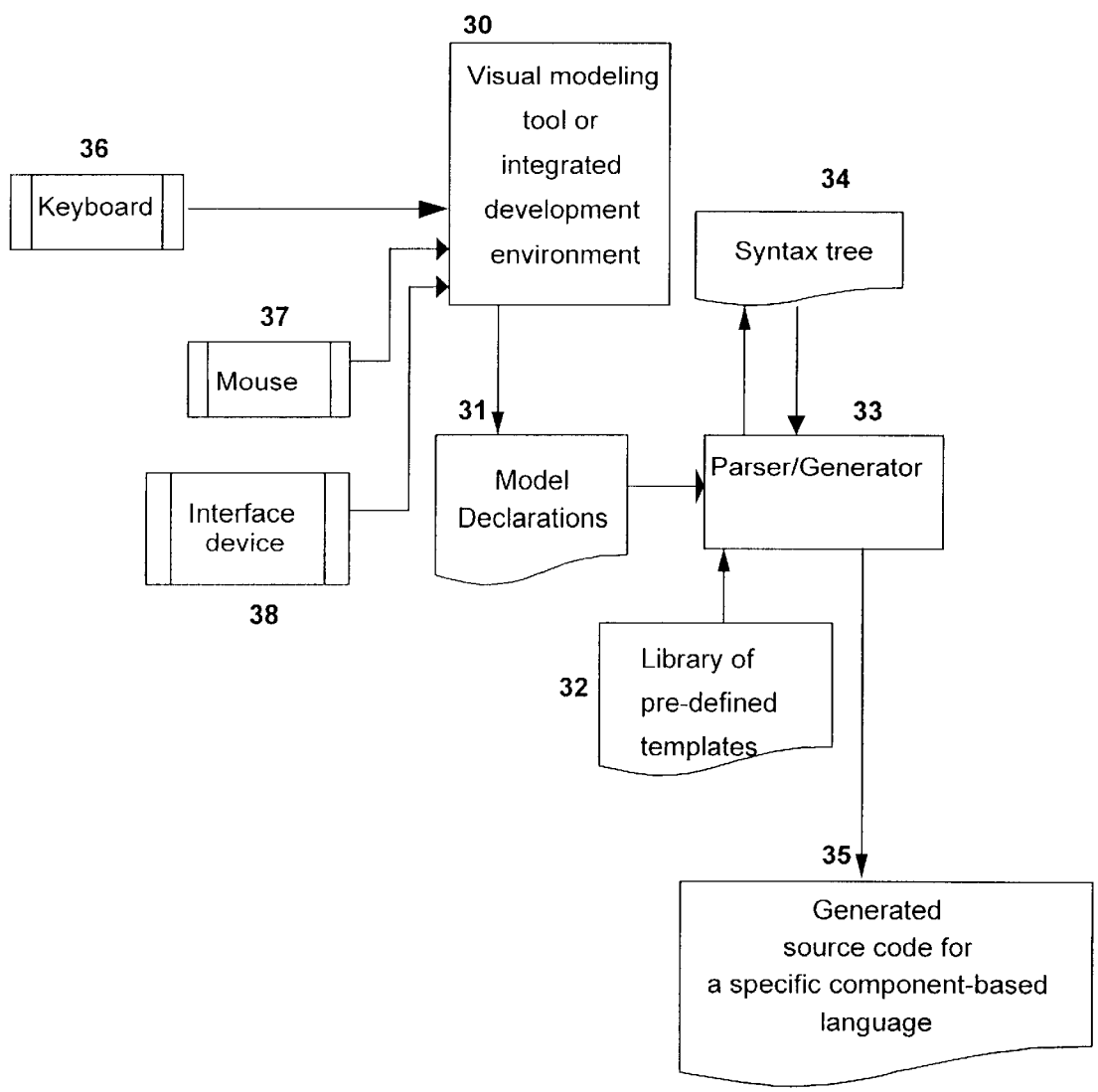
FIG. 1 illustrates a block diagram representing the prior art.
Figure 2:
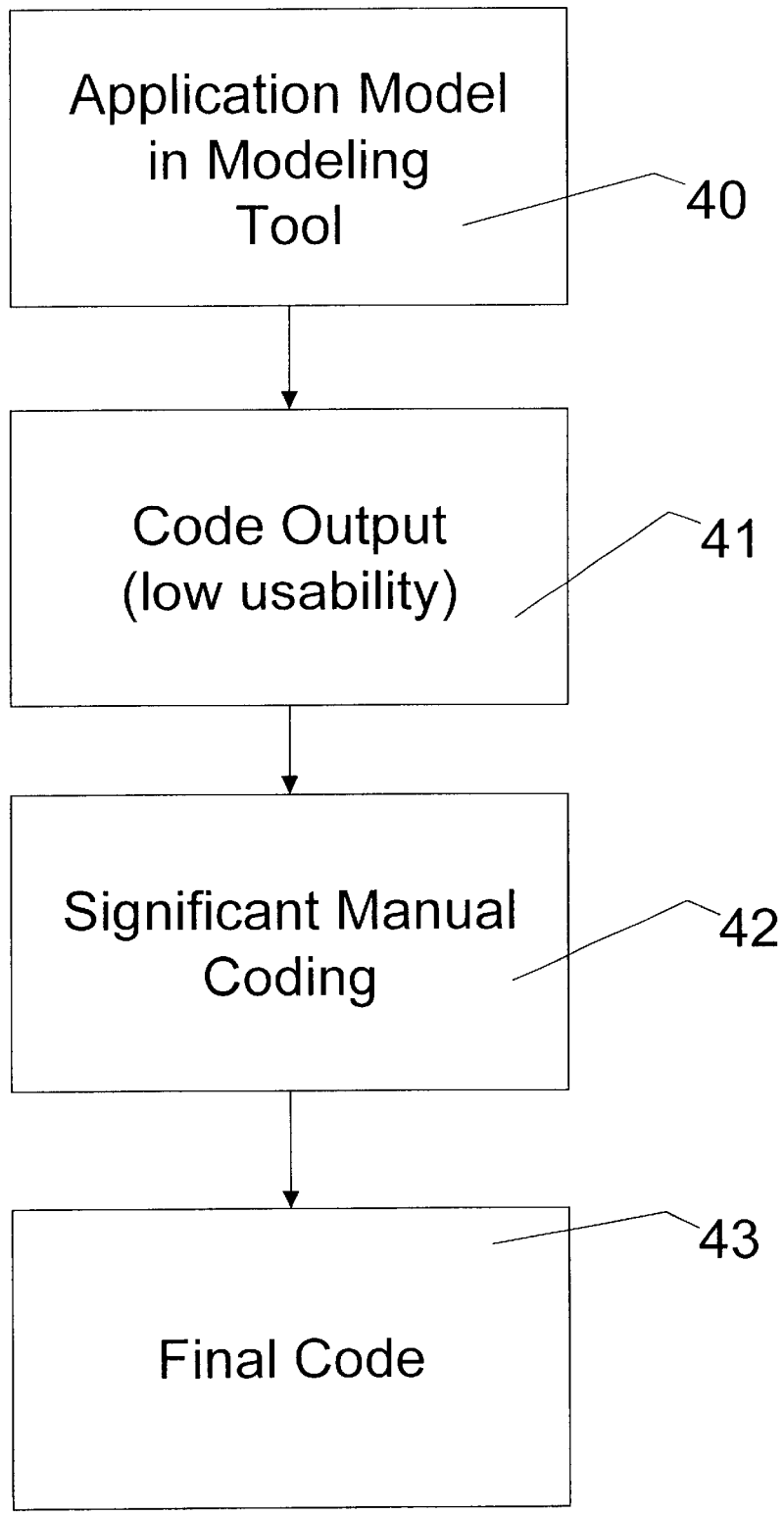
FIG. 2 illustrates a flow chart representing the prior art.
Figure 3:
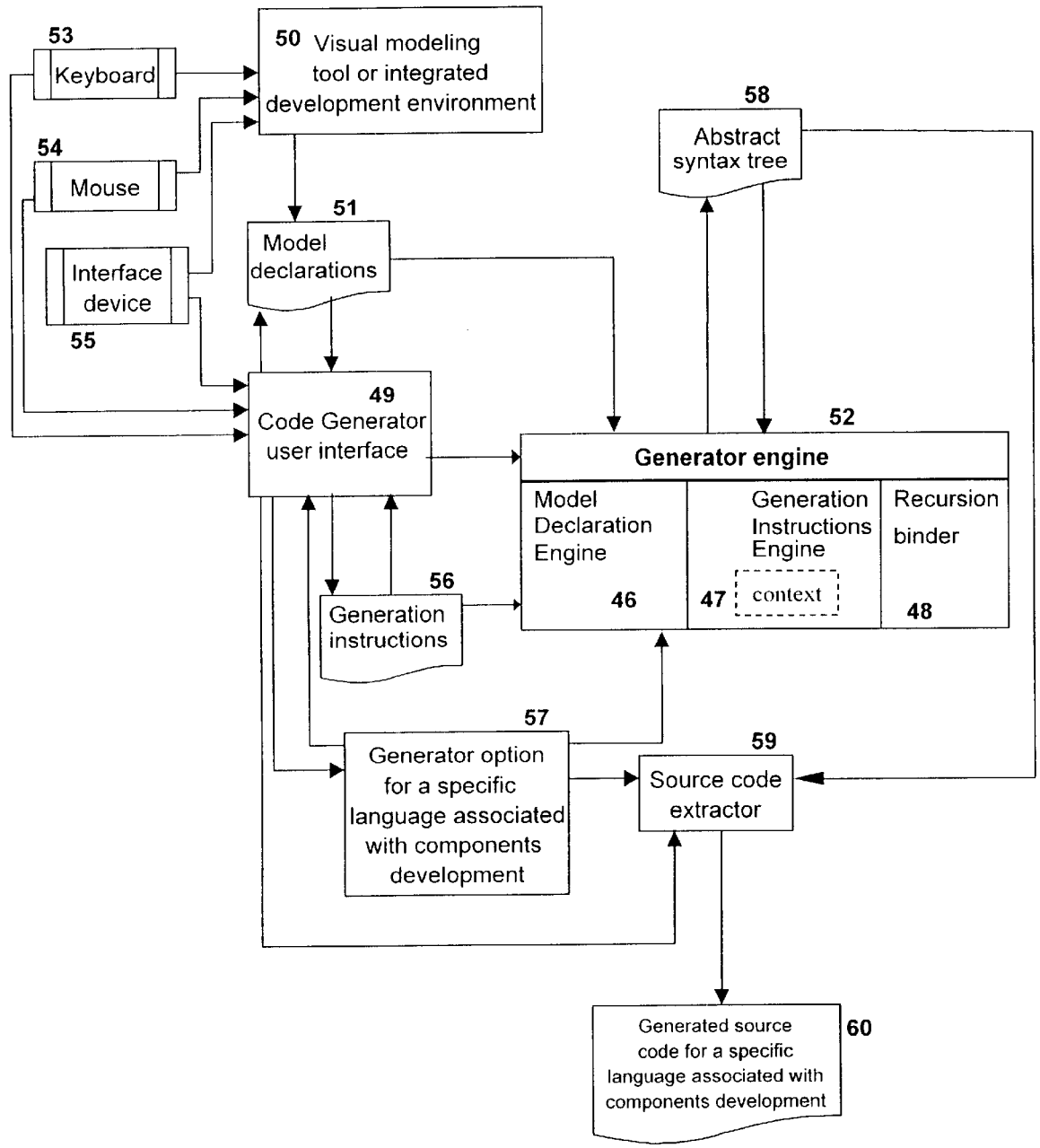
FIG. 3 illustrates a general block diagram of the invention with respect to its environment.

The present invention can be performed in any of a variety of known computing environments and it could be implemented in a system as shown in FIG. 3 and generate source code in a programming language supporting components, such as C++, JAVA™ or Smalltalk. FIGS. 5 to 8 are flowcharts representing the methods according to the preferred embodiment of the present invention.

Figure 4:
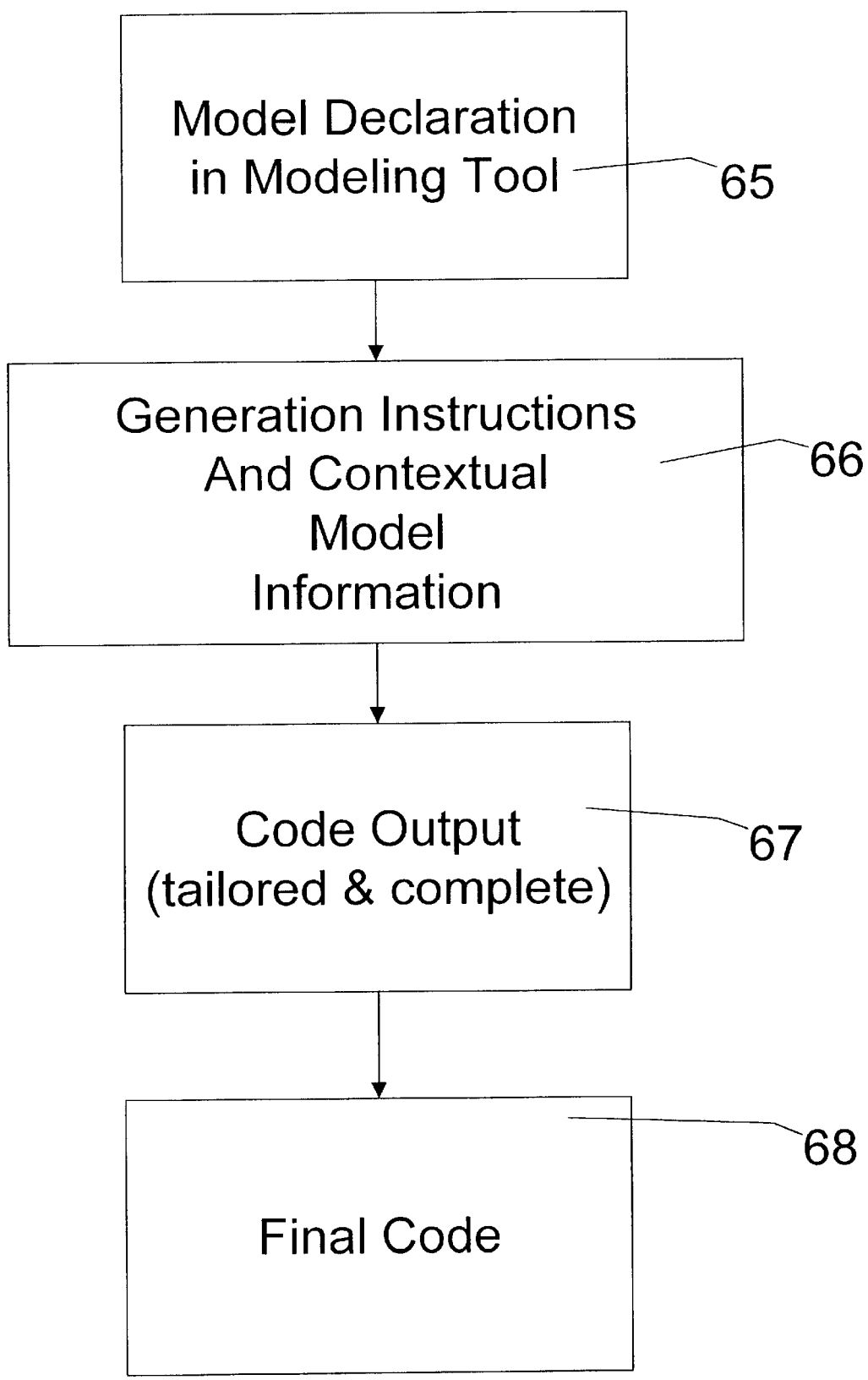
FIG. 4 illustrates a general block diagram of the invention.

FIG. 4 is a flow chart of the general steps of the method. A model 65 is created in a modeling tool 50. Generation instructions 66 are given to a code generator according to a preferred embodiment. A code output 67 is obtained. This code output 67 is tailored and complete. Depending on the quality of the generation instructions, it is possible that the final code 68 does not need to be modified or completed before the developer can use it. In other cases, the programmer will need to intervene to complete the code prior to using it.

Figure 11:
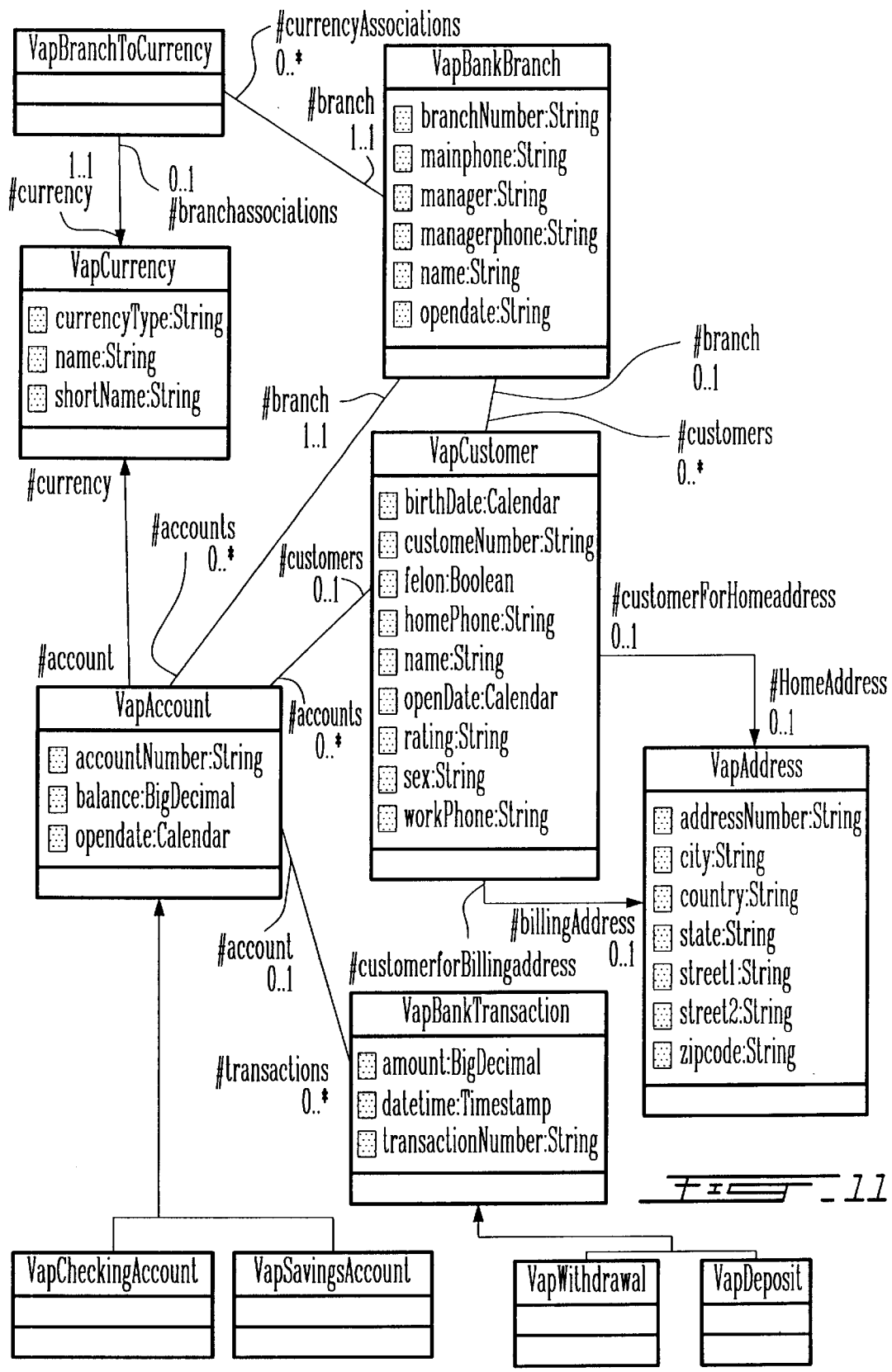
FIG. 11 illustrates a model declaration for a banking application.
Figure 12A:
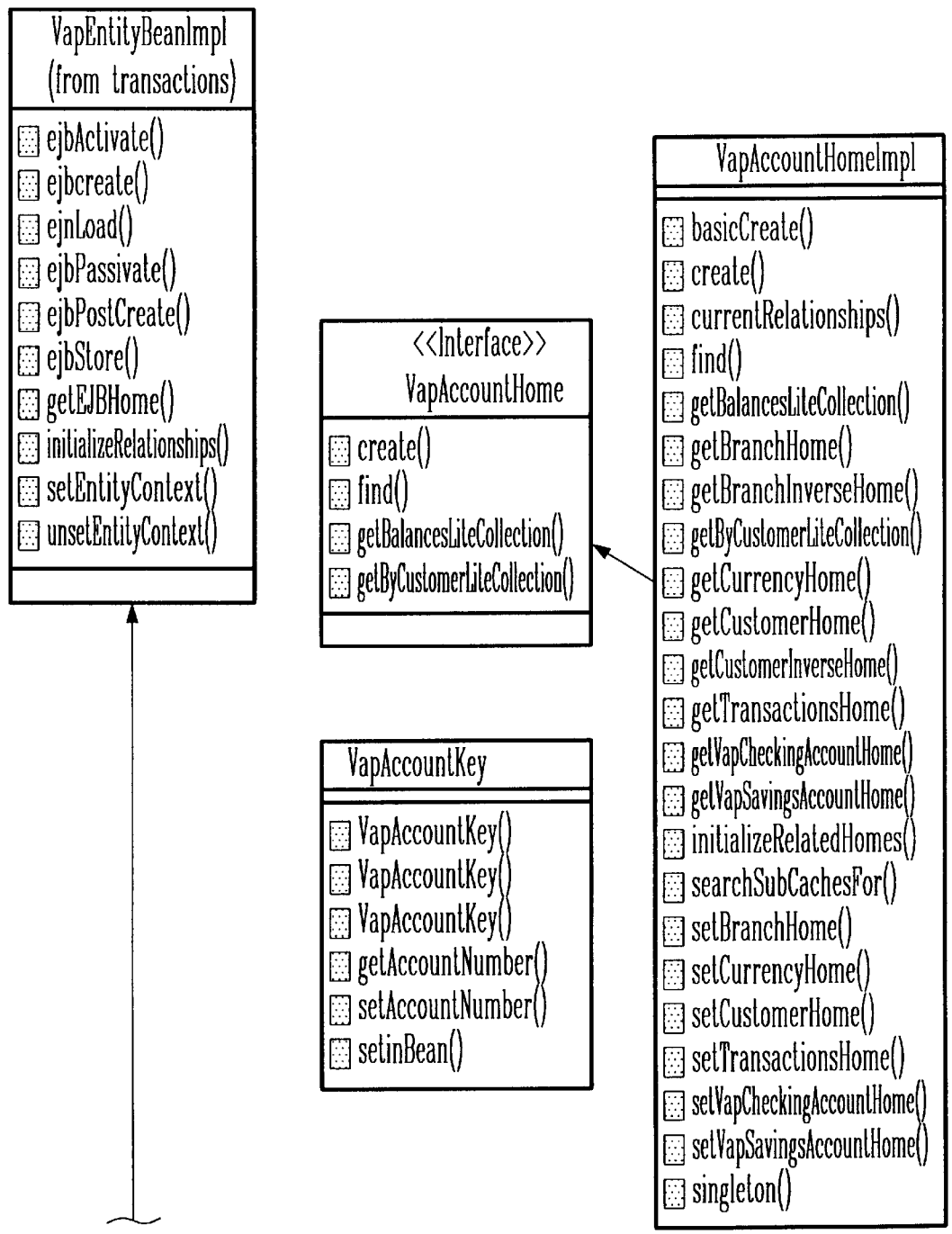
FIGS. 12a–b illustrate EJB classes generated for VapAccount.
Figure 12B:
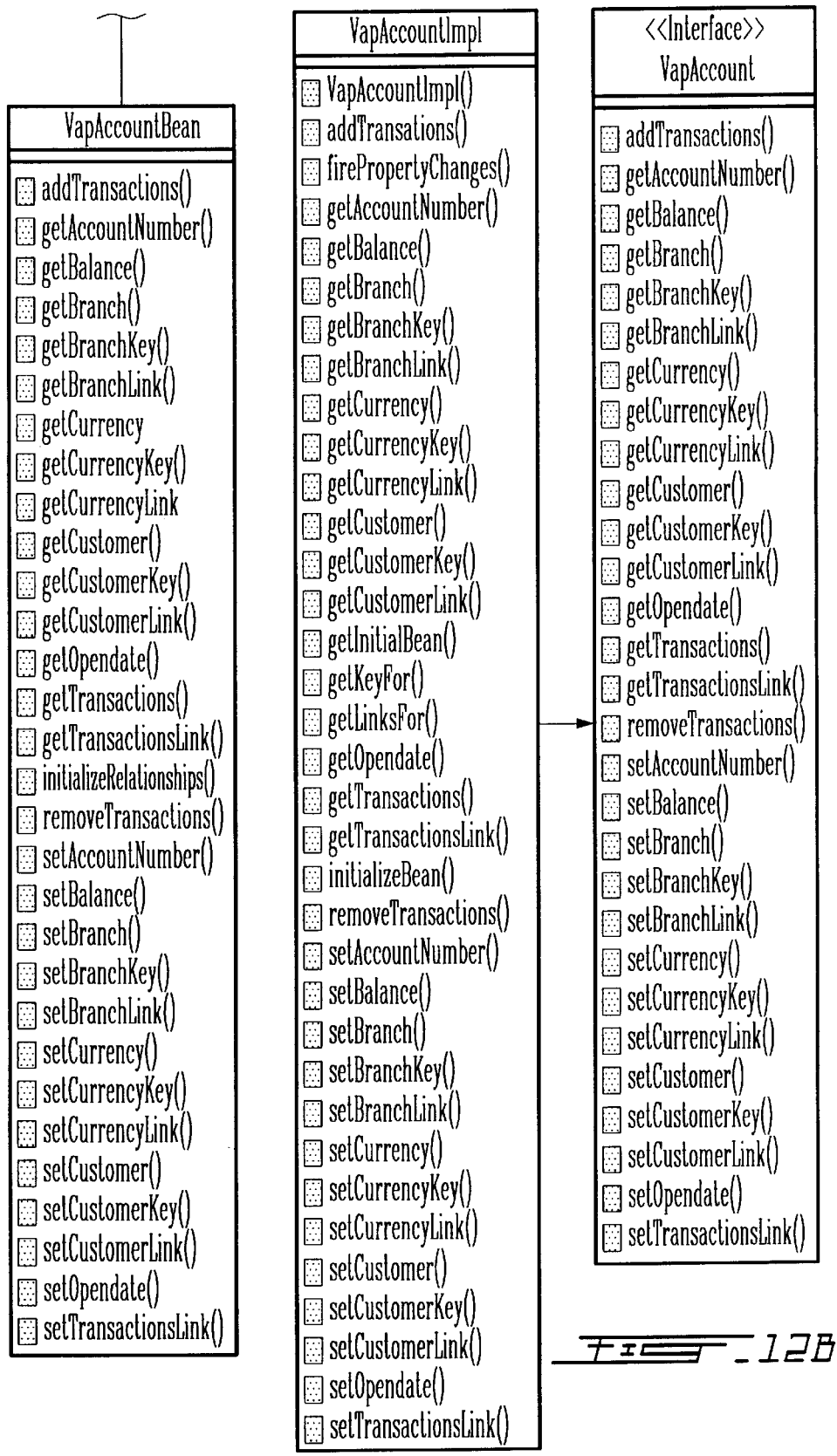
Figure 13A:
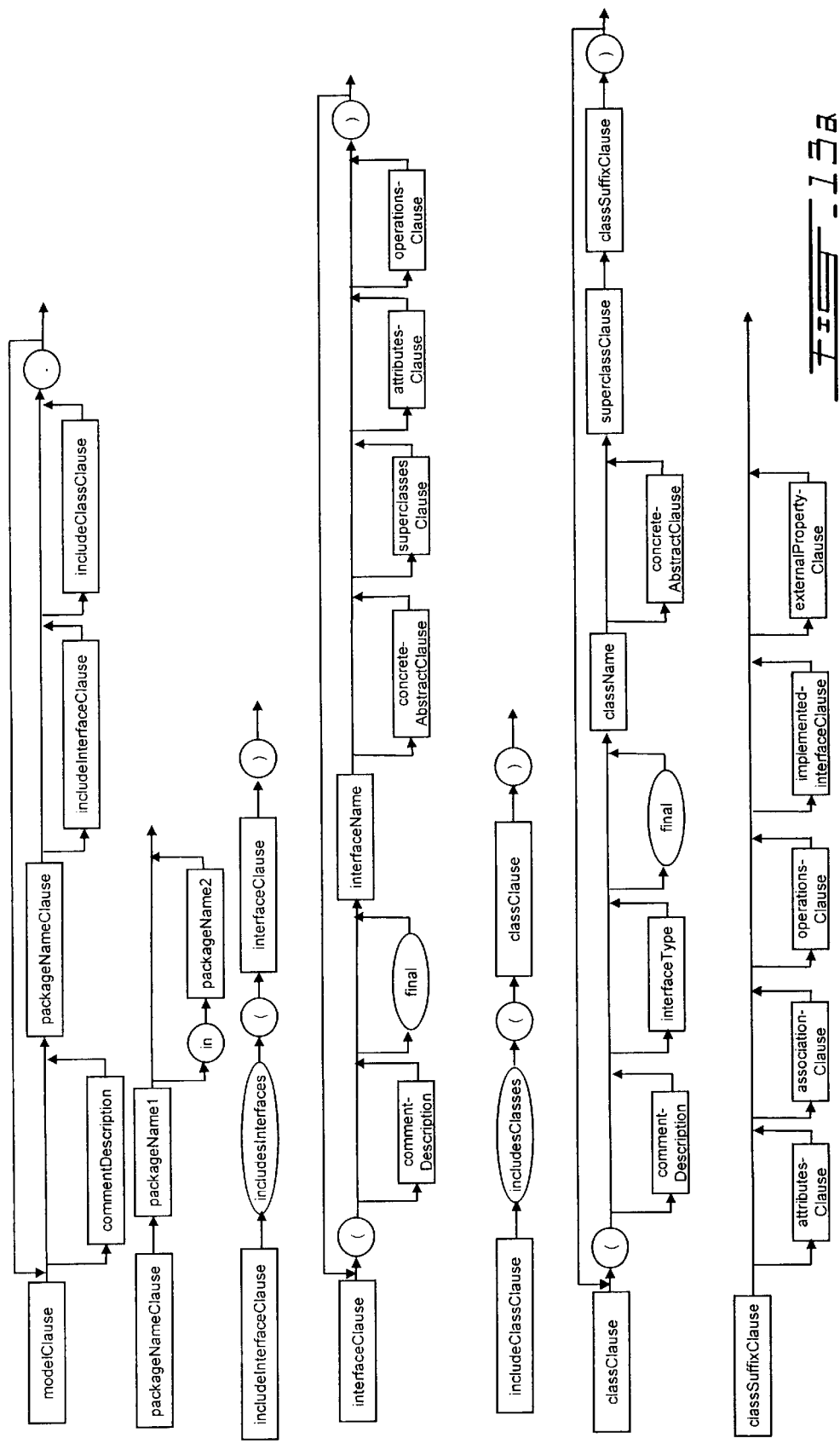
Figure 13B:
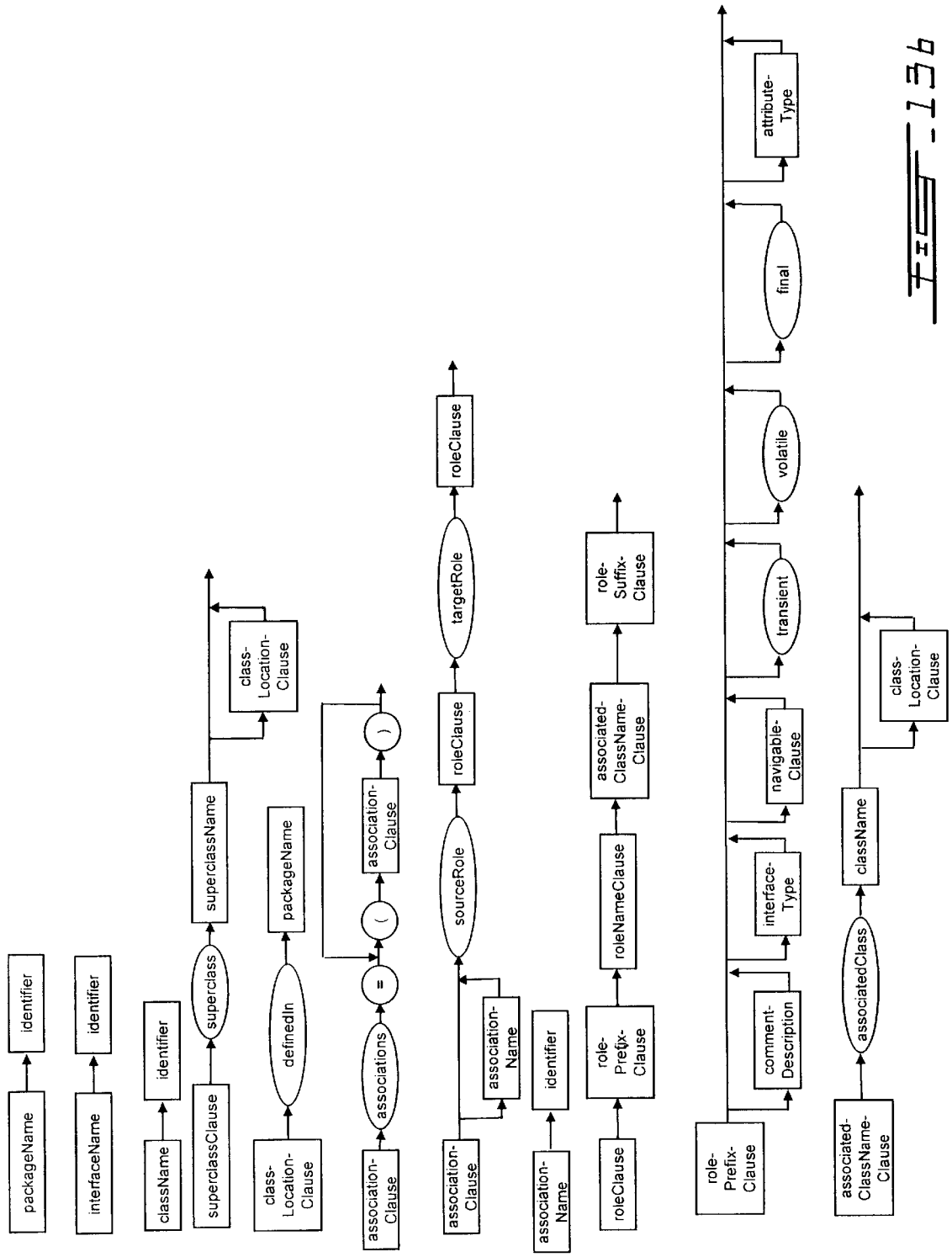
Figure 13C:
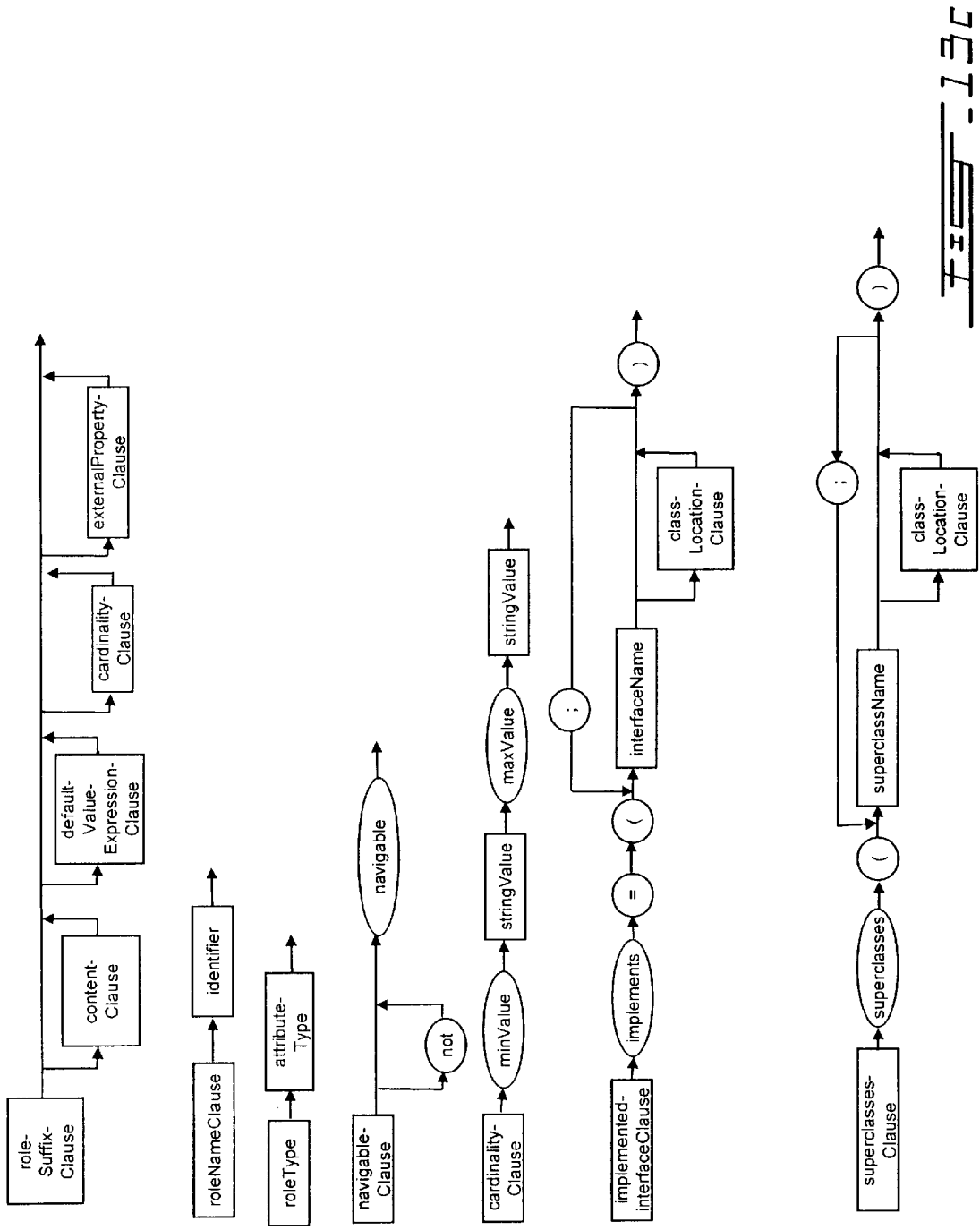
Figure 13E:
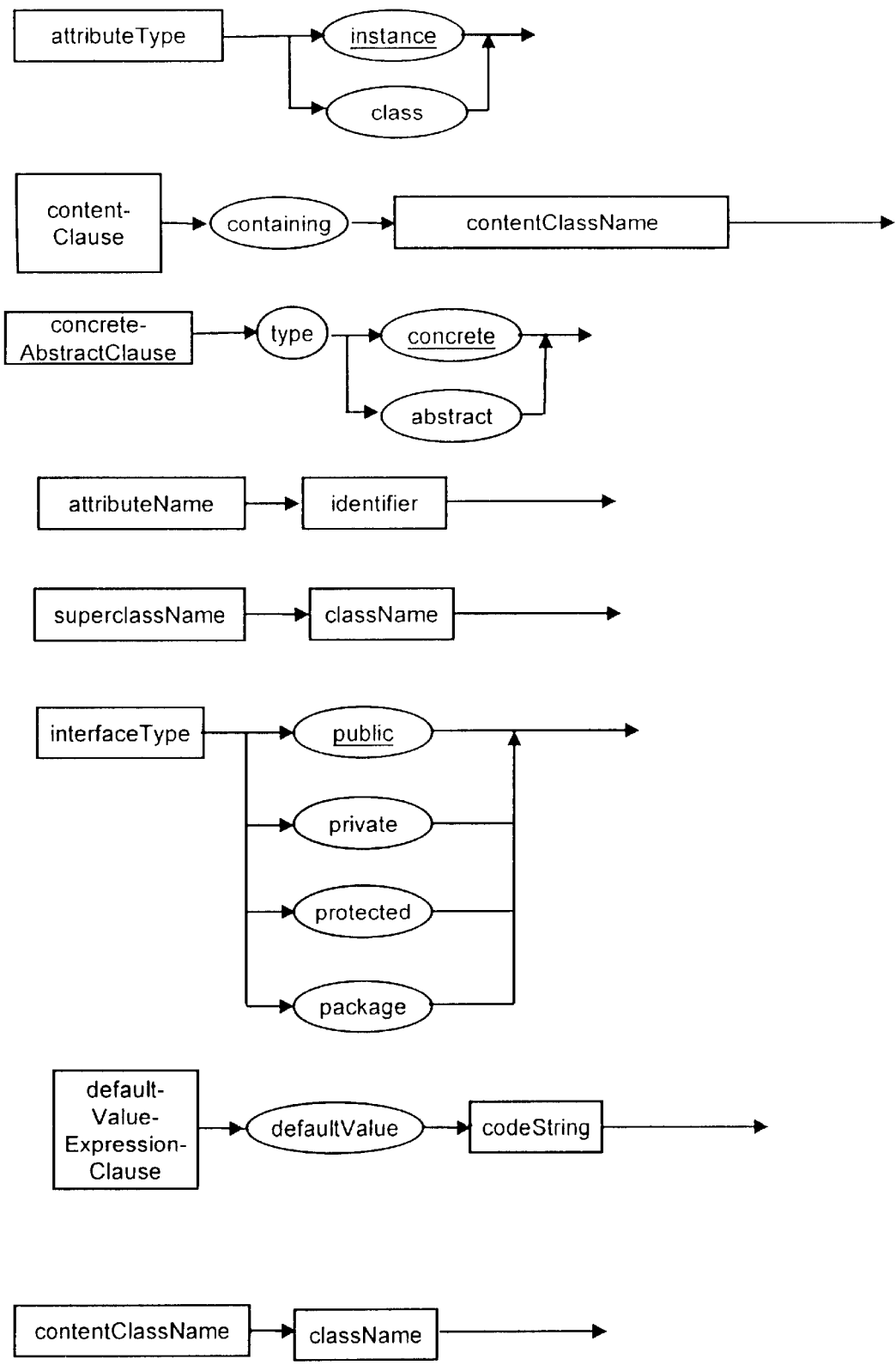
Figure 13F:
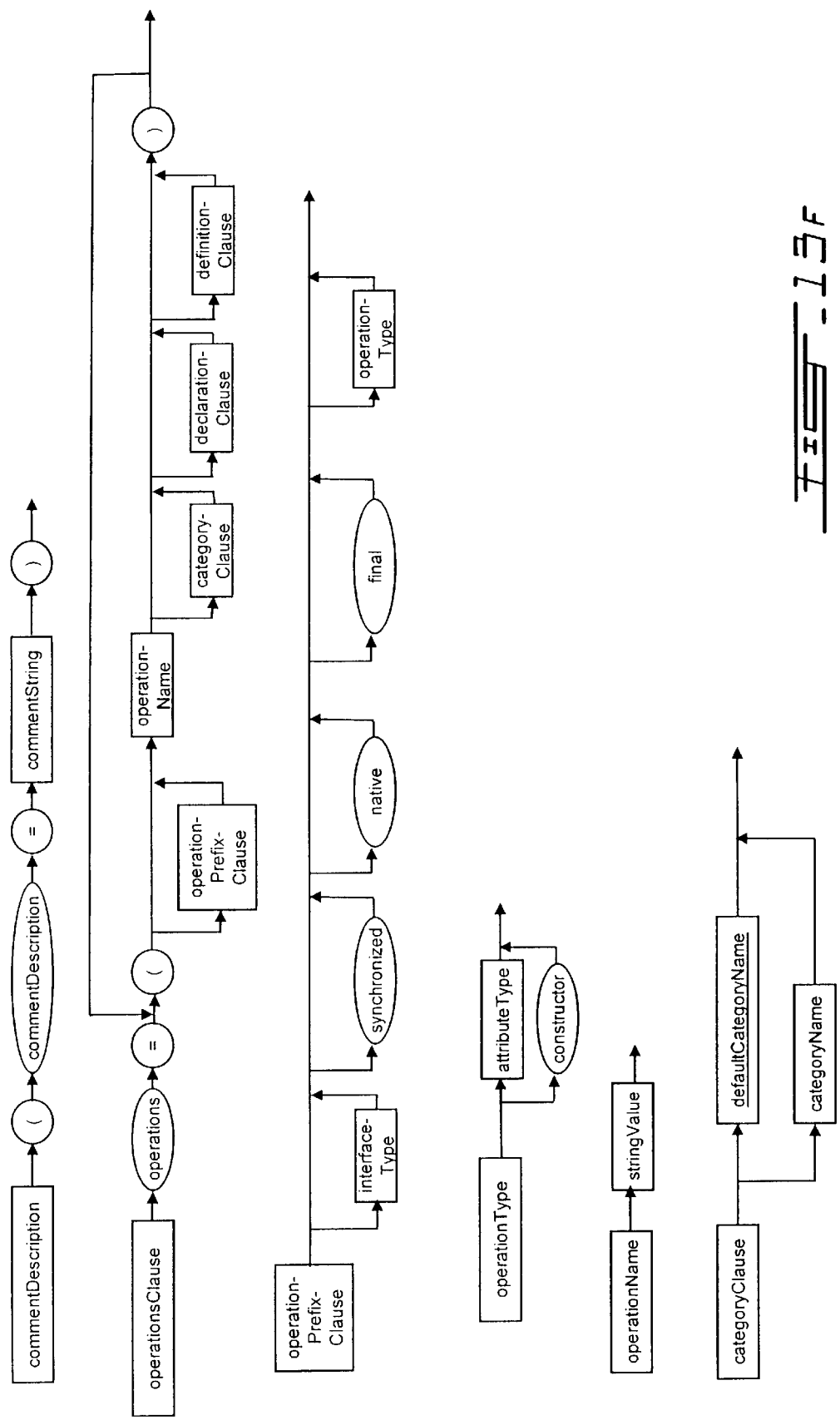

A developer utilizes known input means, such as a keyboard 53, mouse 54 or other user interface 55 to interact textually or graphically with visual modeling tool or integrated development environment 50 and to describe the components involved in a specific domain model (step 75 of FIG. 5a) and its class diagram. Two examples of class diagrams are shown in FIGS. 11 and 12a–b.

The diagrams of FIG. 5 show a particular implementation of a preferred embodiment of the present invention. They illustrate the processing done on the sets of generation instructions. FIGS. 13a–i and FIGS. 14a–n are Backus-Naur diagrams that represent the syntax for the set of generation instructions corresponding to the flow charts of FIG. 5. The syntax is given as a particular example of a preferred embodiment of the present invention. It will be understood that numerous modifications thereto will appear to those skilled in the art. Accordingly, the description of the flow charts and the Backus-Naur diagrams should be taken as illustrative of the invention and not in a limiting sense.

Figure 5A:
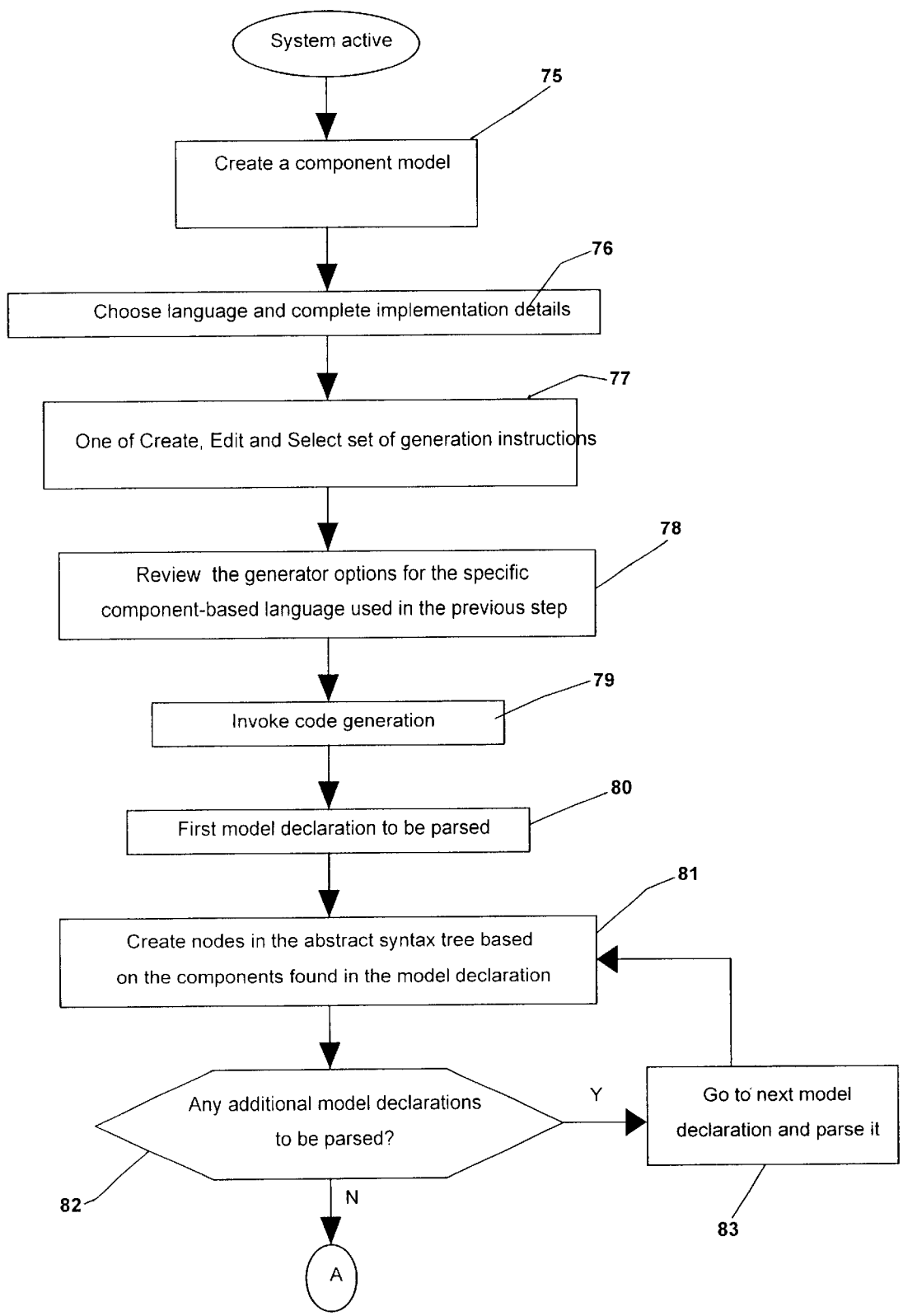
FIG. 5a illustrates a first flow chart of the overview of the source code generation.
Figure 5B:
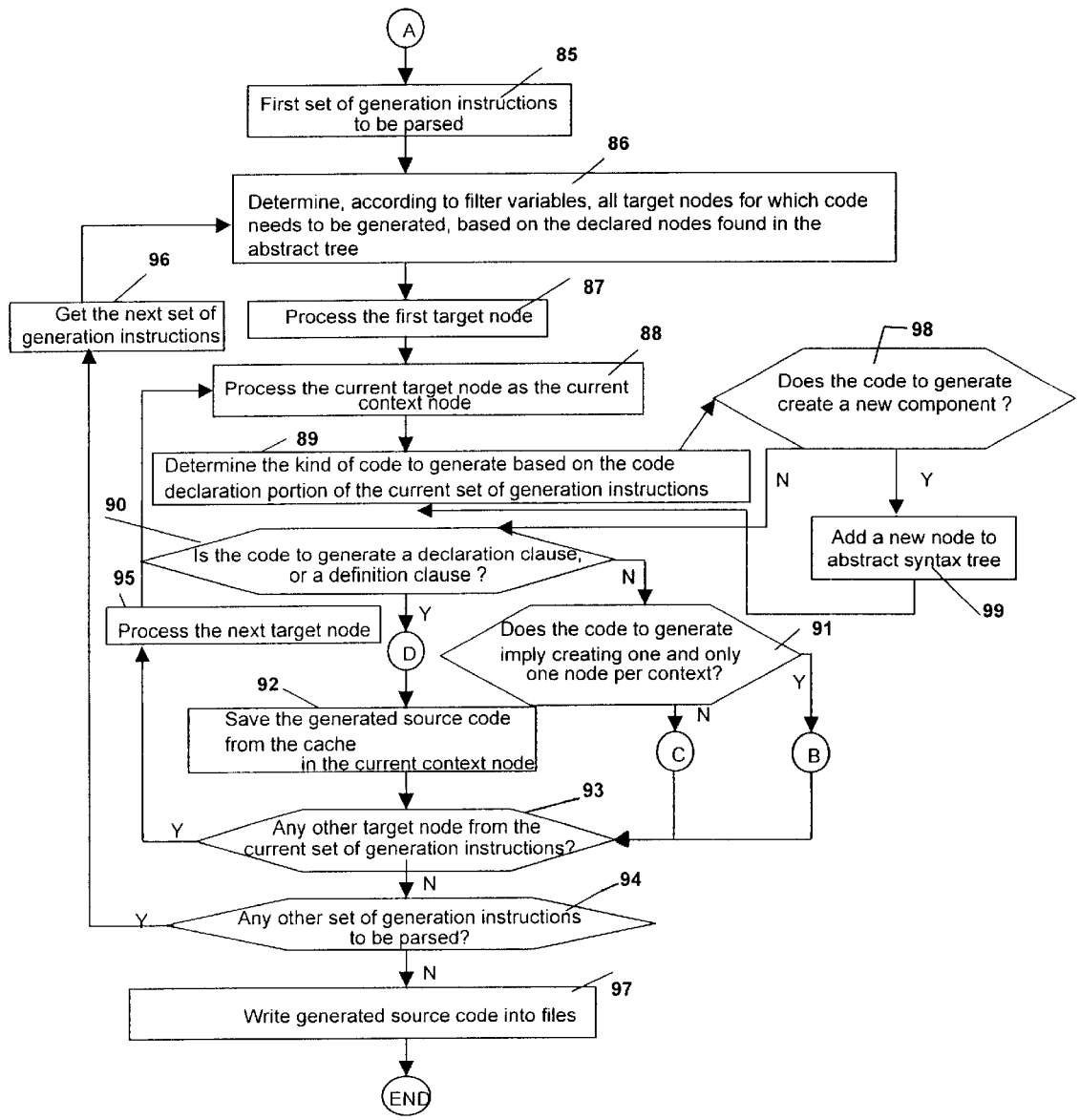
FIG. 5b illustrates a second flow chart of the overview of the source code generation.

As shown in step 76 of FIG. 5a, the developer extends the scope of the information in a typical modeling tool by defining, in the model, groups of external properties' names which capture all kinds of implementation details associated with the current model.

As shown in step 77, the developer makes reference to the target language through the use of codeString found in a set of generation instructions. A codeString is, for example, directly expressed using a subset of valid constructs of the target implementation language, surrounded by two exclamation mark symbols "!" one at the beginning and one at the end of the codeString.

Although in this preferred embodiment, the codeString will be described in a human readable syntax, the use of such symbols could be changed to any symbols or characters or even a graphical implementations to facilitate the usage of the system.

There are two types of codeString: constant and parameterized codeString. The generator engine 52 resolves each one differently. In the first case, the generator engine 52 does not need to manipulate the constant codeString once it is parsed by the Generation Instructions Engine 47. Resolving the constant codeString by the generator engine 52 is done by removing the first and last exclamation mark symbol and returning the codeString. In other words, the generator engine 52 returns the source code as it was coded by the developer. In the second case, a parameterized codeString is a codeString for which the generator engine 52 needs to bind occurrences of the string %n where n is an integer between 1 and 9 with the provided values. While for convenience in this preferred embodiment of the present invention, the codeString has been designed to include occurrences of the string %n where n is an integer between 1 to 9, the developer could choose to integrate other occurrences of different digits and characters with the same result. For example, n could be between 1 and 99 or 1a to 9z.

This binding of the occurrences is done by the Recursion binder 48 which is part of the generator engine 52. If only one value is provided for the codeString, the generator engine 52 will replace all occurrences of %1 with the provided value or engine 52 will generate an error if the codeString has any occurrence of the string %n where n is an integer between 2 and 9 and stop code generation. If two values are provided with the codeString, the generator engine 52 will replace all occurrences of %1 with the first provided value and all occurrences of %2 with the second provided value or it will generate an error if the codeString has any occurrence of the string %n where n is an integer between 3 and 9 and stop code generation. Therefore, if a list of values is provided, the generator engine 52 will replace all occurrences of the string %n with the nth value of the provided list. The value of n must be in the range 1 to 9. The generator engine 52 generates an error if any part of the parameterized codeString contains some %k, where k is an integer greater than the size of the provided list but less than 10. Again, a developer could choose to provide a different set of values for the %k. At last, the generator engine 52 returns the source code made from the replacement of all the %n strings found in the parameterized codeString with the provided values. The resolved parameterized codeString, like the constant codeString, must contain a syntactically valid subset of constructs of the target implementation language and the developer has to write the parameterized codeString with its provided values. Model declarations 51 contain strictly constant codeStrings but sets of generation instructions 56 can contain both types of codeString.

There is no translation between a resolved codeString and the target code. In others words, the developer has the responsibility to write a subset of valid syntax statements for the desired target language inside a codeString. It provides the advantages of delivering efficient code using the developer's style of coding.

The generator engine 52 is therefore composed of a model declaration engine 46, a generation instructions engine 47 and a recursion binder 48. The generation instructions engine 47 retrieves its context from the abstract syntax tree 58. The recursion binder 48 solves the codeString recursively using the abstract syntax tree. The model declaration engine 46 analyzes the model declarations 51 and provides information for the creation of the abstract syntax tree 58.

Using the tool 49, the developer completes the implementation details (step 76) associated with the development domain and the implementation programming language, by specifying a portion or all of the following information.

For each package, the following can be defined: a comment giving its description, its name, its contained package name if the current package is included within another one and a list of descriptions of each class defined in the current package.

For each class or interfaces, a comment giving its description, its interface type value, such as private, public, protected or package, its name, the value stating if the class is concrete or abstract, its superclass name and the package name where the superclass is defined, a list of descriptions of each attribute defined in the current class, a list of description of each external property associated with the current model and a list of descriptions of each operation defined in the current class can be specified. For each attribute, a comment giving its description, its interface type value, (such as private or public), protected or package, its type which says if it is an instance or class attribute, its name, its implementation class name and the package name where the implementation class is defined, its prerequisite typedef value implemented through the use of a constant codeString and associated with its implementation class for programming languages like C++, the attribute class name of the elements contained by itself when it looks like a collection, its default value implemented through the use of a constant codeString, a list of description of each external property associated with the current attribute.

For each association, a comment giving its description, its name, its source role and target role names, prefixes and suffixes, role interface types, values stating if the roles are transient, volatile or final.

For each external property, its name and a list of definitions implemented through the use of a constant codeString can be specified.

For each operation, its interface type value, such as private, or public, protected or package, the value stating if it is a class or instance operation, its name, its category name (used for programming language like Smalltalk), its declaration code, (used for programming languages like C++ for the header file), implemented through the use of a constant codeString with a list of referred classes used in the codeString, its definition code implemented through the use of a constant codeString with a list of referred classes used in the codeString.

When dealing with frameworks, the developer needs to decompose the implementation details into definitions of codeString and group them into external properties. More than one external property name could be needed to implement all the definitions needed for a given framework and one external property could be used to implement multiple frameworks. In most cases, a property value strictly contains numeric or alphanumeric values for the constant codeStrings.

Then, the developer generates the model declaration 51 through the use of the tool 50. The model declaration can either be language-independent or adapted for use with a specific programming language such as C++, JAVA™ or SmallTalk. If the first option is used, the sets of generation instructions 56 must be written in order to use the general model declarations 51. If the second option is used, the model declarations differ in three main aspects: implementation details, codeString and category name and typedef. Package names, class names attributes names and operation names are implementation details that differ because the naming convention is different in C++ versus SmallTalk for example. The codeString is different because the languages do not support the same programming language syntax. The information like category name (used in SmallTalk) and referred classes (used in C++ and JAVA™ to generate, respectively, the include and import statements) is used only when needed.

The developer uses the code generator user interface 49 for the remaining tasks. Once he invokes it, he loads the file containing the model declarations and he loads the file containing the sets of generation instructions 56 if they were already done. In the case of the preferred embodiment, the developer creates the required number of sets of generation instructions 56 to suit his own needs (step 77). The sets of generation instructions can be created, modified, customized or ordered to prepare the set of suitable sets of generation instructions for the generation.

Using the code generator user interface 49, the developer selects the programming language of the target generated code which can either be the same one used by the developer when defining all codeStrings found in the model and sets of generation instructions or a different one if a translation of the sets of generation instructions is requested. Then, he reviews the generator options 57 affecting the generation of code (step 78), through the use of the code generator user interface 49, in order to validate the following settings: the first character of an attribute, a class, an external property, an operation and a package name could either be lowercase, uppercase or either; a list of special characters that could be found in an attribute, a class, a external property, an operation or a package name; the default value used for the interface type associated with a class, an attribute or an operation when it is not explicitly mentioned in the model declaration; the valid interface type valued associated with a class, an attribute or an operation; the list of valid external identifiers; a Boolean value stating if the generator should add to the list of external identifiers when it finds a new one in the model declaration.

The developer reviews the extraction options 57 as well. The settings for three component based languages are given here as an example. As part of the generator "Preferences" submenu of the front-end tool 49, when using C++ as generator the developer changes the following options for the extraction process of the generated code:

"Declaration code directory" is used to specify the drive and the root directory name. By default, the value is d:\include.

"Definition code directory" is used to specify the drive and the root directory name. By default, the value is d:\source.

"File extension for declaration code" is used to specify the file extension of each file name that maps to a class belonging to the current package. By default, the value is hpp. "File extension for definition" is used to specify the file extension of each file name that maps to a class belonging to the current package. By default, the value is cpp.

"One class per file" is set to true by default but it could be changed.

As part of the generator preferences submenu of the front-end tool 49, when using JAVA™ as generator the developer changes the following options for the extraction process of the generated code:

"Root directory" is used to specify the drive and the root directory name. By default, the value is d:\.

"Directories mapping package name" is used to create sub-directory names for each subString found between two periods when it is set to true. The default is true.

"Class extension" is used to specify the file extension of each file name that maps to a class belonging to the current package. By default, the value is JAVA™.

"One class per file" is set to true by default but it could be changed.

As part of the generator preferences submenu of the front-end tool 49, when using Smalltalk as generator the developer changes the following options for the extraction process of the generated code:

"Definition code directory" is used to specify the drive and the root directory name. By default, the value is d:\.

"File extension for definition" is used to specify the file extension of each file name that map to a class belonging to the current package. By default, the value is app.

"One package per file" is set to false by default but it could be changed.

In step 79, the developer invokes the generator engine 52 using the front-end tool 49. Engine 52 begins by parsing the first model declaration 51 (step 80) and creates its repository data (step 81), which is stored in the abstract syntax tree 58. In other words, using the parsed information done by the model parser, the generator engine 52 creates nodes in the abstract syntax tree 58 for every package, class, attribute, external property, association, role and operation found in the model declaration 51 and all the relationships among them described earlier (step 81).

Each node that represents a package, a class, an attribute or an operation has an attribute called definitionText that contains the generated definition source code associated with it. Also, a class, an attribute and an operation node have an attribute called declarationText that contains the generated declaration source code associated with it for programming languages like C++.

In step 81, any declared operation or attribute found in the model declarations 51 becomes an operation or attribute node associated with its declared class node. During that step, the generator engine 52 initializes the attributes definitionText and declarationText with the provided definition and declaration source code by extracting it from their respective constant codeString.

Before determining if there is another model declaration to be processed by the generator engine 52 (step 82) and before parsing it (step 83), engine 52 stops parsing on the first error found and asks the front-end tool 49 to display the error contextually within the model declarations with the token about the error. An error occurs when engine 52 validates the generator and extractor options 57 against the current model declaration or when it finds the same class name defined twice in the same package or the same attribute name defined twice for the same class (mainly due to the fact that the same attribute name is inherited from a superclass).

In step 85, the generator engine 52 parses a first set of generation instructions 56 to determine the target classes or packages it needs to generate code for (step 86) and the kind of code generation to be processed (step 89).

Target classes (step 86) are a subset of declared classes found in the abstract syntax tree 58 or they are derived from that subset. To specify the subset of declared classes in the receiver declaration portion of the set of generation instructions 56, the developer specifies selection criteria associated with the class itself or its attributes, its nodes or its external properties. For example, a developer could select all of the classes by specifying the keyword &classes, all the abstract classes by specifying the keyword classes followed by the keyword abstract, all the concrete ones by specifying the keyword &classes followed by the keyword concrete, all the classes which are subclasses of a given class name by specifying the keywords &classes subclassOf followed by a given class name or all the classes having attributes of a given type by specifying the keywords &classes having attribute of type followed by a given class name.

Any derived class is added 99 to the abstract syntax tree 58 as soon as it is created in order to be retrieved in step 88.

Target packages (step 86) always refer to all of the packages by specifying the keyword &packages because the generated code associated with a package is used indirectly when extracting the generated code associated with one of its contained class (see step 97 for more details).

In step 87, the first target node is processed and it becomes the current class context or the current package context in step 88 depending if the target nodes strictly contains classes or packages respectively. Target nodes represent packages only when the current set of generation instructions 56 generates code for package definition and the parsed keyword used is packageDefinition as explained below.

In step 89, the generator engine 52 distinguishes the types of code to generate based on the following parsed keywords from the sets of generation instructions 56.

The operation keyword indicates to the generator engine 52 that it must process the generated code as one or more operations for the current class context. The generator engine 52 adds the generated code associated with the optional declaredAs keyword to the declarationText attribute of the newly created operation node. Engine 52 adds the generated code associated with the optional definedAs keyword to the definitionText attribute of the same newly created operation node. The generator engine 52 adds the newly created operation node to the current class context.

The classDeclaration keyword forces the generator engine 52 to process the generated code as class declaration for the current class context. This is used for programming languages like C++ for packaging the code located in the header file. Engine 52 adds the generated code to the declarationText attribute associated to the current class context (step 92).

The classDefinition keyword indicates to the generator engine 52 to process the generated code as class definition for the current class context. This is used by any programming language to group attributes and operations definitions belonging to the class (as in C++ and JAVA™). Some programming languages use classDefinition to group only the name of its attributes with its associated class (as in Smalltalk). The generator engine 52 adds the generated code to the definitionText attribute associated to the current class context (step 92).

The packageDefinition keyword indicates to the generator engine 52 to process the generated code as a package definition for the current package context. Programming languages like C++ do not use package definitions because the code is extracted to files using only one class per file. Programming languages like JAVA™ or Smalltalk use it. The generator engine 52 adds the generated code to the definitionText attribute associated to the current package context (step 92).

The developer must write his sets of generation instructions 56 in the following sequence. First, the sets of generation instructions using the keyword classDeclaration or classDefinition could be specified in any order but they must precede those which have the keyword operation or packageDefinition. Then, sets of generation instructions using the keyword packageDefinition must precede those using the keyword operation. Finally, sets of generation instructions using the keyword operation are included.

The generator engine 52 generates an error if one of the above keywords is out of sequence.

In step 98, the generator checks if the code to generate creates a new component. If it does, a new node is created 99. Three types of nodes can be created: a new node for a derived class, a new node for a derived interface and a new node for a derived attribute. For the new nodes, a comment description can be included, an interface type, a value concrete or abstract and a value final can also be included. For a derived class and a derived interface, a class location clause, a superclass location clause, an interface clause can be defined. For a derived attribute, a value transient, a value volatile, an attribute type, an attribute content clause and an attribute class name can be included.

If the code to generate does not create a new node, a check to the type of code to be generated is done in step 90. The generator engine 52 distinguishes the different types of set of generation instructions based on the parsed keyword.

Once in step 91, the generator engine 52 determines if it has to create one and only one operation per class based on the absence of an operation name variable. An operation name variable is similar to a class name variable because any occurrence of the string %1 in the operation name variable is replaced by the provided value. The single and variable creation process will be described in more detail with respect to FIG. 5c and FIG. 5d respectively.

In step 92, the generator engine 52 saves the generated source code from the cache in the current context node. The process used to generate the source code in the cache will be described in more details when the resolution of variable operations will be described using FIG. 5e. If the current set of generation instructions has the packageDefinition keyword then the current context node is a package node. If the current set of generation instructions has the classDefinition or classDeclaration keyword then the current context node is a class node.

In step 93, the generator engine 52 determines if there is another target node to be processed with the current set of generation instructions and processes it in step 95.

In step 94, the generator engine 52 determines if there is another set of generation instructions to be processed and processes it in step 96.

Engine 52 stops code generation on the first error found and asks the front-end tool 49 to display the error contextually within the sets of generation instructions with the token about the error. An error also occurs when engine 52 validates the generator and extractor options 57 against the current set of generation instructions or against one of the provided values and the result is not valid.

Once the generator engine 52 successfully completes code generation, the front-end tool 49 invokes the source code extractor 59 in order to retrieve the generated source code 60 from the nodes defined in the abstract syntax tree 58. Each source code extractor 59 has its own way of exporting the code into a file and it reads the generator and extractor options 57 before starting the extracting process (step 97).

The steps done by the generator will now be explained using three examples in C++, JAVA™ and SmallTalk.

The C++ source code extractor 59 does the following steps in order to extract the generated code. First, it creates the include sub-directory based on the value specified in the generator and extractor options 57. That directory will contain the header files (file names ending with the extension hpp). Second, it creates the source sub-directory based on the value specified for the generator and extractor options 60. That directory will contain the definition files (file names ending with the extension cpp). Then, for each class node found in the abstract syntax tree 58, it creates a file called <className>.hpp in the include directory only if its declarationText attribute is not empty and writes its content into the file. It creates a file called <className>.cpp in the source directory only if its definitionText attribute is not empty and writes its content into the file.

The JAVA™ source code extractor 59 extracts the none-empty content of the attribute definitionText of each class and puts it in the file having the same name as the class and having java as file extension. First, it creates the sub-directory where the class is defined based on the value specified in the generator and extractor options 57. Second, it extracts the contents of the attribute definitionText of its package name and writes it into the file. Then, it extracts the content of the attribute definitionText of the class and writes it into the file.

It is important to know that any Smalltalk environment supports the definition of classes and operations by reading a text file having a specific format called file out format and the Smalltalk extractor uses it when extracting the source code.

The Smalltalk source code extractor 59 does the following steps. First, it creates the file out directory based on the value specified in the generator and extractor options 57. Second, it creates one file per package or one overall file depending on the value specified in the generator and extractor options 57. Then, for each class, the extractor writes the content of the attribute definitionText of its package if it differs from the previous processed class, writes the class declaration found in the attribute declarationText of the class, iterates a second time on each class in order to write the content of each group of operations and, finally, the Smalltalk extractor will write the exclamation character "!" to delimit the Smalltalk code and some headers to specify if an operation is defined as class or instance and public or private.

Figure 5C:
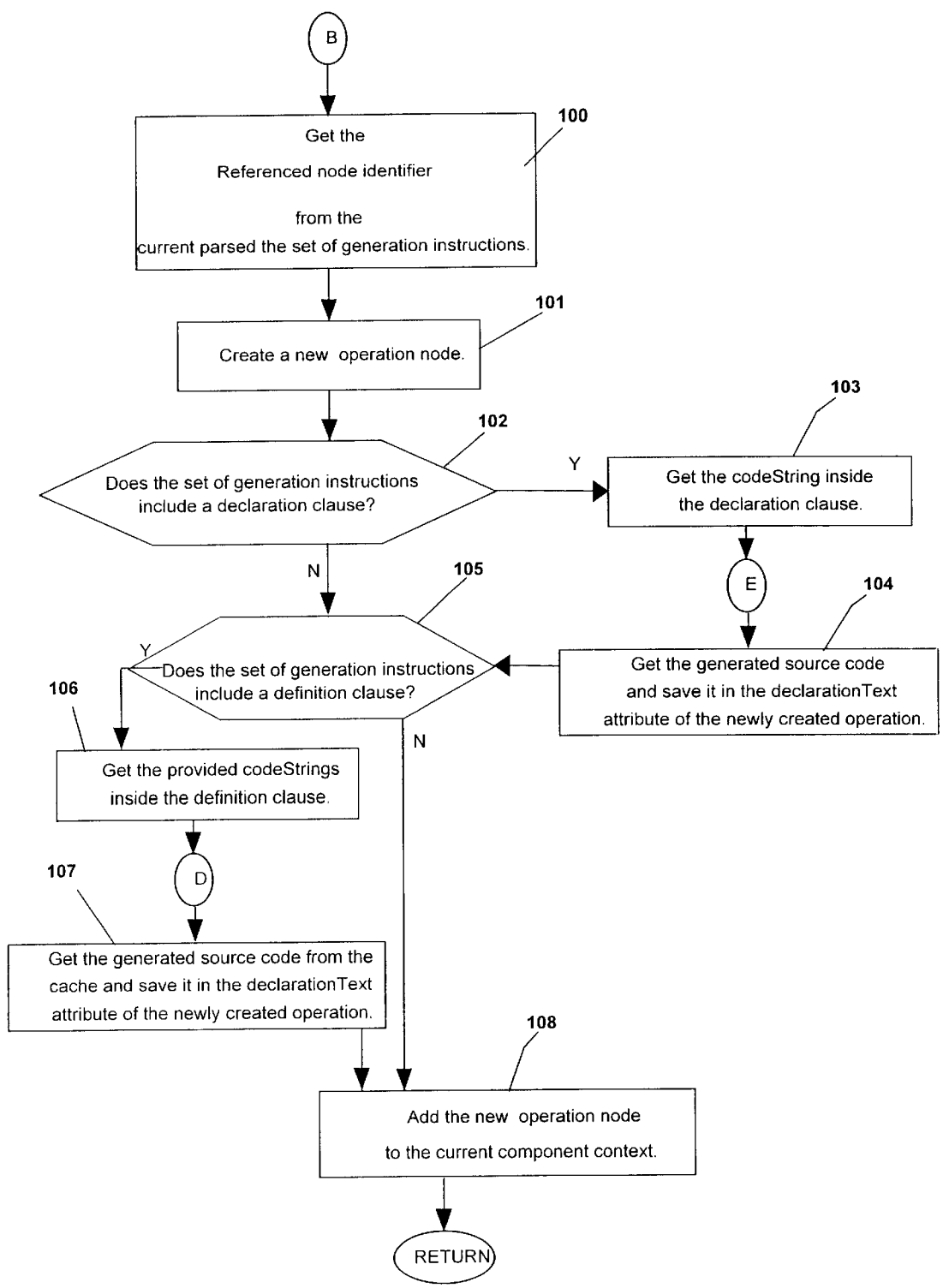
FIG. 5c illustrates a constant creation flow chart.

Referring to FIG. 5c, the constant creation will now be described. The developer needs to write the following information when he wants to generate one operation per target class. What must be specified is an interface type value of the operation using one of the following keyword values: public, private, protected or package, an operation type value using one of the keyword values &instance or &class, an operation name, an optional category name used for programming language like Smalltalk, an optional declaration clause used for programming languages like C++ and specified by the developer using the declaredAs keyword and implemented through the use of only one codeString with an optional list of referred classes used in the codeString and an optional definition clause specified by the developer using the definedAs keyword and implemented through the use of one or more codeString with an optional list of referred classes associated to each codeString.

The generator engine 52 gets the parsed information (step 100) and creates a new operation node (step 101) which will be added to the current class context in step 108. The generator engine 52 does not signal an error if the declaration and definition clause are omitted. However, one of them has to be provided if useless sets of generation instructions 56 are unnecessary. Most of the time, the declaration clause is provided only for programming languages like C++ and the definition clause is always provided. From a maintenance point of view, one could decide to reflect a change made in the declaration code and for that specific scenario, it would make sense only to provide the declaration code without the definition clause. For example, it could be appropriate, when generating code in C++, to only modify the portions of code to be included in the ".h" file and not the ".c" file.

In step 102, if the declaration clause is provided, then the generator engine 52 resolves the provided codeString, as will be explained with the description of codeString resolution shown in FIG. 5f, and engine 52 gets the generated source code and saves it in the declarationText attribute of the newly created operation (step 104).

In step 105, if the definition clause is provided, then the generator engine 52 resolves the provided codeStrings, as will be explained with the description of multiple codeStrings resolution shown in FIG. 5e, and engine 52 gets the generated source code from the cache and saves it in the definitionText attribute of the newly created operation (step 107).

For each set of generation instructions 56 dealing with operation creation, the system creates, based on the parsing result, one operation for each target class or one operation for each qualified attribute of each target class.

The generator engine 52 gets the following parsed information (step 111): interface type value of the operation using one of the following keyword values: public, private, protected or package, operation type value using one of the following keyword values: &instance or &class, operation name variable followed by: the keyword repeatForEach, followed by its associated attribute filter variable, followed by the keyword using, followed by the attribute context variable (described in step 116), an optional category name used for programming language like Smalltalk, an optional declaration clause used for programming languages like C++ and specified by the developer using the declaredAs keyword and implemented through the use of only one codeString with an optional list of referred classes used in the codeString and an optional definition clause specified by the developer using the definedAs keyword and implemented through the use of one or more codeString with an optional list of referred classes associated to each codeString.

The generator engine 52 gets the attribute subset using the current class context node and the provided attribute filter variables as selection criteria (step 112). An attribute filter variable is made up of a combination of the following keywords: the keyword &attribute followed by a selection criteria keyword based on the current value of the attribute's interface type, such as the value all, private, public, protected, package and followed by a selection criteria keyword based on the current value of the attribute type, such as the value instance, class or classAndInstance, and followed by an optional selection criteria using one of the following set of keywords: having defaultValue, for an attribute having a defined value associated with the optional property called defaultValue, having typedef, for an attribute having a defined value associated with the optional property called typedef, of type followed by a provided class name.

The resulting attribute subset made by the generator engine 52 is composed of zero or more attributes meeting the provided selection criteria The generator engine 52 detects if the attribute subset is empty (step 113) and, if empty, does not create an operation for the current class context. If not empty, it processes the first attribute node (step 114) and processes it as the current node context (step 115).

In step 116, the generator engine 52 gets the operation name by replacing all occurrences of the string %1 in the operation name variable with the property value associated with the provided attribute context variable and the current node context. An attribute context variable is represented by the keyword &attribute followed by one of the following a keyword describing one of its identifier: name is a string representing the attribute name, interfaceType is a string public, private, protected or package, attributeClassName or className are synonyms and they are a string representing the name of the attribute type, commentDescription is a string representing the description of the attribute, defaultValue is a string representing the resolved codeString used to implement the default value of the attribute, nameAsClassName is like name with its first letter is uppercase, typedef is a string representing the resolved codeString used to implement a prerequisite typedef construct, defaultValueOrSpace is like defaultValue except if it represents a space if there is no defaultValue defined for the attribute, attributeContentsClassName is a string representing the className of the elements contained in the attribute when the attribute is a collection, typeAsStaticOrSpace is a string representing the value static when the attribute is a class attribute and the value space when it is an instance attribute, declaredClassName is a string representing the class name for which the attribute belongs to.

The value of an attribute context variable is found by extracting the value of the identifier of the current attribute node context.

Obviously, all reserved words are shown as examples. Other reserved words could be used without changing the fundamental operation of this preferred embodiment of the present invention.

The generator engine 52 uses the previous node context as the current node context (step 117). The current node context is now the current class context made in FIG. 5b.

For readability purpose, the steps 118 to 125 are respectively identical to the steps 101 to 108 since once the operation name variable is processed by the generator engine 52 (step 116), it is equivalent to producing a constant creation.

In step 125, the generator engine 52 detects if there is another attribute node from the attribute subset. If it is the case, it processes the next attribute node (step 126). If not, it returns to where it left in FIG. 5b.

Figure 5E:
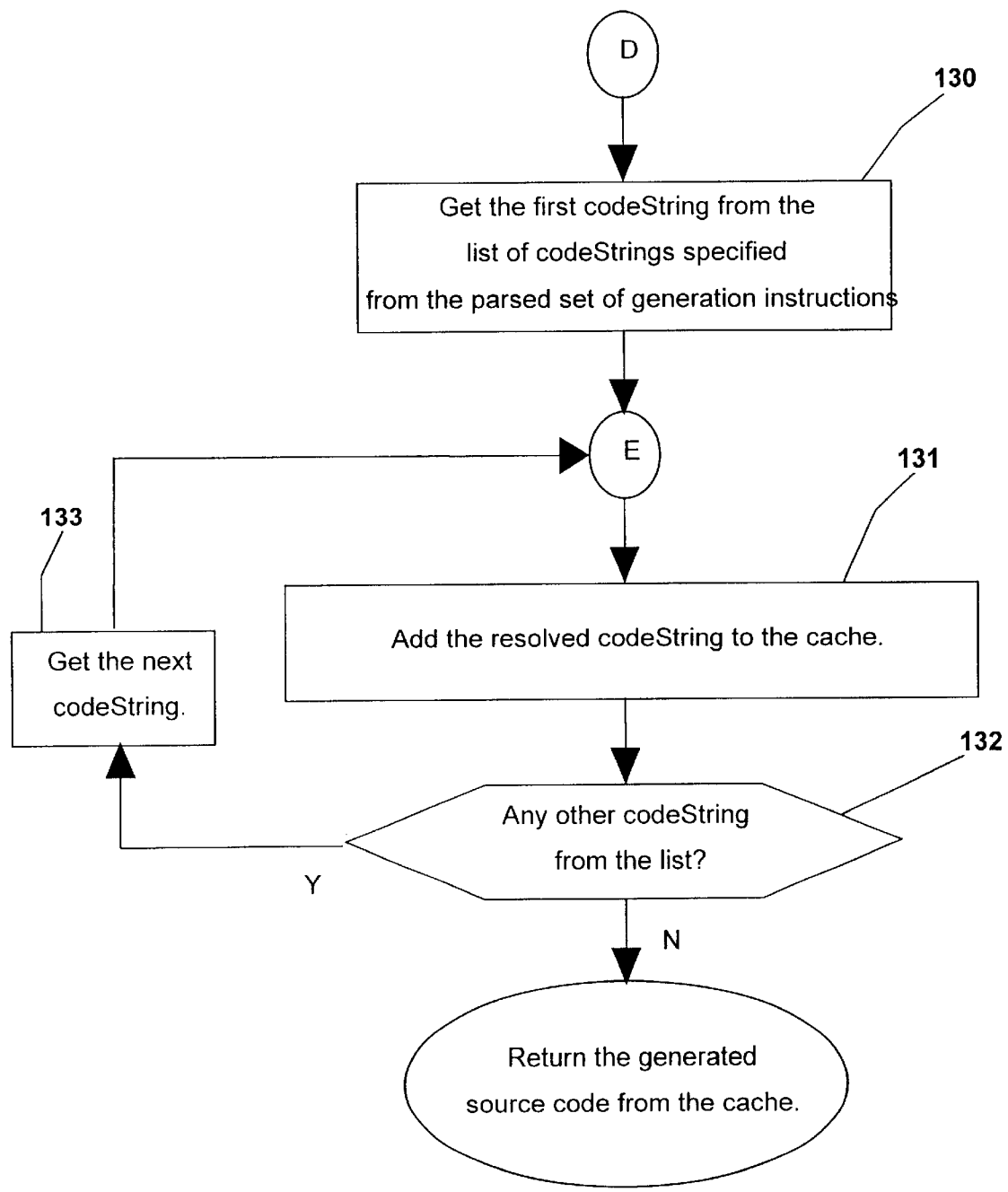
FIG. 5e illustrates a multiple codeString resolution flow chart.

The generator engine 52 generates the source code associated with the definitionText attribute of a package, a class or an operation node the way it is shown in FIG. 5e.

In step 130, the generator 52 gets the first codeString from the list of codeStrings specified from the current parsed set of generation instructions . Then, it processes it like a single codeString resolution, as it is shown in FIG. 5f.

It adds the resolved codeString to the cache (step 131) and detects if there is another codeString to be processed from the list (step 132). If there is another one, the generator engine 52 gets it (step 133) and processes it like a single codeString resolution. If there is none then It returns the generated source code from the cache.

Figure 5F:
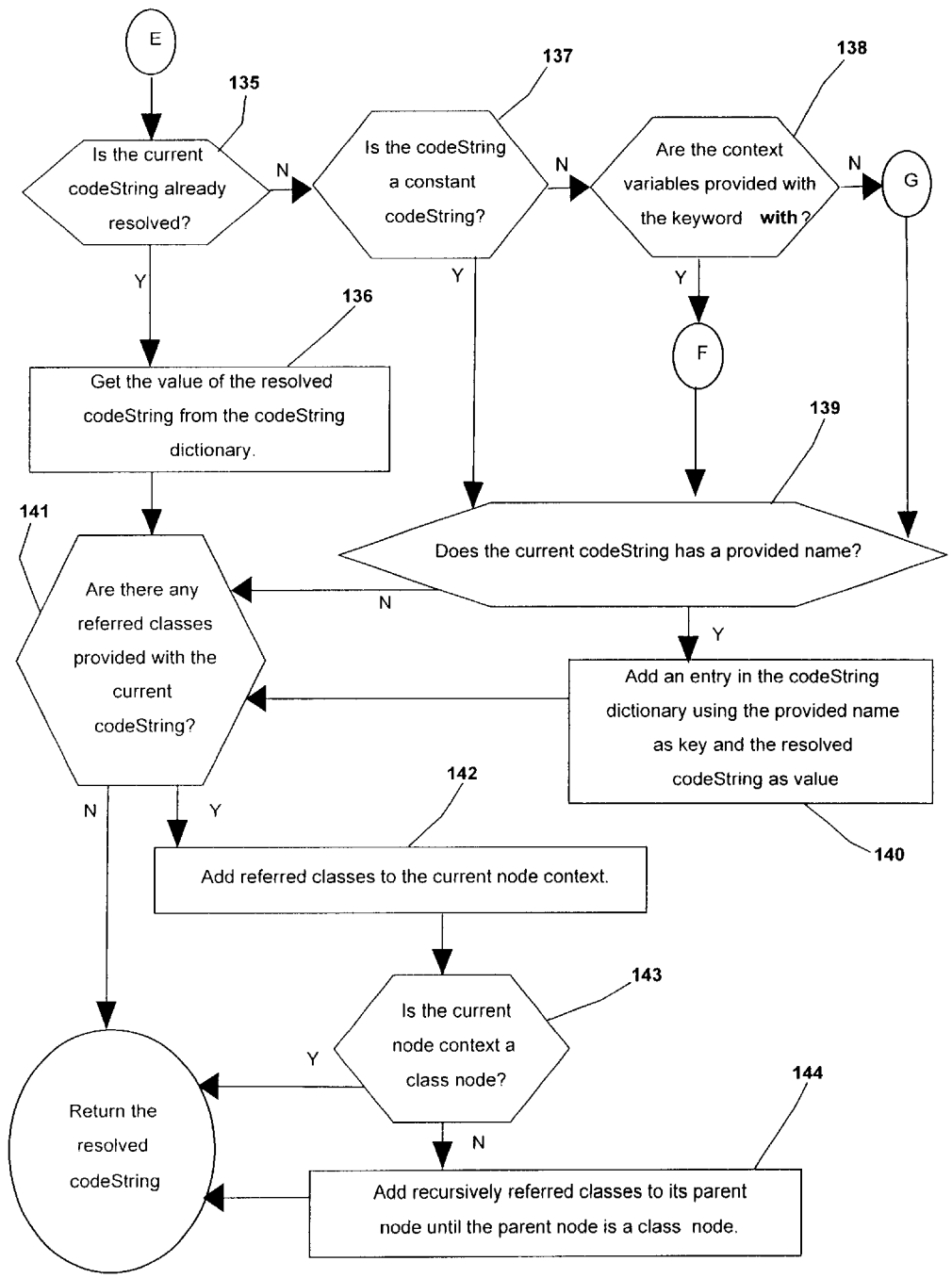
FIG. 5f illustrates a codeString resolution flow chart.
Figure 5G:
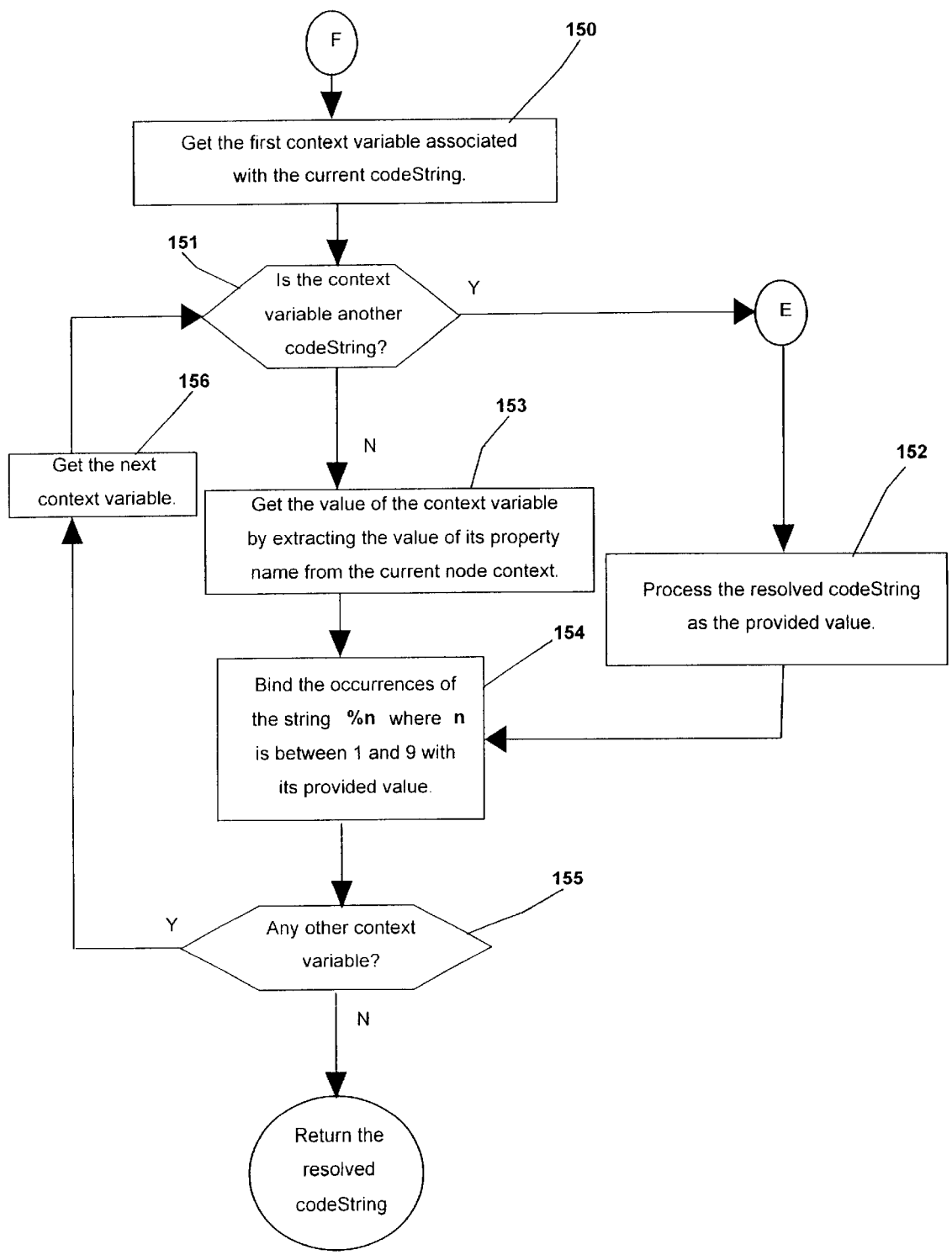
FIG. 5g illustrates a parameterized codeString resolution flow chart.
Figure 5H:
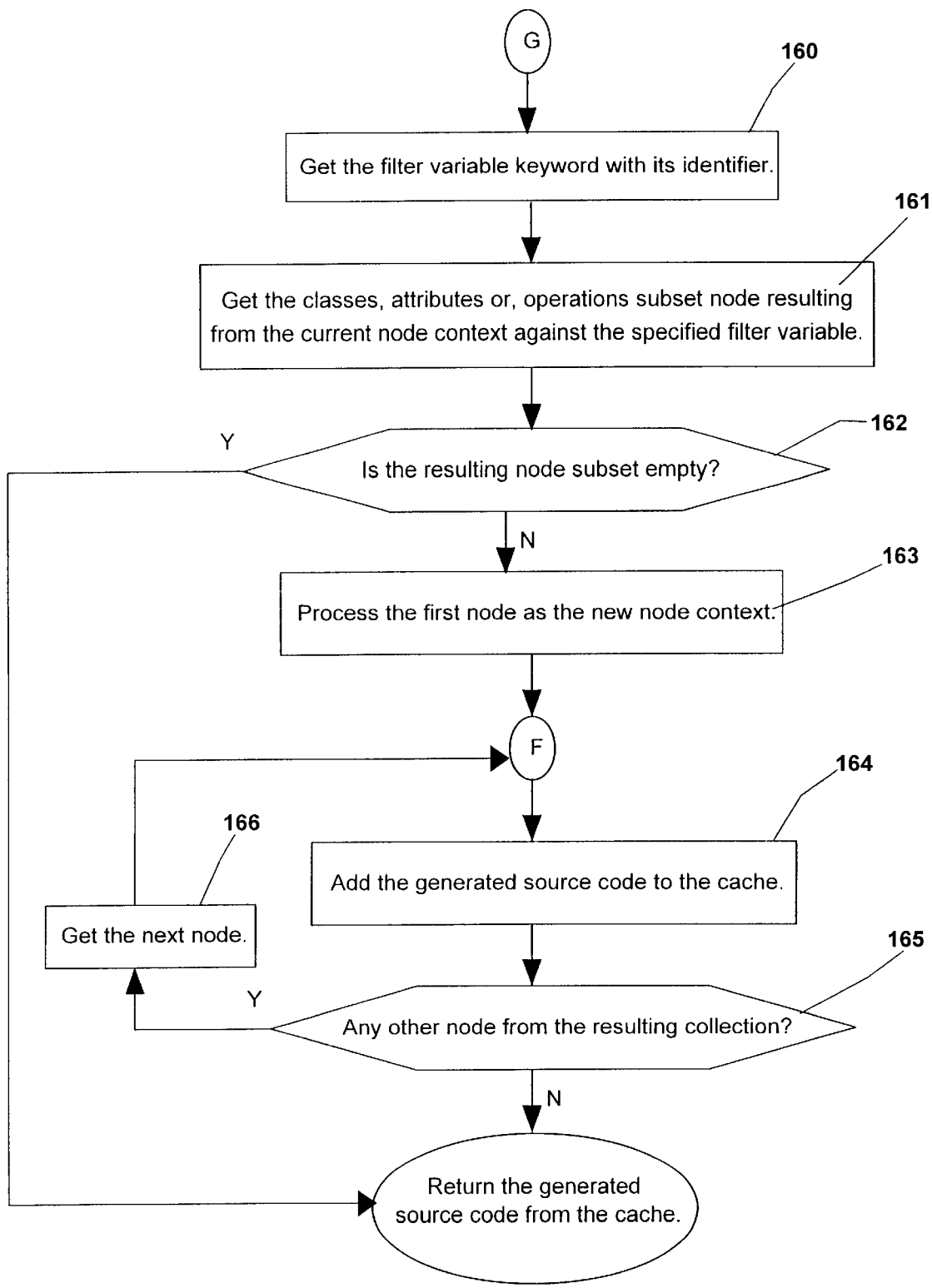
FIG. 5h illustrates a repetitive parameterized codeString resolution flow chart.

The FIGS. 5f to 5h contain the flow charts of the resolution of a codeString.

In FIG. 5f, the generator engine 52 detects if the current codeString is already resolved by looking in the codeString dictionary to see if there is an entry for the provided codeString name (step 135) with a string assigned to it. The developer could provide a name for a codeString using the keyword &blockOfCode followed by a name when he defines it. If it is resolved then the generator gets its value from the codeString dictionary (step 136). If it is not a resolved codeString, it determines if the codeString is a constant codeString by detecting the absence of context variables (step 137).

Class context variable and attribute context variable have been covered in order to respectively get a derived class name or a derived operation name from a class variable name and an operation variable name. They are applicable in the same way with a parameterized codeString.

There is a total of five kinds of context variables as listed below: class context variable, attribute context variable, operation context variable, package context variable, codeString context variable.

An operation context variable is represented by the keyword &operation followed by one of the following a keyword describing one of its identifier: definitionText is a string representing the content of the definitionText attribute associated to the operation, declarationText is a string representing the content of the declarationText attribute associated to the operation.

A package context variable is represented by the keyword &package followed by one of the following keywords describing one of its identifiers: name is a string representing the package name, parentName is a string representing the package name of its parent, commentDescription is a string representing the description of the package.

A codeString context variable is another codeString which needs to be resolved in order to be used as a provided value to bind with the current codeString.

In step 138, the generator engine 52 detects if the context variables were provided with the keyword with. If it is the case, the resolution of a parameterized codeString is necessary as shown in FIG. 5g. If not, it means that the context variables were provided with the keyword repeatForEach and it will be covered in details with the resolution of a repetitive parameterized codeString shown in FIG. 5h.

Once the codeString is resolved, the generator engine 52 determines if the current codeString has a provided name (step 139). If it is the case, the generator engine 52 adds an entry in the codeString dictionary using the provided codeString name as key and the resolved codeString as value (step 140).

In step 141, the generator engine 52 detects if there is any referred classes provided with the current codeString. If it is the case (step 142), it adds referred classes to the current node context. In step 143, it detects if the current node context is a class node. If it is not the case, it adds recursively the referred classes to its parent node, until the parent node is a class node (step 144).

What will now be described is the resolution of a parameterized codeString shown in FIG. 5g. The generator engine 52 gets the first context variable, separated from the others by a comma (step 150). It detects if the current context variable is another codeString (step 151). If it is the case, it resolves it using the method shown in FIG. 5f and processes the resolved codeString as the provided value (step 152). If the context variable is not another codeString, it gets the provided value of the context variable by extracting the value of its identifier from the current node context (step 153). The generator engine 52 binds the occurrences of the string %n, where n is an integer between 1 and 9 with its provided value as shown before (step 154 up to 156). When there is more than one context variable, they are separated with a semi-colon.

In FIG. 5h, the resolution process of a codeString repeating itself as many time as there is resulting nodes from the current node context against the specified filter variable is described. This kind of codeString is useful when what is wanted is to insert a codeString only if the filter variable does not return an empty set against the current node context.

In step 160, the generator engine 52 could parse one of the following filter variables: attribute filter variable, external property filter variable, operation filter variable, superclass filter variable, referred classes filter variable.

The external property filter variable is made with a combination of the following keywords: operation of &dependentConcept followed by a concept name.

An operation filter variable is made up of a combination of the following keywords: the keyword &operation followed by a selection criteria keyword based on the current value of the operation's interface type, such as the value all, private, public, protected, package and followed by a selection criteria keyword based on the current value of the operation type, such as the value instance, class or classAndInstance.

The superclass filter variable is made with the symbol &superclass.

The referred classes filter variable is made with a combination of the following keywords: &referredClass notKnownByCurrent followed by the keyword package or class.

In step 161, the generator engine 52 gets the resulting node subset, based on the provided filter variable which becomes the selection criteria against the current node context. In step 162, it detects if it does not need to generate code and if it is the case, it returns an empty string. It processes the first node as the new node context (step 163) and adds the resolved codeString to the cache (step 164). It detects if there is another resulting node from the resulting collection (step 165) and processes it (step 166). It returns the resulted generated code from the cache.

FIG. 6 illustrates a method according to a preferred embodiment of the present invention. New sets of generation instructions are created 170. The parameters necessary for the generation are defined 171 and code segments are generated 172. These code segments can be grouped to form a complete program.

FIG. 7 illustrates another method according to the preferred embodiment of the present invention. A model declaration is specified 175. This model the structure of a system by showing the objects in the system, relationships between the objects, and the attributes and operations that characterize each class of objects. The model provides the necessary parameters for the generation. The following entities could be created during the specification of a model declaration: package, interface, class, superclass, external properties, association with its participating roles, attributes, operations and subclasses. Then, a set of generation instructions is 176 either created, customized or ordered with a group of sets of generation instructions. Finally, complete computer source code is generated 177 and does not need to be modified or adapted by the user.

Figure 8:
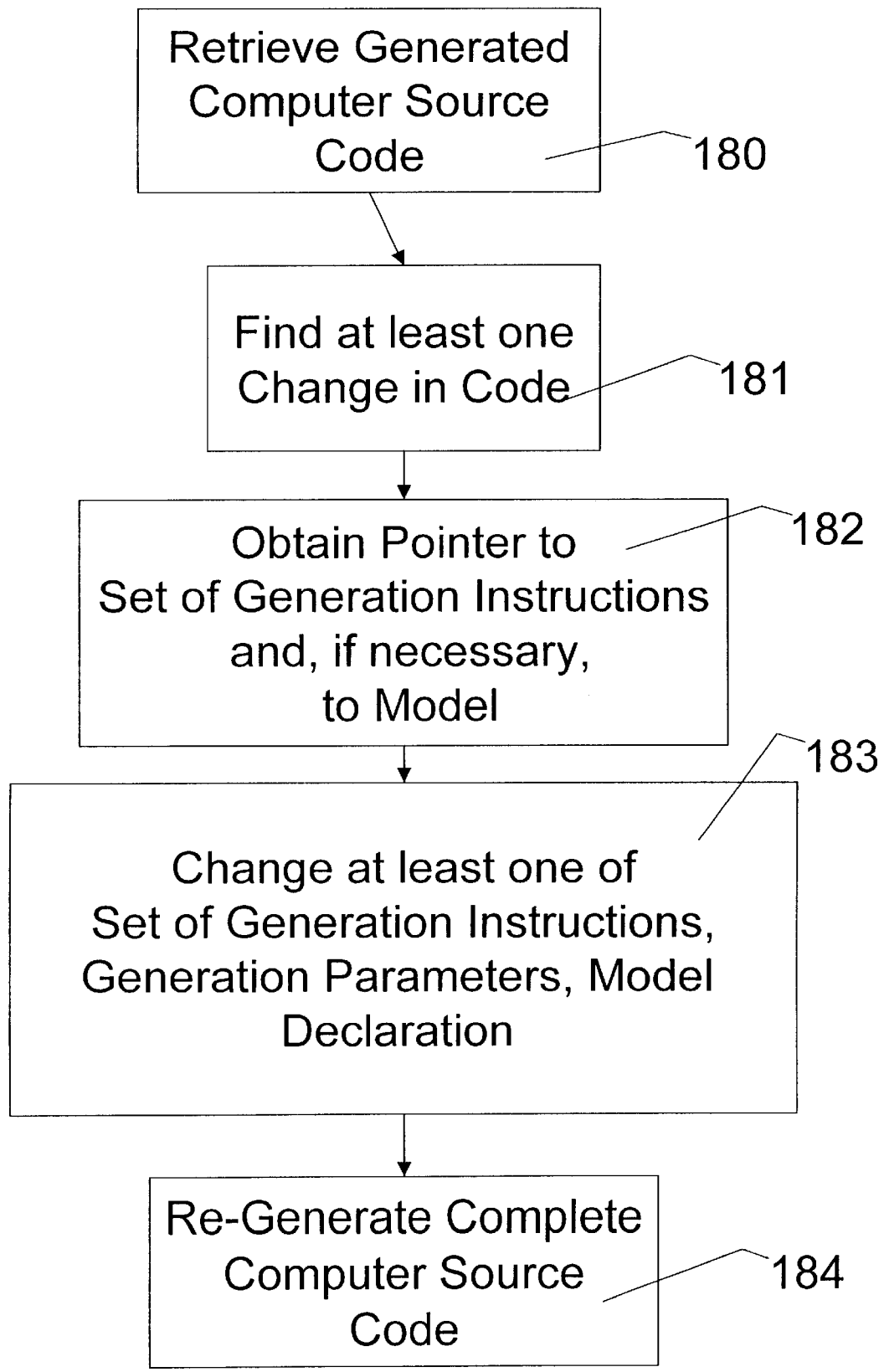
FIG. 8 illustrates a flow chart of an amendment to the source code done by modifying the sets of generation instructions.

FIG. 8 illustrates a method according to another preferred embodiment of the present invention in which source code generated by a preferred method is modified and re-generated without excessive manipulation of the code by the user. The code is retrieved 180 either in a text editor or a user-interface. The user evaluates which modifications are needed 181 in the source code. Pointers to the set of generation instructions are obtained 182. If necessary, pointers to the model declaration and the generation parameters are also obtained. A change is then made 183 to at least one of the set of generation instructions, the model declaration and the generation parameters (filter variables, context variables and number of blocks of code of each kind that were used). This change can be made automatically or manually by the user. The change made could be to change the order or re-sequence the sets of generation instructions. Finally, when appropriate changes have been made, the computer source code can be regenerated 184.

Figure 9:
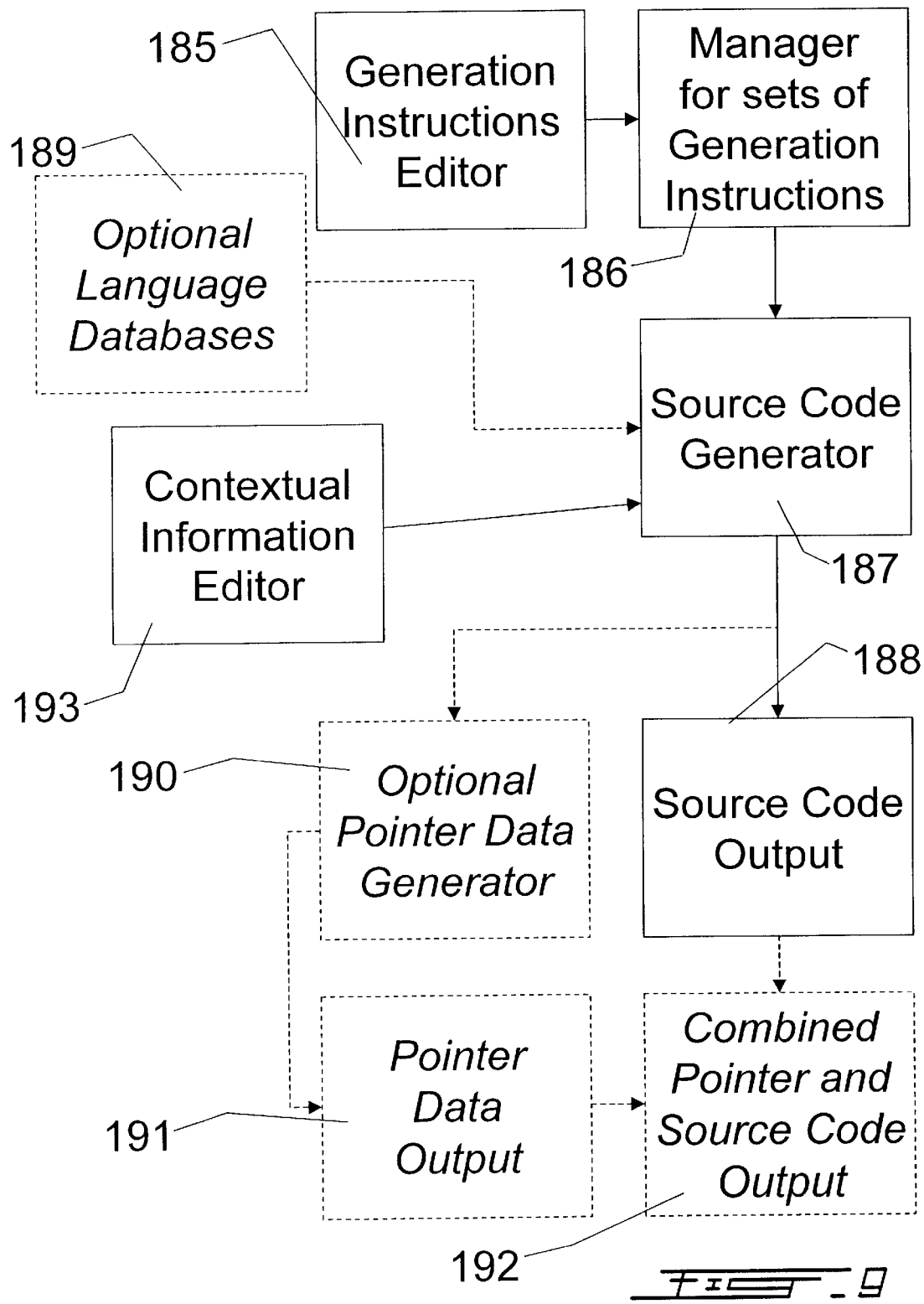
FIG. 9 illustrates a block diagram of the source code generator.

FIG. 9 is a block diagram of the apparatus according to a preferred embodiment of the present invention. An editor 185 is used to create or modify sets of generation instructions. These sets are managed in the manager 186 where they can be ordered. A contextual information editor 193 is also included. The sets of generation instructions and the contextual information are sent to the source code generator 187 which processes the sets of generation instructions using the contextual information and generated the source code in the source code output 188. An optional language database 189 can provide a set of options to customize the generator 187 in order to support a programming language. An optional pointer data generator 190 can also be included which produces pointer data 191 that identifies which set of generation instructions was used during the generation. It can also identify which portion of the contextual information was used in the generation. A combined pointer and source code output 192 can be produced. The pointer data can be included as comment lines throughout the generated source code or as a separate file for consultation.

Figure 10:
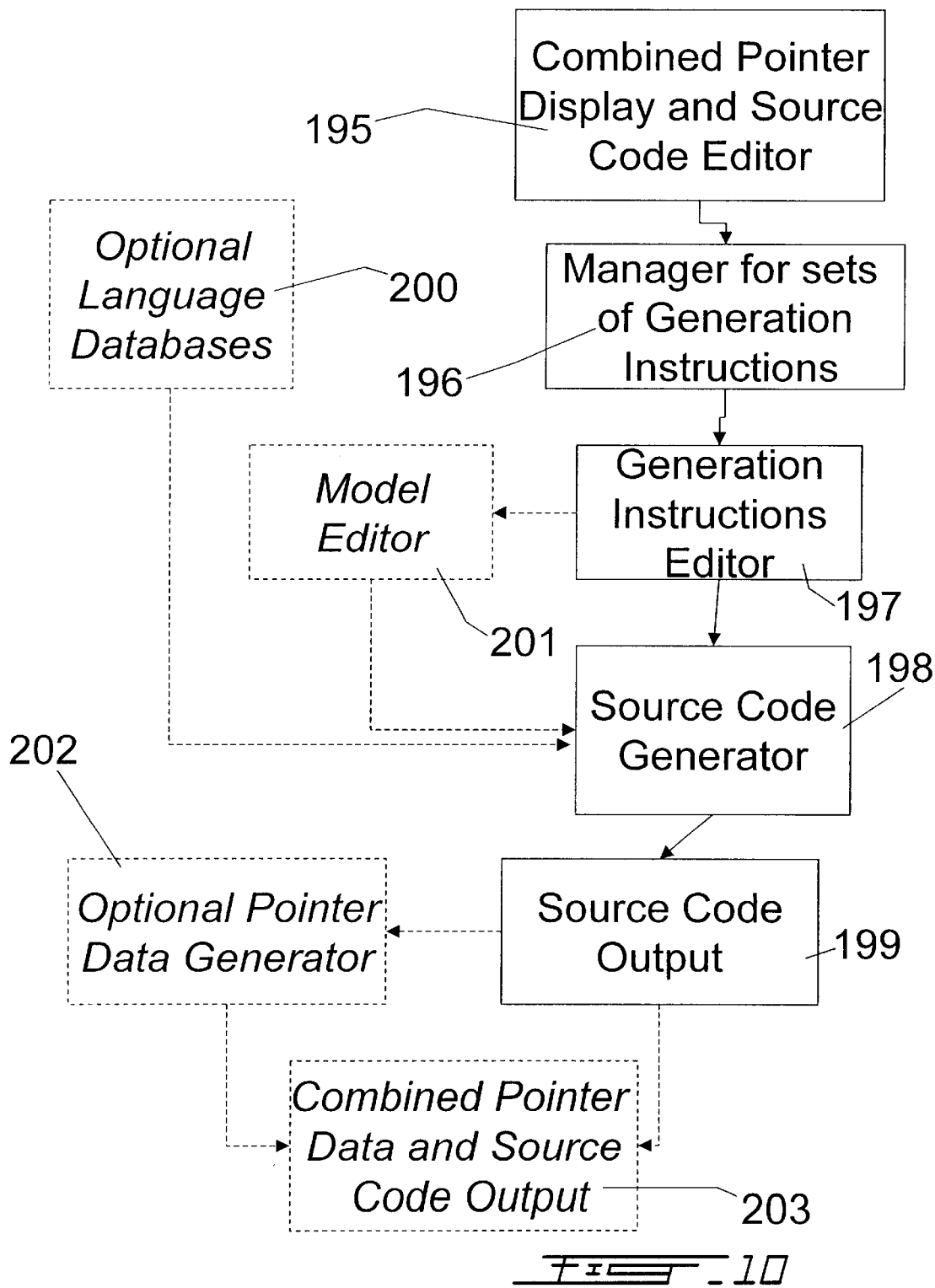
FIG. 10 illustrates a block diagram of the amending tool.

FIG. 10 illustrates another apparatus according to a preferred embodiment of the present invention. A combined Pointer display and Source code editor 195 is provided. When changes must be made to the source code previously generated, the generation instructions manager 196 can retrieve the pointed generation instructions and display them in the generation instructions editor 197. If necessary, a pointer to the model declaration can also be used to retrieve the model declaration in a model editor 201. The changes to the generation instructions and model declaration can be made manually or automatically using the changes made to the previously generated source code. Then, the sets of generation instructions and the model declaration are sent to the source code generator 198 which produces a source code output 199. It is important, however, that all changes made directly to the source code be reflected in the sets of generation instructions and the model declaration, if necessary, in order to ensure that the latest version of the source code used could be re-generated at any time using the latest version of the sets of generation instructions and model declaration. Again, optional language databases 200 can be included. An optional Pointer Data generator 202 can also be added to produce a combined pointer data and source code output 203.

Further details concerning the syntax shown in FIGS. 13a–i and FIGS. 14a–n are necessary in order for the syntax to be fully consistent with a preferred embodiment of the present invention.

In FIGS. 13a–i, in the definition of packageNameClause, packageName1 must be fully qualified. PackageName2 should never be used in JAVA™. In the definition of interfaceClause and classClause, the interfaceName and className cannot contain the period symbol.

In the definition of superclassesClause, the ";" symbol means that more than one superclass could be included in the interface.

In the definition of operationName, the operation signature selector (rather than the operation name) must contain the whole operation signature which contains the following information:

interfaceType
Static (optional)
Synchronized (optional)
Native (optional)
Returned type or void (if none)
Operation name
'('
List of parameter starting with parameter type and followed by parameter name
')'

Figure 14B:
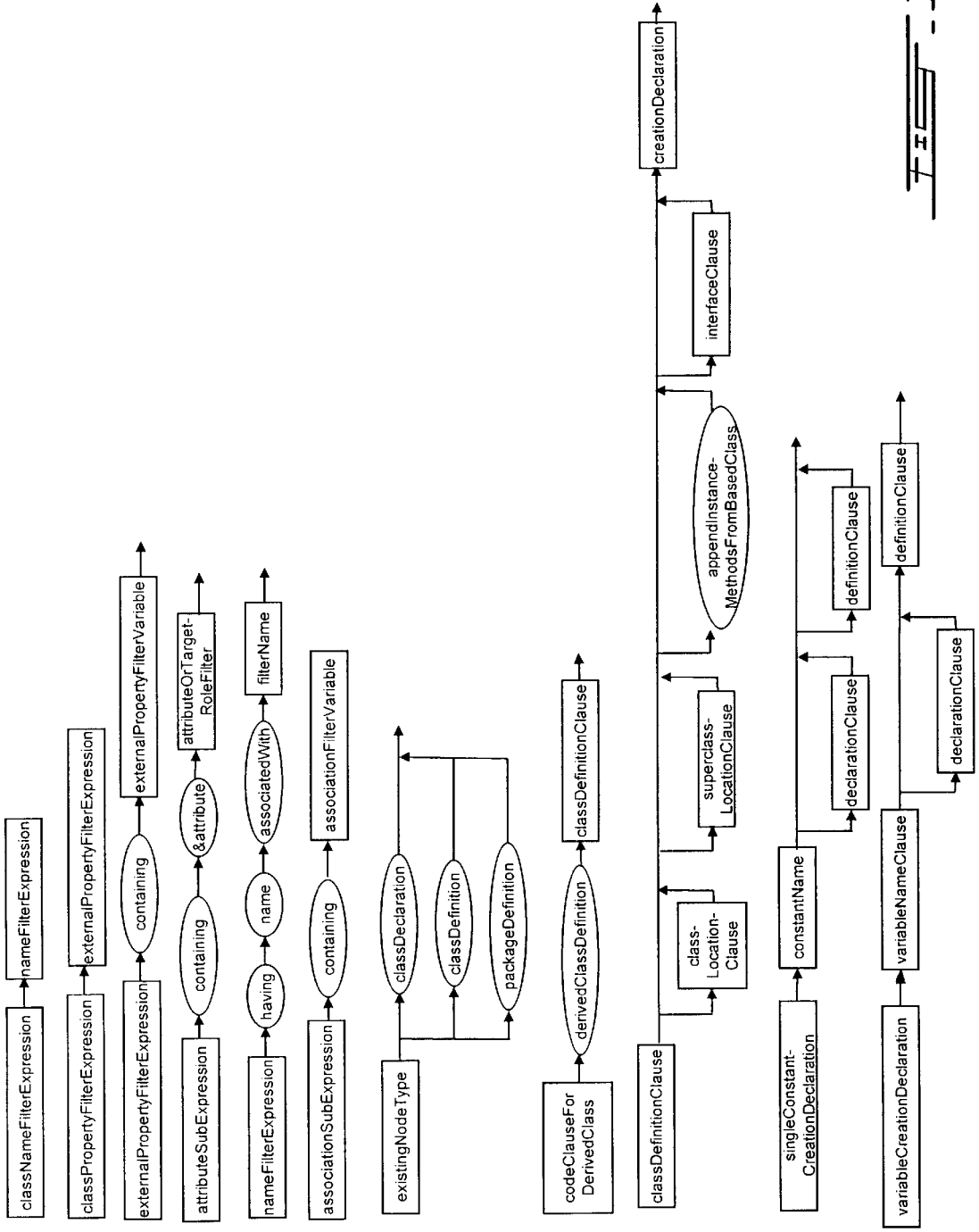
FIGS. 14a–n illustrate a specific syntax for the set of generation instructions, in Backus-Naur format, that could be used to implement a preferred embodiment.
Figure 14C:
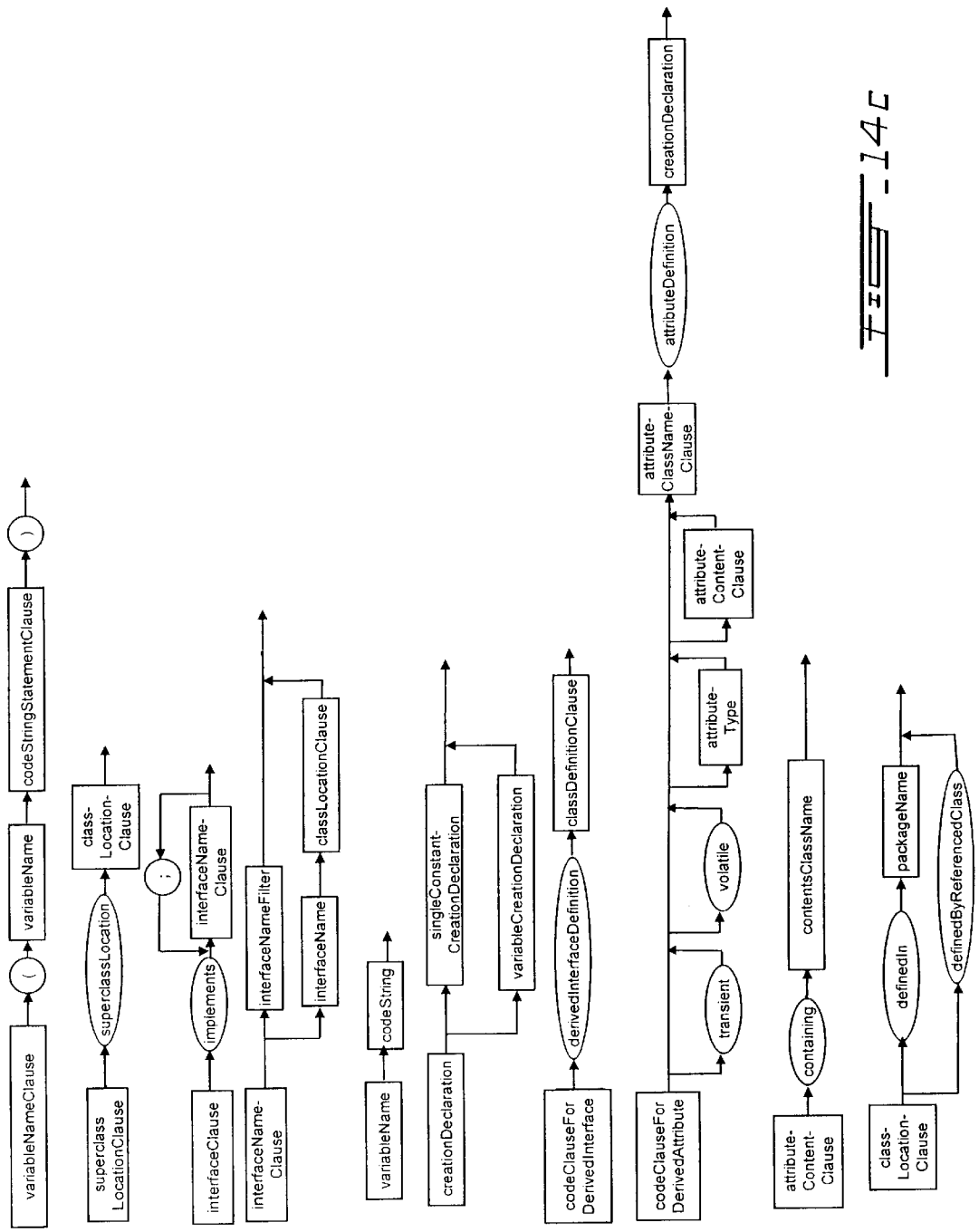
Figure 14D:
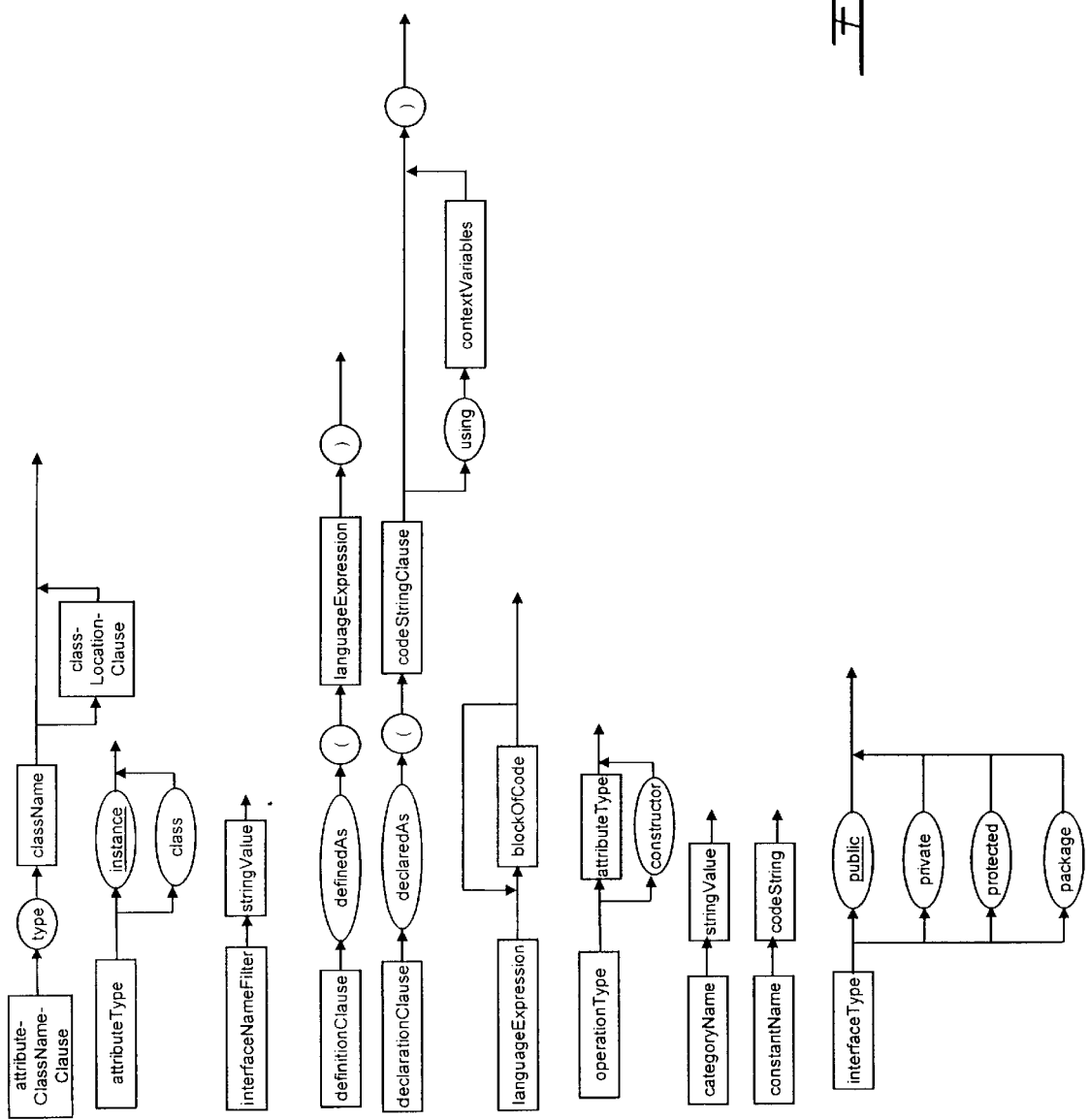
Figure 14:
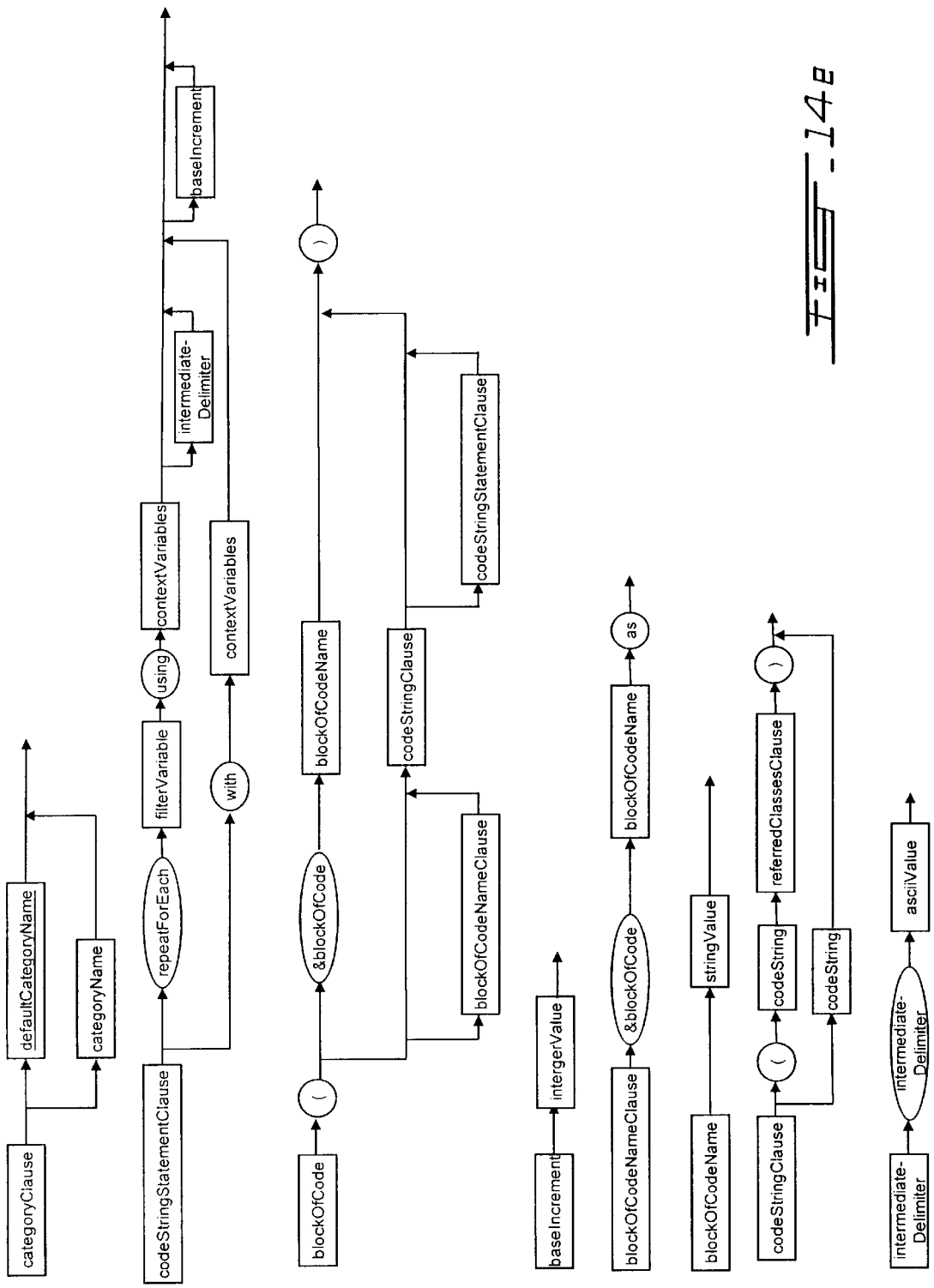
Figure 14F:
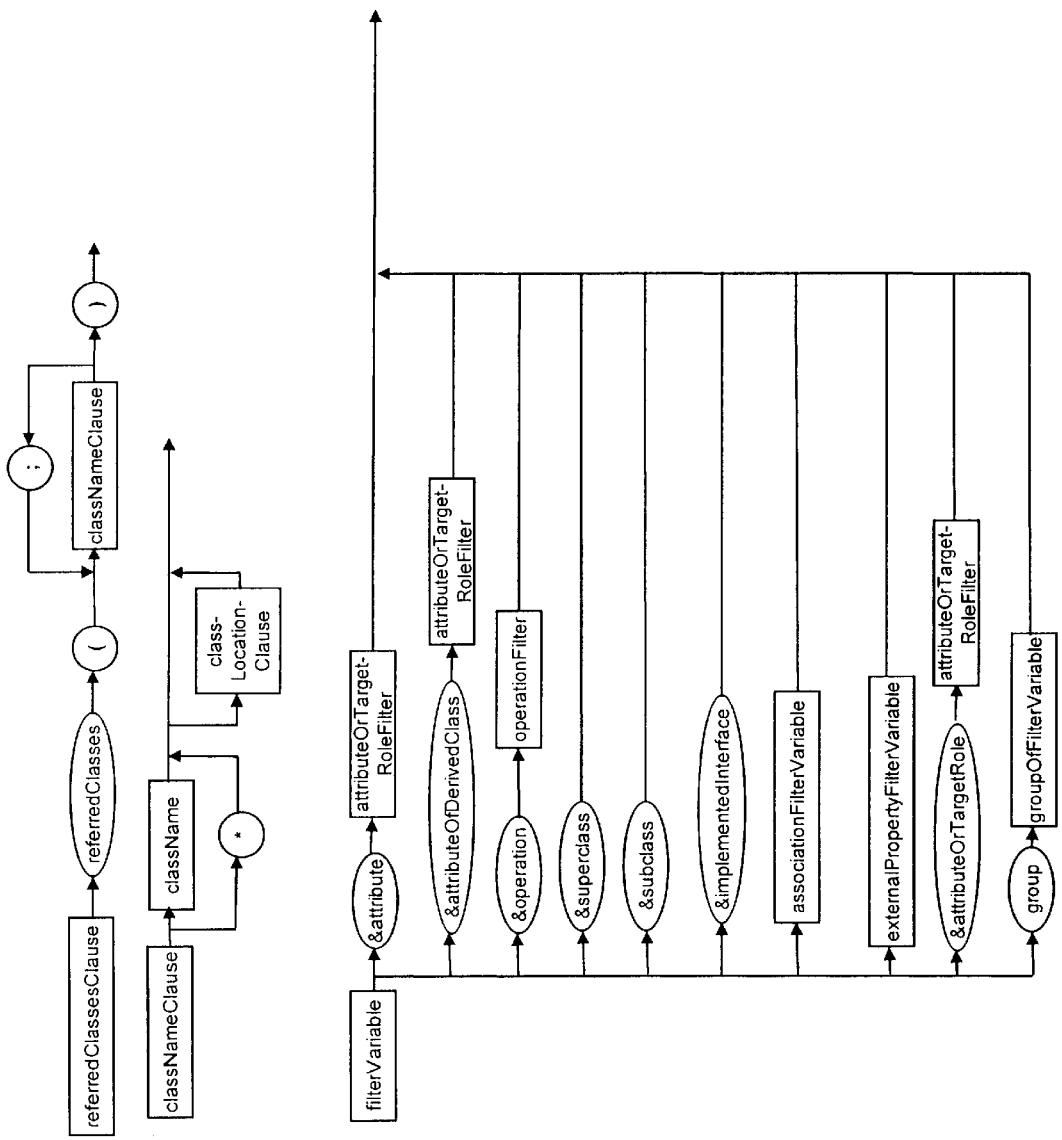
Figure 14G:
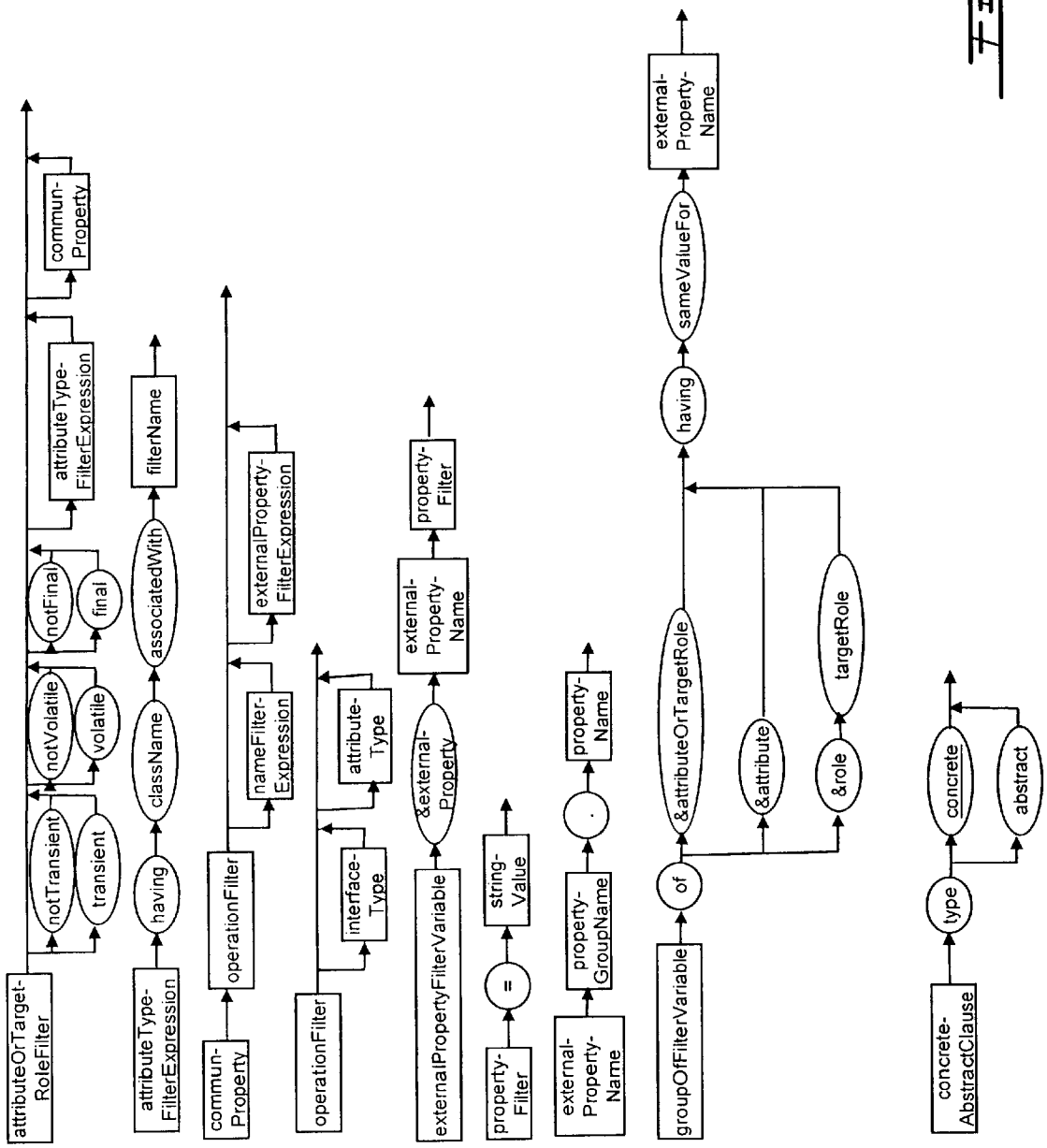
Figure 14J:
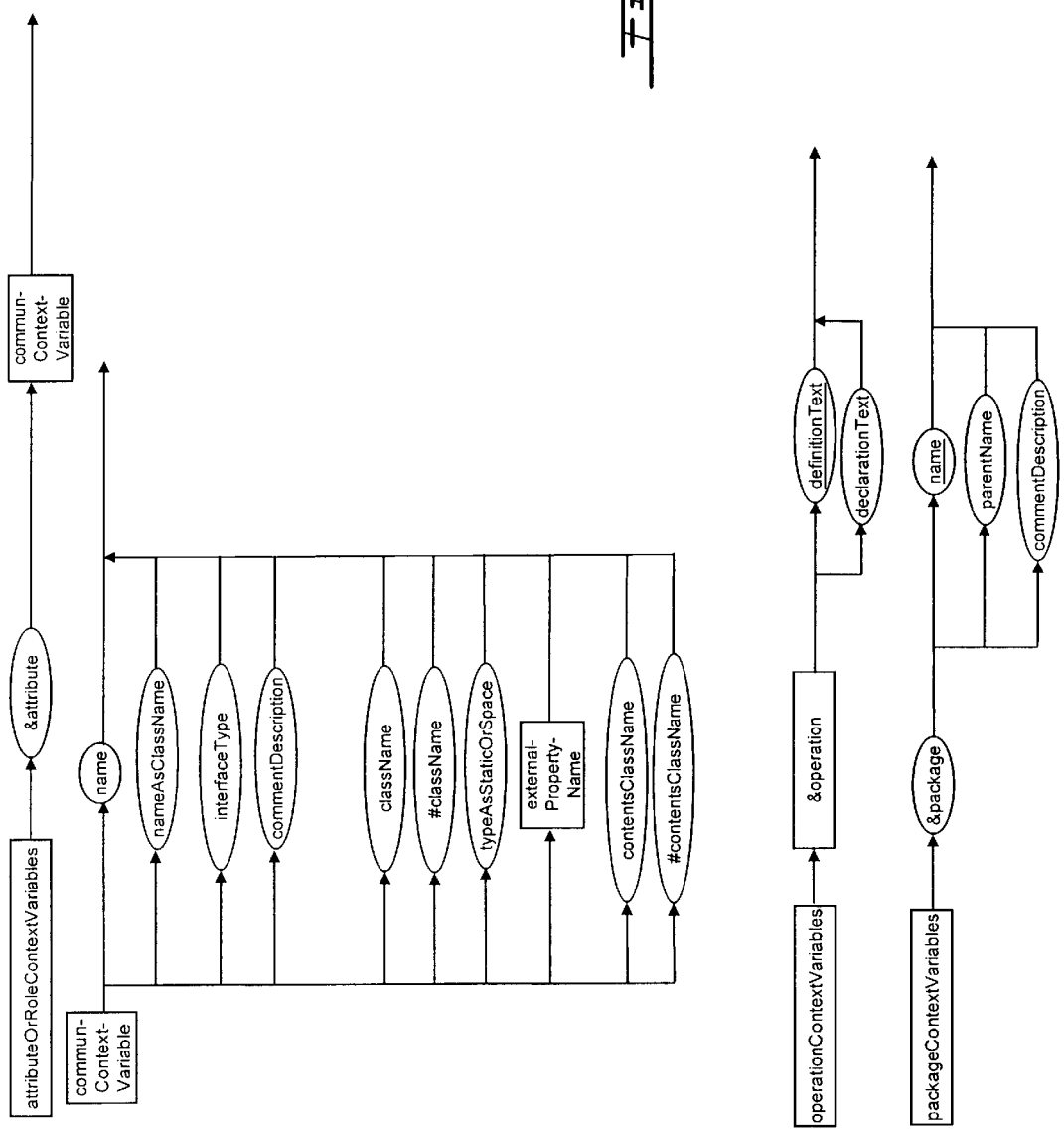
Figure 14K:
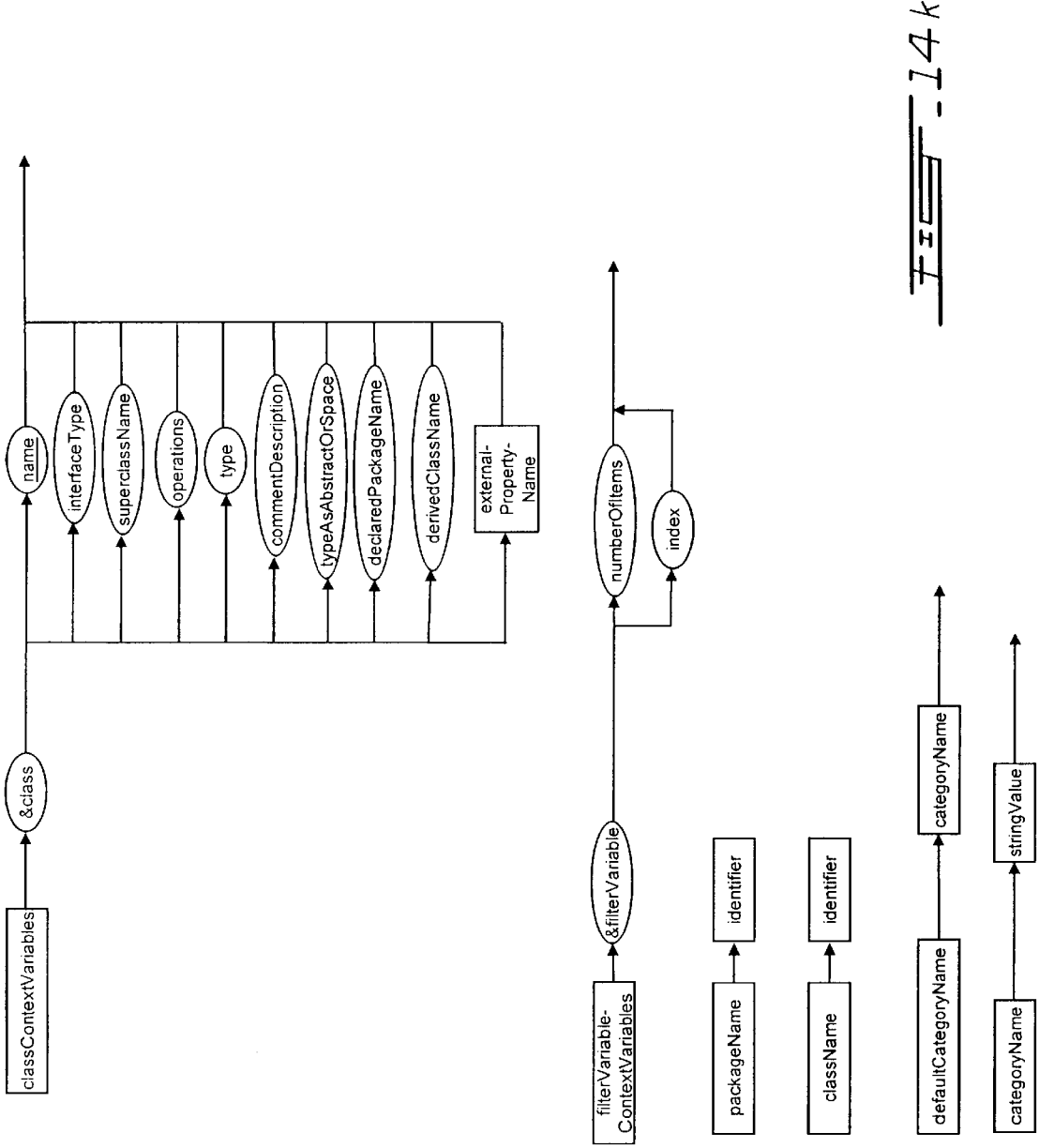
Figure 141:
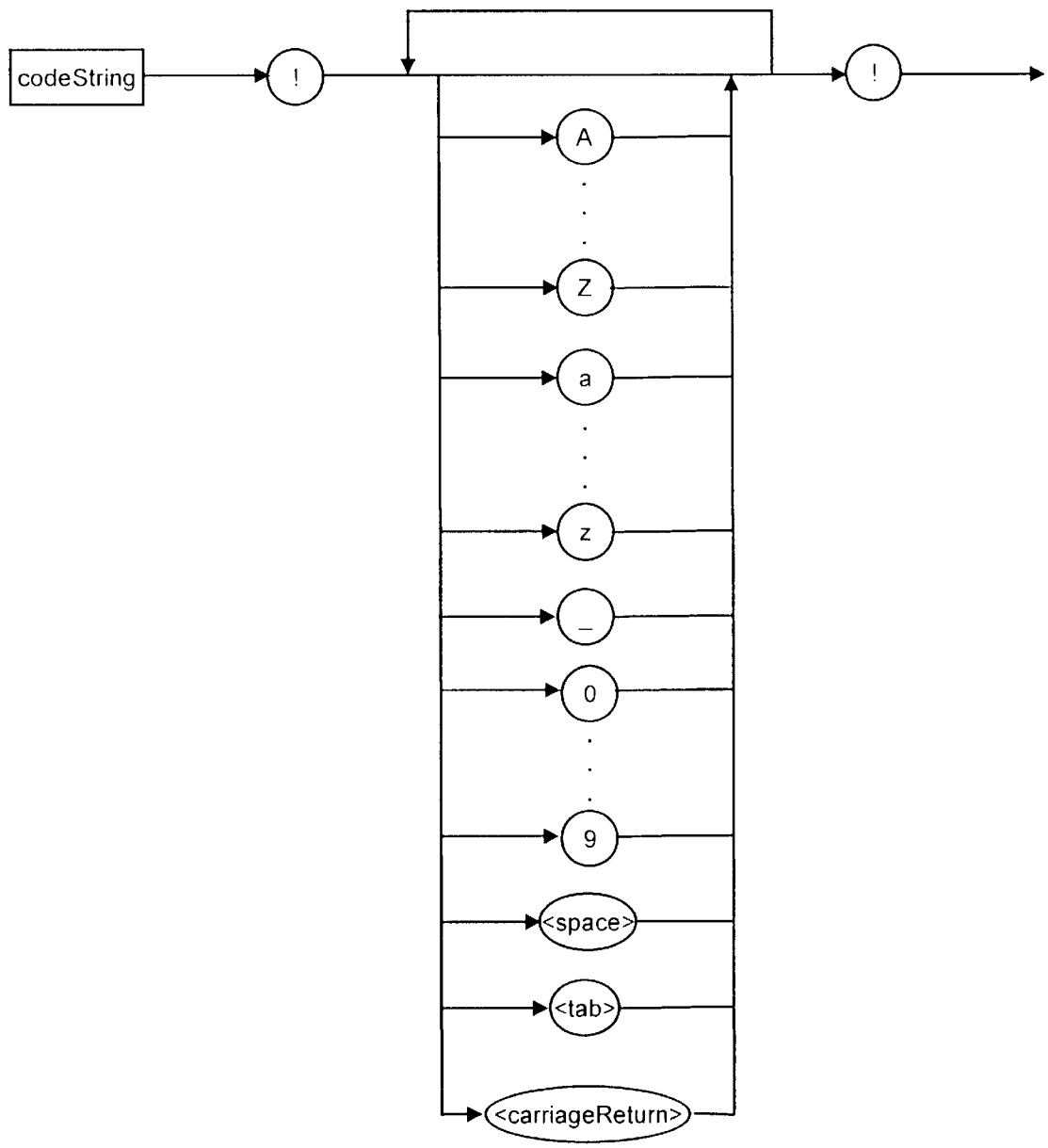
Figure 14M:
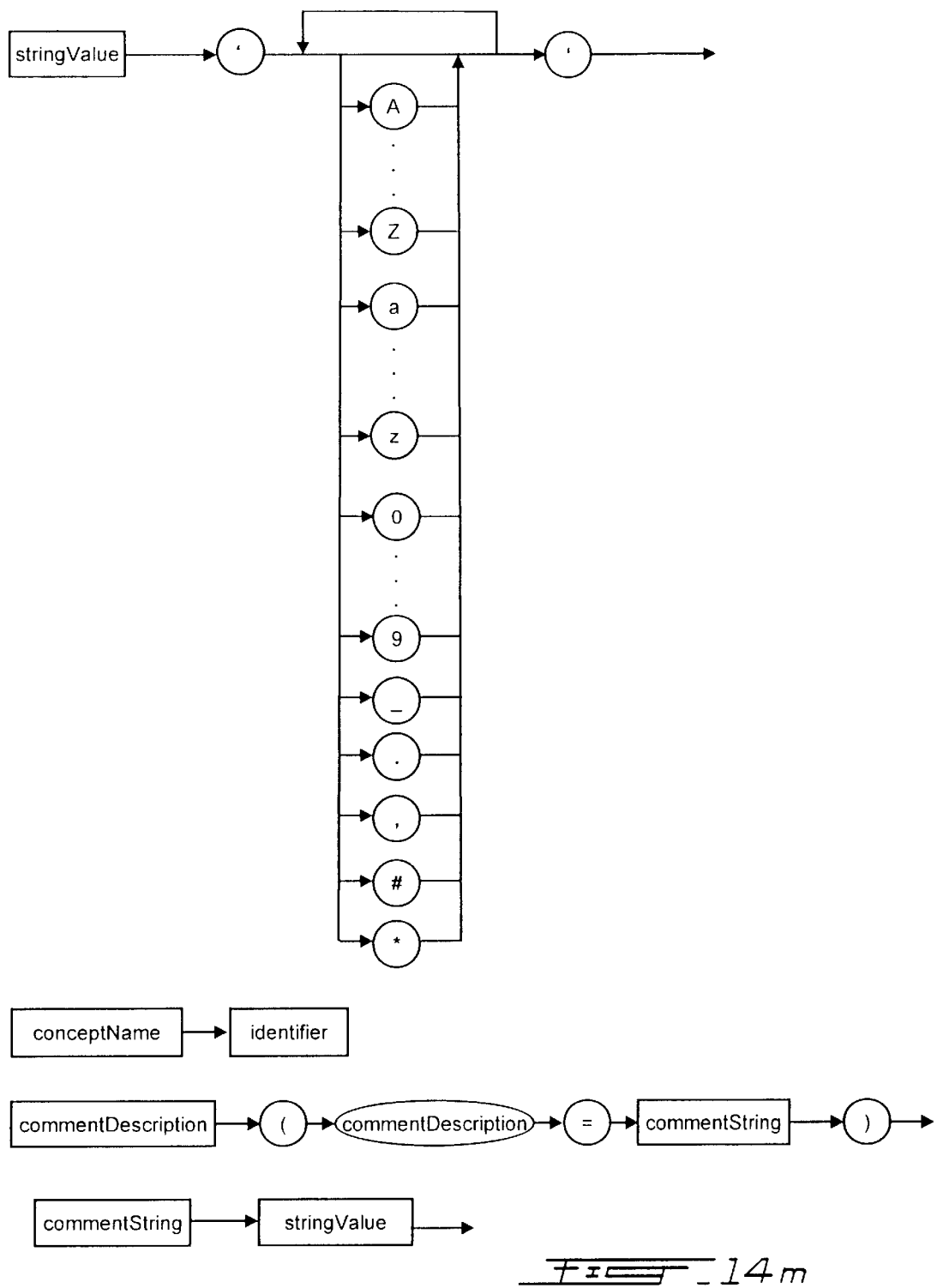
Figure 14N:
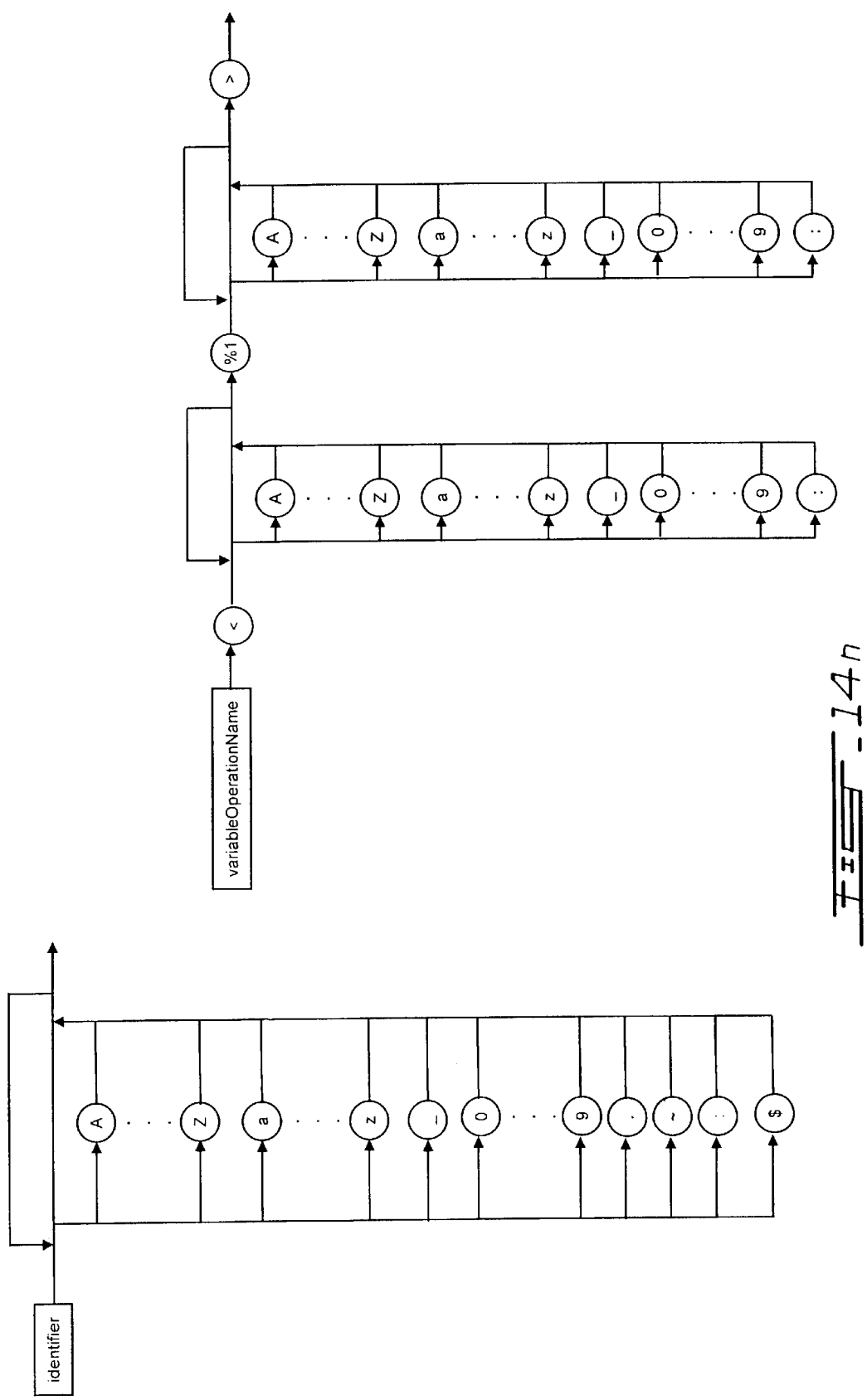

In FIG. 14, in the definition of generationInstruction, the needToBeGenerated keyword is used when generating any existing classReceiverExpression that existed from the modeling tool. By default, an existing node (class or interface) will not be generated and any new node will be generated.

In the definition of attributeSubExpression, containing &attribute used without anything else means that we need to process the set of generation instructions if the interface or class contain attributes. In the definition of singleConstantCreationDeclaration and in the definition of variableCreationDeclaration, the definitionClause is used to define the superclass name when creating interfaces and classes and to define its default value when creating attributes.

In the definition of variableCreationDeclaration, it must be noted that variableCreationDeclaration will create only one or many items when used respectively with "with" or "repeatForEach-using" clauses. The operation name of the variableNameClause must contain the whole operation signature which contains the following information:

interfaceType

Static (optional)

Synchronized (optional)

Native (optional)

Returned type or void (if none)

Operation name

'('

List of parameter starting with parameter type and followed by parameter name

')'

In the variableNameClause definition, the codeStringStatementClause is the only place where groupContextVariable could be used.

The variableName must not include spaces but could refer to more than one context variable.

The interfaceNameFilter could return more than one interface.

The constantName must contain the whole operation signature which contains the following information:

interfaceType

Static (optional)

Synchronized (optional)

Native (optional)

Returned type or void (if none)

Operation name

'('

List of parameter starting with parameter type and followed by parameter name

')'

In the definition of filterVariable, it must be noted that the default context for the generator is always the referencesNode which is the basedClass for a derivedClass and itself for a basedClass. The &superclass and &subclass only go one level from the default context. The &subclass could return more than one class. the &implementedInterface is only used for class definition.

In the definition of groupOfFilterVariable, this filter variable creates a block of code associated with the context variable called &group.

In the definition of associationFilterVariable, using &Association having role without anything else means that the generation instructions will be processed if the interface or class contains associations.

In the definition of externalPropertyContextVariables, the "+" sign adds the baseIncrement associated with the BlockOfCode to the value of the external property. The "++" sign does the same thing and it keeps the result of the addition as the new value for the baseIncrement.

In the definition of the communContextVariable, the character "#" adds the package location associated with the content of the context variable to the referredlocation clause associated with its BlockOfCode.

In the definition of the filterVariableContextVariables, the user must create a separate BlockOfCode when using the numberOfItems because it is the only context variable that must not iterate for every resulting node associated with the current filter variable expression. The starting value of the index is the based increment of its contained iterative codeString.

EXAMPLE 1

The present invention will be more readily understood with particular reference to the following example which is given to illustrate the invention rather than to limit its scope. The code covered by this example is not sufficient to run the application but it gives an idea on the kind of code that could be generated.

According to a preferred embodiment of the present invention, the generator for JAVA™ allows the generation of JAVA™ code for any given framework. This example demonstrates the generation of Enterprise JavaBean™ (EJB) with the persistency service implemented between the application components and their associated data stored in a database. The model and the application code covered by this example are taken from IBM VisualAge for JAVA™ 2.0, which generates code that implements EJB specifications. Unfortunately, VisualAge for JAVA™ prevents a company from using a modeling tool as the single source of data for generated code because it has its own graphical user interfaces to capture implementation data.

The generator according to a preferred embodiment of the present invention can generate the same code from a model, thereby reducing maintenance efforts since the code that is produced by the generator according to a preferred embodiment does not require manual intervention once it's been produced. The generator makes use of sets of generation instructions to generate and adjust the classes and methods that need to be generated.

The following sample model, produced with Rational Rose 98i Enterprise Edition, defines the core services for a banking application. It is illustrated in FIG. 11 and the declaration that corresponds to it is shown in TABLE 1. With the use of features available through the generator according to a preferred embodiment as implemented as a Rational Rose 98i add-in, the above model contains the definition of the External Properties which, in this case, allow the mapping of each attribute to fields contained in the application database. Developers can create groups of external properties and assign them to a set of classes or attributes. Once external properties are defined, values that are associated with these properties can be accessed by developers creating the sets of generation instructions.

TABLE 1

MODEL DECLARATION

Bank includesClasses (
    (public VapAccount type concrete superclass Object
        attributes =
            (public instance accountNumber attributeClass String)
            (public instance balance attributeClass BigDecimal definedIn java.math)
            (public instance opendate attributeClass Calendar definedIn java.util)
        associations =
            ( sourceRole protected not navigable instance account associatedClass
VapAccount containing SimpleLink definedIn com.ibm.vap.Transactions minValue
'0' maxValue '1' targetRole protected navigable instance currency associatedClass
VapCurrency containing SimpleLink definedIn com.ibm.vap.Transactions minValue
'0' maxValue '1')
            ( sourceRole protected navigable instance account associatedClass VapAccount
containing SingleLink definedIn com.ibm.vap.Transactions minValue '0' maxValue
'1' targetRole protected navigable instance transactions associatedClass
VapBankTransaction containing ManyLink definedIn com.ibm.vap.Transactions
minValue '0' maxValue '*')
            ( sourceRole protected navigable instance accounts associatedClass VapAccount
containing ManyLink definedIn com.ibm.vap.Transactions minValue '0' maxValue
'1' targetRole protected navigable instance branch associatedClass VapBankBranch
containing SingleLink definedIn com.ibm.vap.Transactions minValue '0' maxValue
'1')
            ( sourceRole protected navigable instance accounts associatedClass VapAccount
containing ManyLink definedIn com.ibm.vap.Transactions minValue '0' maxValue
'1' targetRole protected navigable instance customer associatedClass VapCustomer
containing SingleLink definedIn com.ibm.vap.Transactions minValue '0' maxValue
'1')
    )
    (public VapSavingsAccount type concrete superclass VapAccount)
    (public VapAddress type concrete superclass Object
        attributes =
            (public instance addressNumber attributeClass String)
            (public instance city attributeClass String)
            (public instance country attributeClass String)
            (public instance state attributeClass String)
            (public instance street1 attributeClass String)
            (public instance street2 attributeClass String)
            (public instance zipcode attributeClass String)
        associations =
            ( sourceRole protected navigable instance billingAddress associatedClass
VapAddress containing SimpleLink definedIn com.ibm.vap.Transactions minValue
'0' maxValue '1' targetRole protected not navigable instance
customerForBillingaddress associatedClass VapCustomer containing SimpleLink
definedIn com.ibm.vap.Transactions minValue '0' maxValue '1')
            ( sourceRole protected navigable instance homeAddress associatedClass
VapAddress containing SimpleLink definedIn com.ibm.vap.Transactions minValue
'0' maxValue '1' targetRole protected not navigable instance
customerForHomeaddress associatedClass VapCustomer containing SimpleLink
definedIn com.ibm.vap.Transactions minValue '0' to maxValue '1')
    )
    (public VapCheckingAccount type concrete superclass VapAccount )
    (public VapBankBranch type concrete superclass Object
        attributes =
            (public instance branchNumber attributeClass String)
            (public instance mainphone attributeClass String)
            (public instance manager attributeClass String)
            (public instance managerphone attributeClass String)
            (public instance name attributeClass String)
            (public instance opendate attributeClass String)
        associations =
            ( sourceRole protected navigable instance branch associatedClass
VapBankBranch containing SingleLink definedIn com.ibm.vap.Transactions
minValue '0' maxValue '1' targetRole protected navigable instance accounts
associatedClass VapAccount containing ManyLink definedIn
com.ibm.vap.Transactions minValue '0' maxValue '1')
            ( sourceRole protected navigable instance branch associatedClass
VapBankBranch containing SingleLink definedIn com.ibm.vap.Transactions
minValue '0' maxValue '1' targetRole protected navigable instance
currencyAssociations associatedClass VapBranchToCurrency containing ManyLink
definedIn com.ibm.vap.Transactions minValue '0' maxValue '1')
            ( sourceRole protected navigable instance branch associatedClass
VapBankBranch containing SingleLink definedIn com.ibm.vap.Transactions
minValue '0' maxValue '1' targetRole protected navigable instance customers

TABLE 1-continued

MODEL DECLARATION associatedClass VapCustomer containing ManyLink definedIn
com.ibm.vap.Transactions minValue '0' maxValue '1')
    )
    (public VapBankTransaction type concrete superclass Object
        attributes =
            (public instance amount attributeClass BigDecimal definedIn java.math)
            (public instance datetime attributeClass Timestamp definedIn java.sql)
            (public instance transactionNumber attributeClass String)
        associations =
            ( sourceRole protected navigable instance transactions associatedClass
VapBankTransaction containing ManyLink definedIn com.ibm.vap.Transactions
minValue '0' maxValue '1' targetRole protected navigable instance account
associatedClass VapAccount containing SingleLink definedIn
com.ibm.vap.Transactions minValue '0' maxValue '1')
    )
    (public VapDeposit type concrete superclass VapBankTransaction)
    (public VapWithdrawal type concrete superclass VapBankTransaction)
    (public VapBranchToCurrency type concrete superclass Object
        associations =
            ( sourceRole protected navigable instance currencyAssociations associatedClass
VapBranchToCurrency containing ManyLink definedIn com.ibm.vap.Transactions
minValue '0' maxValue '1' targetRole protected navigable instance branch
associatedClass VapBankBranch containing SingleLink definedIn
com.ibm.vap.Transactions minValue '0' maxValue '1')
            ( sourceRole protected not navigable instance branchassociations
associatedClass VapBranchToCurrency containing SimpleLink definedIn
com.ibm.vap.Transactions minValue '0' maxValue '1' targetRole protected navigable
instance currency associatedClass VapCurrency containing SimpleLink definedIn
com.ibm.vap.Transactions minValue '0' maxValue '1')
    )
    (public VapCurrency type concrete superclass Object
        attributes =
            (public instance currencyType attributeClass String)
            (public instance name attributeClass String)
            (public instance shortName attributeClass String)
        associations =
            ( sourceRole protected navigable instance currency associatedClass
VapCurrency containing SimpleLink definedIn com.ibm.vap.Transactions minValue
'0' maxValue '1' targetRole protected not navigable instance account associatedClass
VapAccount containing SimpleLink definedIn com.ibm.vap.Transactions minValue
'0' maxValue '1')
            ( sourceRole protected navigable instance currency associatedClass
VapCurrency containing SimpleLink definedIn com.ibm.vap.Transactions minValue
'0' maxValue '1' targetRole protected not navigable instance branchassociations
associatedClass VapBranchToCurrency containing SimpleLink definedIn
com.ibm.vap.Transactions minValue '0' maxValue '1')
    )
    (public VapCustomer type concrete superclass Object
        attributes =
            (public instance birthDate attributeClass Calendar definedIn java.util)
            (public instance customerNumber attributeClass String)
            (public instance felon attributeClass Boolean)
            (public instance homePhone attributeClass String)
            (public instance name attributeClass String)
            (public instance openDate attributeClass Calendar definedIn java.util)
            (public instance rating attributeClass String)
            (public instance sex attributeClass String)
            (public instance workPhone attributeClass String)
        associations =
            ( sourceRole protected navigable instance customer associatedClass
VapCustomer containing SingleLink definedIn com.ibm.vap.Transactions minValue
'0' maxValue '1' targetRole protected navigable instance accounts associatedClass
VapAccount containing ManyLink definedIn com.ibm.vap.Transactions minValue '0'
maxValue '1')
            ( sourceRole protected not navigable instance customerForBillingaddress
associatedClass VapCustomer containing SimpleLink definedIn
com.ibm.vap.Transactions minValue '0' maxValue '1' targetRole protected navigable
instance billingAddress associatedClass VapAddress containing SimpleLink
definedIn com.ibm.vap.Transactions minValue '0' maxValue '1')
            ( sourceRole protected not navigable instance customerForHomeaddress
associatedClass VapCustomer containing SimpleLink definedIn
com.ibm.vap.Transactions minValue '0' maxValue '1' targetRole protected navigable
instance homeAddress associatedClass VapAddress containing SimpleLink
definedIn com.ibm.vap.Transactions minValue '0' maxValue '1')
            ( sourceRole protected navigable instance customers associatedClass
VapCustomer containing ManyLink definedIn com.ibm.vap.Transactions minValue
'0' maxValue '1' targetRole protected navigable instance branch associatedClass TABLE 1-continued

MODEL DECLARATION

VapBankBranch containing SingleLink definedIn com.ibm.vap.Transactions
minValue '0' maxValue '1')
    ( sourceRole public not navigable instance theVapCustomer associatedClass
VapCustomer minValue '0' maxValue '1' targetRole private navigable instance
firstName associatedClass String containing Vector definedIn java.util minValue '0'
maxValue '1')
    ( sourceRole public not navigable instance theVapCustomer associatedClass
VapCustomer minValue '0' maxValue '1' targetRole private navigable instance
midInit associatedClass String minValue '0' maxValue '1')
    ( sourceRole public not navigable instance theVapCustomer associatedClass
VapCustomer minValue '0' maxValue '1' targetRole private navigable instance
lastName associatedClass String minValue '0' maxValue '1')
    )
)
com.ibm.vap.Transactions includesClasses (
    (public SingleLink type concrete superclass Link )
    (public SimpleLink type concrete superclass Link )
    (public ManyLink type concrete superclass Link )
    (public Link type concrete superclass Object )
)

Generating EJB Classes

Classes contained in the model will be used to each produce a set of corresponding classes that implement the Enterprise JavaBeans™ specification. For each class taken from the model, the generator for JAVA™ generates the following derived classes:

the list of EJB classes and interfaces:
    NAMEBean (for EJB Bean)
    NAME (for EJB Remote Interface)
    NAMEHome (EJB Home Interface)
    NAMEKey (for EJB Key Class or Field)
and the following classes which implement the previously mentioned EJB interfaces:
    NAMEImpl (for the implementation of the EJB Remote Interface)
    NAMEHomeImpl (for the implementation of the EJB Home Interface)
where NAME represents the name of each class taken from the model EJB BEAN Some sets of generation instructions used to generated these derived classes are shown in TABLE 2.

TABLE 2

TEMPLATE ONE

&classes basedClass generate (derivedClassDefinition definedIn com.codagen.bank
superclassLocation definedAs com.ibm.vap.Transactions ( !%1Impl! with (&class
name) ) definedAs ((!VapEJObjectImpl!))).
&classes basedClass generate (derivedClassDefinition definedIn com.codagen.bank
superclassLocation definedAs com.ibm.vap.Persistence ( !%1Bean! with (&class
name)) definedAs ((!VapEntityBeanImpl!))).

The business methods of the entity bean class define how instances can be manipulated. The EJB Bean classes are subclasses of VapEntityBeanImpl, a class that implements the following standard methods for an EJB Bean entity:
    ejbActivate
    ejbLoad
    ejbPostCreate
    setEntityContext
    ejbCreate
    ejbPassivate
    ejbRemove
    unsetEntityContext Note that since the above methods are implemented by the VapEntityBeanImpl class, it is not necessary for the generated classes to implement these methods.

The generator for JAVA™ generates the following methods for the EJB Bean class:

For each attribute, a set of generation instructions that will generate a Get and a Set method for the attribute.

For each target role of an association that is navigable and has a cardinality with an upper limit of '1', a set of generation instructions that will generate a Get and a Set method for the role.

For each target role of an association that is navigable and has a cardinality with an upper limit of 'n', a set of generation instructions that will generate a Get and a Set method for the role, as well as a Get and a Set method for the derived classes Link and Key, i.e., setBranchLink and setBranchKey in the case of the Branch role.

An initializeRelationships method which initializes the objects that encapsulate the roles.

A NAMEImpl class for the implementation of EJBObject.

The sets of generation instructions for some of these generated portions are shown in TABLE 3 and TABLE 4.

TABLE 3

TEMPLATE TWO

```
&classes having name associatedWith '*Bean'
generate (operation public instance (!public void set%1(%2 a%2)! repeatForEach
&attribute using (&attribute nameAsClassName; &attribute className)) definedAs
((( ( !
/**
    * Set the value of the attribute %3 in the receiving bean.
    */
    public void set%1(%2 a%2)
    {
            %2 arg1 = a%2;
            // user code begin {pre-Store}
            // user code end
            %3 = arg1;
            // user code begin {post-Store}
            // user code end
    }
    !       referredClasses ( * definedIn java.util ))
        with &attribute nameAsClassName; &attribute className; &attribute name)))).
```

TABLE 4

TEMPLATE THREE

```
&classes having name associatedWith '*Impl'
generate (operation public instance (!public void set%1(%2 a%2)! repeatForEach
&attribute using (&attribute nameAsClassName; &attribute className)) definedAs
    (
        (
!
public void set%1(%2 a%2)
throws java.rmi.RemoteException
{
        com.ibm.vap.Transactions.Version version = this.getBom().getVersionForUpdate();
        %3Bean bean = (%3Bean)version.getBean();
        %2 oldValue = bean.get%1();
        bean.set%1(a%2);
        version.firePropertyChange("%4", oldValue, a%2);
}
!
    with (&attribute nameAsClassName; &attribute className; &attribute name; &class
name ))
            )
).
```

EJB Remote Interface

A client accesses an entity object through the entity bean's remote interface. A remote interface defines the business methods that are available by clients. The generator for JAVA™ generates the methods that must be defined in the Remote interface.

Thus, there is:

For each attribute, a set of generation instructions that will generate a Get and a Set method for the attribute.

For each target role in an association that is navigable and that has a cardinality with an upper limit of '1', a set of generation instructions that will generate a Get and a Set method for the role.

For each target role in an association that is navigable and that has a cardinality with an upper limit of 'n', a set of generation instructions that will generate a Get and a Set method for the role, as well as a Get and a Set method for the derived classes Link and Key, i.e., setBranchLink and setBranchKey in the case of the Branch role.

EJB Home Interface

A Home interface defines the methods used by clients to create and remove instances of the enterprise bean and obtain metadata about an instance. With the generator for JAVA™, there is:

A set of generation instructions that will produce the Create method by using as a parameter the attribute which represents the primary key.

A set of generation instructions that will produce the Find method by using as a parameter the attribute which represents the primary key.

A set of generation instructions that will produce the getROLELiteCollection access methods for target roles having a cardinality with an upper limit of W.

A set of generation instructions that will produce the class that implements the Home interface. The method content associated with any method signature mentioned in the Home interface is completely generated and does not required manual interventions by the developer.

EJB Key Class

This class is used to create and manage the primary key for an EJBObject. Generated code associated with a Key class is produced with the following:

A set of generation instructions that produces a default constructor.

A set of generation instructions that produces a constructor with primaryKey and lastName as arguments.

A set of generation instructions that produces an equal method.

A set of generation instructions that produces a hash method.

Class Implementing the EJB Remote Interface

Sets of generation instructions are required to generate any methods needed for classes called NAMEImpl. As an example, all methods for the VapAccountlmpl class, shown in the class diagram in FIG. 12, are produced and an example of the generated code for the method firePropertyChange( ) is listed in TABLE 10. The set of generation instructions used to generate some of the firePropertyChange( ) code is shown in TABLE 5.

TABLE 5

TEMPLATE FOUR

```
&classes having name associatedWith '*Impl'
generate
(operation public instance !public void firePropertiesChanges(EntityBean
originalBean )! definedAs
    (
    ((
!/**
    * In %1Impl
    * Fire our bound properties with the current value ( from the version) and the previous
    * value (from the argument). The version lookup with unrealizedVersionForRead()
    * avoids the object being marked dirty
    * @param originalBeanjavax.ejb.EntityBean
    * @exception java.rmi.RemoteException
    * The exception description.
    */
public void firePropertiesChanges(javax.ejb.EntityBean originalBean ) throws
java.rmi.RemoteException{
super.firePropertiesChanges(originalBean);
com.ibm.vap.Transactions.Version version =
this.getBom().getUnrealizedVersionForUpdate();
        %1Bean castOriginalBean = (%1Bean)originalBean();
! referredClasses (* definedIn com.ibm.vap.Transactions ))
with (&class name))
(!          version.firePropertyChange("%1", get%2(),
            castOriginalBean.get%2());
!       repeatForEach &attributeOfBasedClass using (&attribute name; &attribute
nameAsClassName ))
(!          version.firePropertyChange("%1", get%2Link(),
            castOriginalBean.get%2Link());
!       repeatForEach &association having &targetRole navigable having maxValue = 1
using (&targetRole name; &targetRole nameAsClassName ))
(!          version.firePropertyChange("%1", get%2Link(),
            castOriginalBean.get%2Link());
!       repeatForEach &association having &targetRole navigable having maxValue > 1
using (&targetRole name; &targetRole nameAsClassName ))
(!          // user code begin {post-firePropertyChanges}
            // user code end
}
!
)
        )
)
```

Class Implementing the EJB Home Interface

Sets of generation instructions are required to generate any methods needed for classes called NAMEHomeImpl. As an example, all methods for the VapAccountHomeImpl class, shown in the class diagram in FIGS. 12a–b, are produced and an example of the generated code for the method initializeRelatedHomes( ) is listed TABLE 11.

EJB Classes Generated for Vapaccount

FIGS. 12a–b shows an example of the set of classes and interfaces that are generated for the VapAccount class. The generator according to a preferred embodiment for JAVA™ produces for each class contained in the modeling tool an equivalent set of methods and classes that are dependant on the associated attributes and roles.

TABLES 6 through 11 illustrate the code generated using the model declaration and a complete set of sets of generation instructions.

TABLE 6

GENERATED CLASS DEFINITION public interface VapAccount extends javax.ejb.EJBObject
public class VapAccountBean extends VapEntityBeanlmpI
public interface VapAccountHome extends TABLE 6-continued

GENERATED CLASS DEFINITION com.ibm.vap.Transactions.VapEJBHome
public class VapAccountHomeimpi extends
PersistentHomeCollection implements VapAccountHome
public class VapAccountlmpII extends
com.ibm.vap.Transactions.VapEJBObjectimpI implements
com.ibm.vap.BankSample.VapAccount
public class VapAccountKey extends
com.ibm.vap.Transactions.Key

TABLE 7

GENERATED SET METHOD SIGNATURE FOR VAPACCOUNT CLASS public void setAccountNumber(String aString) throws java.rmi.RemoteException
public void setBalance(java.math.BigDecimal aBigDecimal) throws java.rmi.RemoteException
public void setBranch(VapBankBranch aVapBankBranch) throws java.rmi.RemoteException, javax.ejb.FinderException
public void setBranchKey(com.ibm.vap.Transactions.Key aKey) throws java.rmi.RemoteException
public void setBranchLink(com.ibm.vap.Transactions.SingleLink aSingleLink) throws java.rmi.RemoteException
void setCurrency(VapCurrency aVapCurrency) throws java.rmi.RemoteException, javax.ejb.FinderException
public void setCurrencyKey(com.ibm.vap.Trans actions.Key aKey) throws java.rmi.RemoteException

TABLE 7-continued

GENERATED SET METHOD SIGNATURE FOR VAPACCOUNT CLASS public void setCurrencyLink(com.ibm.vap.Tran sactions.SimpleLink aSimpleLink) throws java.rmi.RemoteException
void setCustomer(VapCustomer aVapCustomer) throws java.rmi.RemoteException, javax.ejb.FinderException
public void setCustomerKey(com.ibm.vap.Tran sactions.Key aKey) throws java.rmi.RemoteException
public void setCustomerLink(com.ibm.vap.Tran sactions.SingleLink aSingleLink) throws java.rmi.RemoteException
public void setOpendate(java.util.Calendar aCalender) throws java.rmi.RemoteException
public void setTransactionsLink(com.ibm.vap.T ransactions.ManyLink aManyLink) throws java.rmi.RemoteException;

TABLE 8

METHOD CONTENT GENERATED FOR THE SET METHOD, USED FOR THE ACCOUNTNUMBER ATTRIBUTE IN VAPACCOUNT CLASS

```
/* In VapAccountlmpl. */
public void setAccountNumber(java.lang.String ajava.lang.String)
throws java.rmi.RemoteException
{
com.ibm.vap.Transactions.Version version = this.getBom().getVersionForUpdate();
VapAccountBean bean = (VapAccountBean)version.getBean();
java.lang.String oldValue = bean.getAccountNumber();
bean.setAccountNumber(ajava.lang.String);
version.firePropertyChange("account Number", oldValue, ajava.lang.String);
}
/**
In VapAccountBean
* Set the value of the attribute accountNumber in the receiving bean.
*/
public void setAccountNumber(java.lang.String ajava.lang.String)
{
        java.lang.String arg1 = ajava.lang.String;
        // user code begin {pre-Store}
        // user code end
        accountNumber = arg1;
        // user code begin {post-Store}
        // user code end
}
```

TABLE 9

DERIVED CLASSES

* VapAccountlmpl
* VapAccountBean
* VapAccountHome
* VapAccountHomelmpl
* VapAccountKey

TABLE 10

SOME GENERATED METHODS (OTHER THAN GET AND SET)

```
/**
    * In VapAccountlmpl
    * Fire our bound properties with the current value ( from the version ) and the previ-
ous
```

TABLE 10-continued

SOME GENERATED METHODS (OTHER THAN GET AND SET)

```
 * value ( from the argument). The version lookup with unrealizedVersionForRead()
 * avoids the object being marked dirty
 * @param originalBeanjavax.ejb.EntityBean
 * @exception java.rmi.RemoteException
 * The exception description.
 */
/* WARNING: THIS METHOD WILL BE REGENERATED.*/
public void firePropertiesChanges(javax.ejb.EntityBean originalBean ) throws
java.rmi.RemoteException{
super.firePropertiesChanges(originalBean);
com.ibm.vap.Transactions.Version version = this.getBom().getUnrealizedVersionFor
Update();
            VapAccountBean castOriginalBean = (VapAccountBean)originalBean();
            version.firePropertyChange("balance", getBalance(),
            castOriginalBean.getBalance());
            version.firePropertyChange("accountNumber", getAccountNumber(),
            castOriginalBean.getAccountNumber());
            version.firePropertyChange("opendate", getOpendate(),
            castOriginalBean.getOpendate());
            version.firePropertyChange("customer", getCustomerLink(),
            castOriginalBean.getCustomerLink());
            version.firePropertyChange("currency", getCurrencyLink(),
            castOriginalBean.getCurrencyLink());
            version.firePropertyChange("branch", getBranchLink(),
            castOriginalBean.getBranchLink());
            version.firePropertyChange("transactions", getTransactionsLink(),
            castOriginalBean.getTransactionsLink());
            // user code begin {post-firePropertyChanges}
            // user code end
}
```

TABLE 11

SOME GENERATED METHODS (OTHER THAN GET AND SET) - CONTINUED

```
/** VapAccountBean Initialize the relationship links of this
new object
*/
/*WARNING: THIS METHOD WILL BE REGENERATED.*/
public void initializeRelationships() { VapEJBObject
ejbObject = this.getEJBObject();
VapAccountHomeImpl home = (VapAccountHomeImpl)
this.getEJBHome();
this.setTransactionsLink(new ManyLink(ejbObject,
home.getTransactionsHome()));
this.setCustomerLink(new SingleLink(ejbObject,
home.getCustomerHome()));
this.setCurrencyLink(new SimpleLink(ejbObject,
home.getCurrencyHome()));
this.setBranchLink(new SingleLink(ejbObject,
home.getBranchHome()));
}
/**VapAccountHomeImpl
Initialize the relationship and subtype homes from
%homeCollections @param homeCollections
java.util.Hashtable
*/
/* WARNING: THIS METHOD WILL BE REGENERATED.*/
public void initializeRelatedHomes(java.util.Hash table
homeCollections) { this.setTransactionsHome(new
VapAccountToTransactionsRelationship
((HomeCollectionhomeCollections.get
("VapBankTransactionHomeImpl")));
this.setCustomerHome(new
VapAccountToCustomerRelationship((
HomeCollection)
homeCollections.get("VapCustomerHomeImpl")));
this.setCurrencyHome(new
VapAccountToCurrencyRelationship(( HomeCollection)
homeCollections.get("VapCurrencyHo melmpl")));
this.setBranchHome(new
VapAccountToBranchRelationship((HomeCollection)
homeCollections.get("VapBankBranch HomeImpl")));
```

TABLE 11-continued

SOME GENERATED METHODS (OTHER THAN GET AND SET) - CONTINUED

```
this.setVapCheckingAccountHome((
PersistentHomeCollection)homeCollections.get(
"VapCheckingAcc ountHome"));
this.setVapSavingsAccountHome((
PersistentHomeCollection) homeCollections.get(
"VapSavingsAcco untHome"));
}
```

While the invention has been described with particular reference to the illustrated embodiment in the example, it will be understood that numerous modifications thereto will appear to those skilled in the art. Accordingly, the above description and accompanying drawings should be taken as illustrative of the invention and not in a limiting sense. The programming language used was JAVA™ but the generator can be used with other languages such as, for example, C++ and SmallTalk.

While the invention has been described in connection with specific embodiments thereof, it will be understood that it is capable of further modifications and this applications intended to cover any variations, uses, or adaptations of the invention following, in general, the principles of the invention and including such departures form the present disclosure as come within known or customary practice within the art to which the invention pertains and as may be applied to the essential features hereinbefore set forth, and as follows in the scope of the appended claims.

What is claimed is:

1. A method for generating computer source code in an object-oriented programming language or a programming language supporting components, comprising the steps of:
   providing a set of generation instructions comprising:
      definitions of at least two nodes and at least two corresponding node identifiers;

target source code parameterized with at least two context variables, wherein each said at least two context variables points to one of said nodes and said corresponding node identifiers and wherein said at least two context variables indicate at least two different nodes, wherein said target source code is a valid syntax statement for said programming language;

at least two filter instructions each comprising a selection criterion for selecting at least one of said nodes according to said definitions; and automatically generating, in response to said at least two filter instructions, a plurality of code segments in said programming language by replacing, in said parameterized target source code, said at least two context variables with a value of selected ones of said node identifiers.

2. A method as claimed in claim 1, further comprising a step of identifying a node selected using said at least two filter instructions to be a current context of said generating step; and wherein said value of said node identifier in said generating is obtained from said current context of said generating.

3. A method as claimed in claim 2, wherein said value of said node identifier in said generating is obtained from a parent node of said current context of said generating.

4. A method as claimed in claim 1, wherein said generating a plurality of code segments includes generating new components.

5. A method as claimed in claim 1, wherein said generating a plurality of code segments includes generating new methods.

6. A method as claimed in claim 1, wherein said steps are repeated until a set of code segments is obtained which defines a plurality of components.

7. A method as claimed in claim 1, wherein said programming language is JAVA™ programming language.

8. A method as claimed in claim 1, wherein said node is a class.

9. A method as claimed in claim 1, wherein said node is an attribute.

10. A method as claimed in claim 1, wherein said node identifier is a name.

11. A method as claimed in claim 1, wherein said node identifier is a type.

12. A method as claimed in claim 1, wherein said step of generating comprises choosing a programming language for said code segments.

13. A method as claimed in claim 1, further comprising a step of selecting said at least two context variables from a list of context variables.

14. A method as claimed in claim 1, wherein said at least two context variables are expressed in said set of generation instructions using a leading symbol character identifying them as a context variable parameter.

15. A method as claimed in claim 1, further comprising:

automatically generating pointer data, for each said code segment, pointing to locations in said set of generation instructions used in said code segment generating step.

16. A method as claimed in claim 15, wherein said pointer data is stored in a separate file from said plurality of code segments.

17. A method as claimed in claim 15, wherein said pointer data is shown as comment lines throughout said code segments.

18. A method as claimed in claim 15, further comprising steps of:

finding at least one portion of said source code requiring a change;

using said pointer data from said portion to find locations in said set of generation instructions needing a corresponding change;

changing said set of generation instructions in at least some of said locations; and repeating said step of automatically generating said plurality of code segments using said set of generation instructions as changed in the previous step.

19. A computer data signal embodied in a carrier wave comprising a plurality of code segments generated according to claim 15.

20. A computer data signal embodied in a carrier wave comprising a set of generation instructions provided according to claim 15.

21. A method as claimed in claim 1, further comprising:

at least one of creating, ordering and customizing said set of generation instructions.

22. A method as claimed in claim 1, wherein said definitions are generic for a plurality of programming languages.

23. A computer data signal embodied in a carrier wave comprising a plurality of code segments generated according to claim 1.

24. A computer data signal embodied in a carrier wave comprising a set of generation instructions provided according to claim 1.

25. A method as claimed in claim 1, wherein said value of said node identifier in said generating is obtained from a parent node of a current context of said generating.

* * * * *